United States Patent [19]

Nakai et al.

[11] Patent Number: 5,909,221

[45] Date of Patent: Jun. 1, 1999

[54] GRAY SCALED DATA GENERATING DEVICE WHICH BALANCES WIDTH AND SHADE OF STROKES BY REPOSITIONING THEIR CENTER LINE TO A PREDETERMINED DISTANCE FROM PIXEL BORDER

[75] Inventors: Masaru Nakai, Moriguchi; Mika Matsui, Hirakata; Taketo Yoshii, Amagasaki; Katsuyuki Morita, Ikeda; Yoshiyuki Miyabe, Osaka, all of Japan

[73] Assignee: Matsushita Electric Industrial Co., Ltd., Kadoma, Japan

[21] Appl. No.: 08/575,500

[22] Filed: Dec. 20, 1995

[30] Foreign Application Priority Data

Dec. 20, 1994 [JP] Japan .................................. 6-317165
Dec. 4, 1995 [JP] Japan .................................. 7-315390

[51] Int. Cl.$^6$ ........................................................ G06T 5/00
[52] U.S. Cl. ........................ 345/433; 345/467; 345/469; 382/266
[58] Field of Search ........................... 395/133, 167–172; 382/266, 269; 345/433, 467–472

[56] References Cited

U.S. PATENT DOCUMENTS 5,438,656  8/1995  Valdés et al. ............................ 395/143
5,684,510  11/1997  Brassell et al. ......................... 345/433

*Primary Examiner*—Phu K. Nguyen
*Assistant Examiner*—Jae-Hee Choi
*Attorney, Agent, or Firm*—Price, Gess & Ubell

[57] ABSTRACT

A gray scaled data generation device which generates characters and figures of a size which is a fixed number of pixels as gray scaled data, based on outline data which includes outline information which expresses outlines of strokes included in characters and figures and stroke information which shows positions of horizontal and vertical strokes, wherein the gray scaled data generation device has optimizing means for optimizing a position of a stroke, said position being in a coordinate system in which the position is expressed in terms of fine pixels given by dividing every pixel of said size in both a horizontal and a vertical direction, by moving a position of every stroke expressed in the stroke information to a position which satisfies certain criteria related to distances from a border of each pixel; outline generation means for generating outlines in said coordinate system from the outline information, for each stroke which has had its position optimized; and gray scaled data generation means for generating gray scaled data for each pixel unit based on the generated outlines.

38 Claims, 62 Drawing Sheets

| PIXEL | 1 | 2 | 3 | 4 | 5 | 6 | 7 | 8 | 9 | 10 |
|---|---|---|---|---|---|---|---|---|---|---|
| 1/4 PIXEL BORDER | 2 | 10 | 18 | 26 | 34 | 42 | 50 | 58 | 66 | 74 |
| 3/4 PIXEL BORDER | 6 | 14 | 22 | 30 | 38 | 46 | 54 | 62 | 70 | 78 |

FIG. 5A
PRIOR ART

OUTLINE INFORMATION

OUTLINE 1 : (150, 100) (850, 100) (850, 200) (150, 200)
OUTLINE 2 : (330, 450) (670, 450) (670, 550) (330, 550)
OUTLINE 3 : (240, 713) (760, 713) (760, 813) (240, 813)

FIG. 5B
PRIOR ART

STROKE POSITION INFORMATION

HORIZONTAL STROKE 1 : (100, 200)
HORIZONTAL STROKE 2 : (450, 550)
HORIZONTAL STROKE 3 : (713, 813)

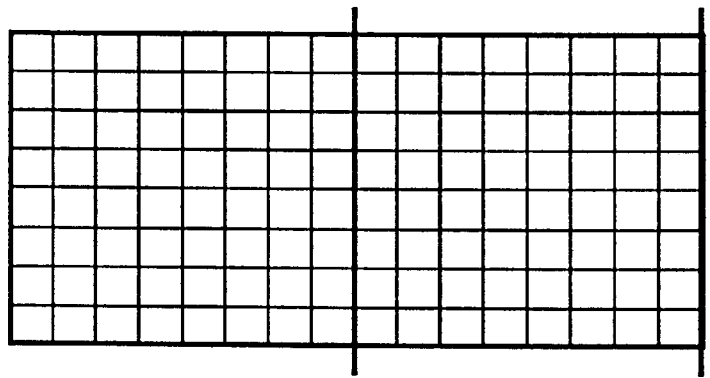
FIG. 10C PRIOR ART — HORIZONTAL STROKE 1
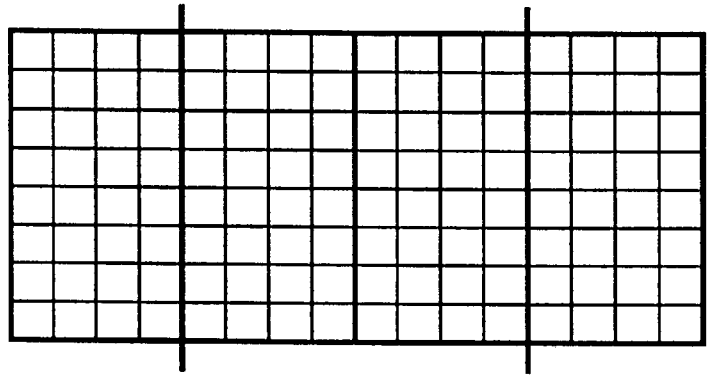
FIG. 10B PRIOR ART — HORIZONTAL STROKE 2
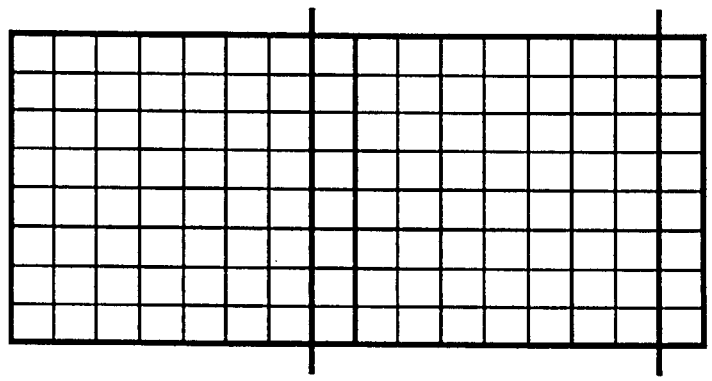
FIG. 10A PRIOR ART — HORIZONTAL STROKE 3

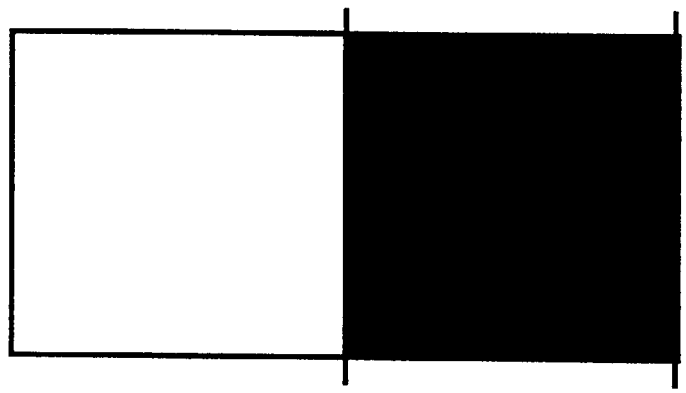
FIG. 11C PRIOR ART
HORIZONTAL STROKE 1
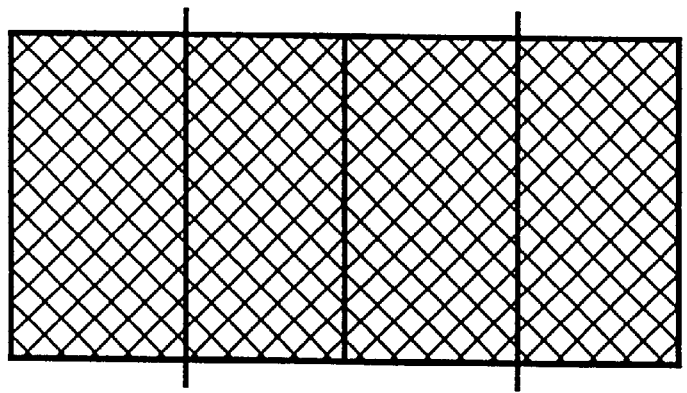
FIG. 11B PRIOR ART
HORIZONTAL STROKE 2
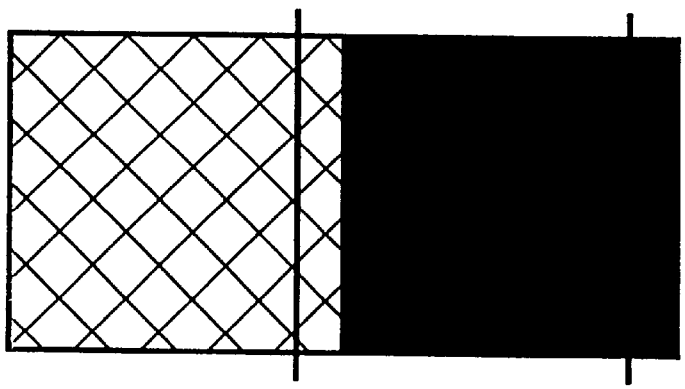
FIG. 11A PRIOR ART
HORIZONTAL STROKE 3
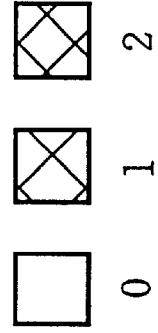
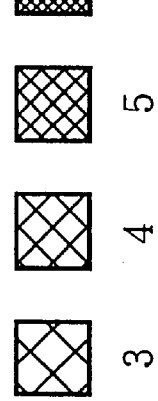

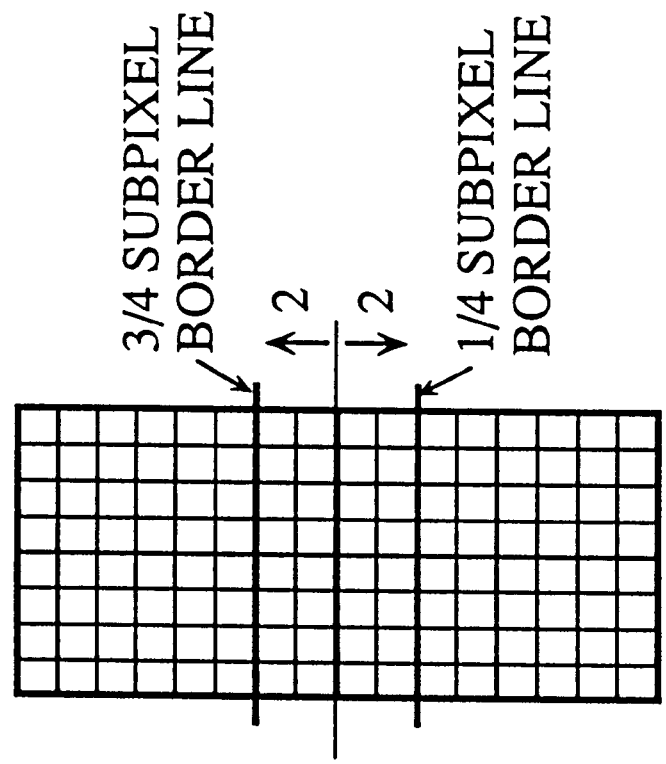
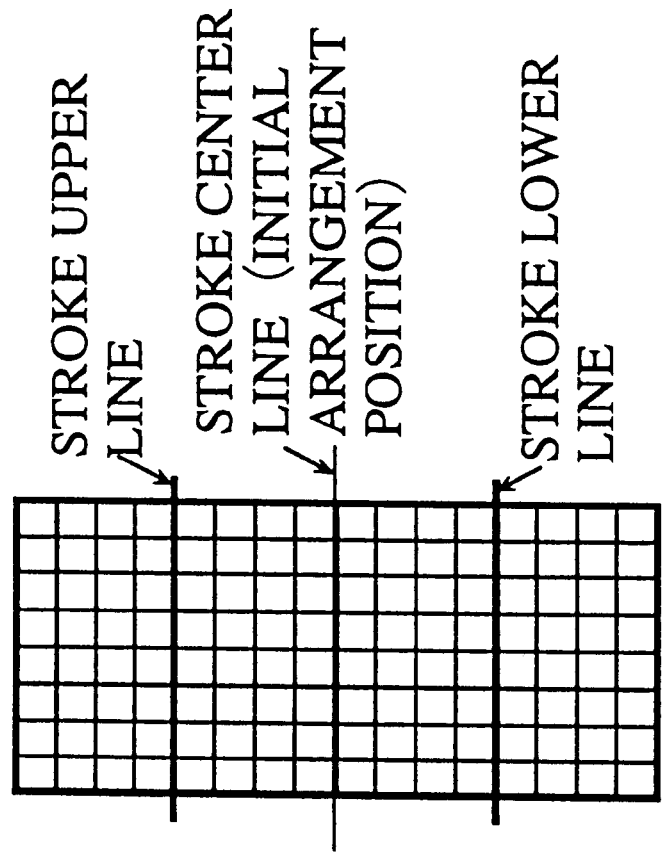

FIG. 15

| HORIZONTAL STROKE n | STROKE WIDTH Wsp_n | OPTIMAL ARRANGEMENT POSITION Copt_n | (LOWER, UPPER) (Lopt_n, Uopt_n) |
|---|---|---|---|
| HORIZONTAL STROKE1 | 8 | 14 | (10, 18) |
| HORIZONTAL STROKE2 | 8 | 42 | (38, 46) |
| HORIZONTAL STROKE3 | 8 | 62 | (58, 66) |

FIG. 16

| Y COORDINATE 1000 MESH | 80 SUB MESH |
|---|---|
| Y=0 | 0 |
| 0<Y<100 | Y×(10/100) |
| Y=100 | 10 |
| 100<Y<200 | 10+(Y−100)×((18−10)/(200−100)) |
| Y=200 | 18 |
| 200<Y<450 | 18+(Y−200)×((38−18)/(450−200)) |
| Y=450 | 38 |
| 450<Y<550 | 38+(Y−450)×((46−38)/(550−450)) |
| Y=550 | 46 |
| 550<Y<713 | 46+(Y−550)×((58−46)/(713−550)) |
| Y=713 | 58 |
| 713<Y<813 | 58+(Y−713)×((66−58)/(813−713)) |
| Y=813 | 66 |
| 813<Y<1000 | 66+(Y−813)×((80−66)/(1000−813)) |
| Y=1000 | 80 |

FIG. 20A  FIG. 20B  FIG. 20C  FIG. 20D  PIXEL BORDER
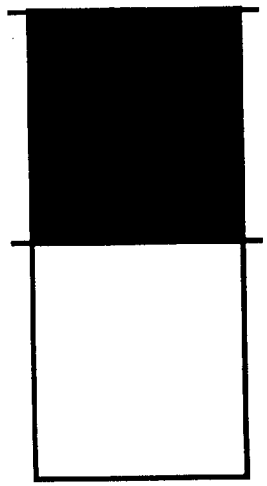 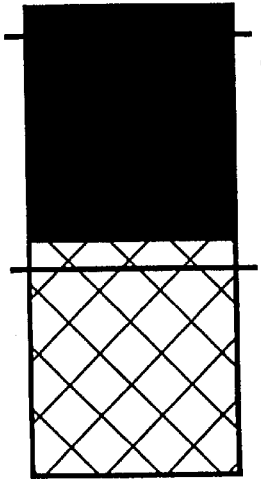 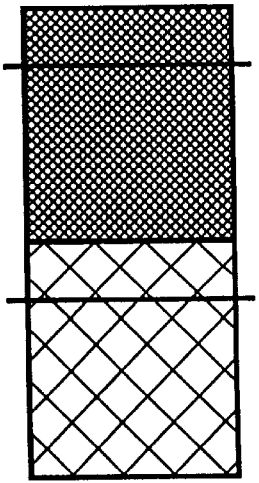 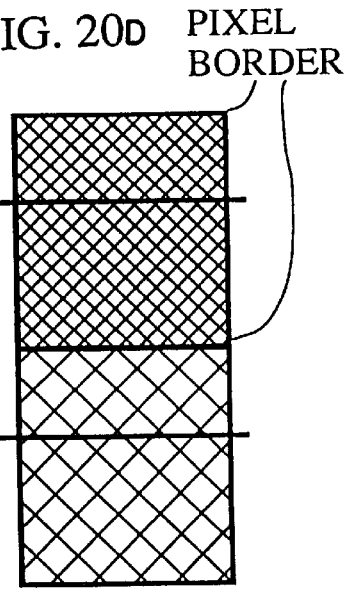
FIG. 20E  FIG. 20F  FIG. 20G  FIG. 20H  PIXEL BORDER
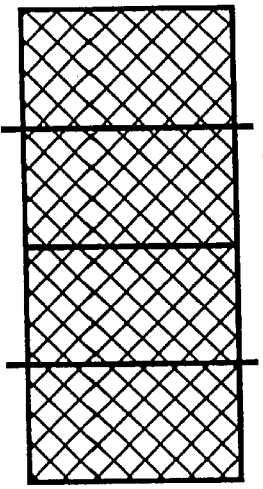 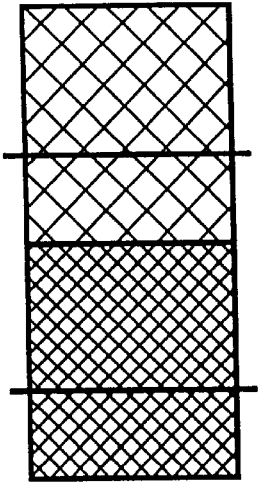 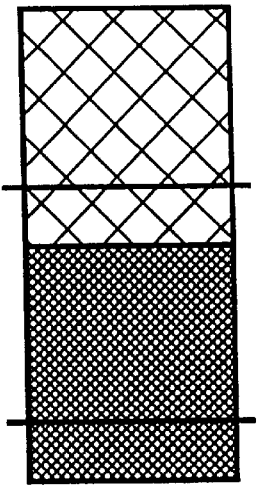 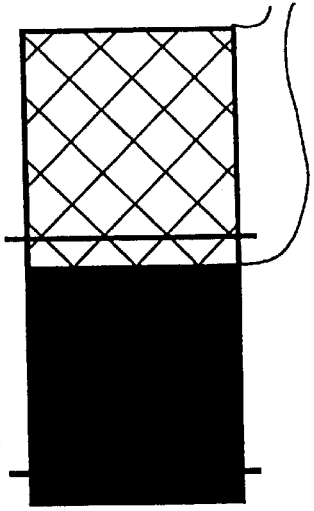
       
0    1    2    3    4    5    6    7

FIG. 24

HORIZONTAL STROKE TABLE (UPPER ROW FOR EACH ENTRY REPRESENTS UPPER LINE LOWER ROW REPRESENTS LOWER LINE)

| NUMBER | | Y COORDINATE | | STROKE WIDTH | | OPPOSING NUMBER | PIXEL VALUE | SUB PIXEL VALUE | POTENTIAL MOVEMENT AMOUNT LIST | | |
|---|---|---|---|---|---|---|---|---|---|---|---|
| | | BEFORE CHANGING POWER | AFTER CHANGING POWER | BEFORE CHANGING POWER | AFTER CHANGING POWER | | | | NO. OF POTENTIAL AMOUNTS | FIRST POTENTIAL AMOUNT M1 | SECOND POTENTIAL AMOUNT M2 |
| 1: | UPPER | 72 | 7 | 95 | 9 | 0 | 0 | 7 | 2 | −1 | +2 |
| | LOWER | 167 | 16 | | | 2 | 2 | 0 | | | |
| 2: | UPPER | 335 | 32 | 95 | 9 | 1 | 4 | 0 | 2 | +1 | −2 |
| | LOWER | 430 | 41 | | | 3 | 5 | 1 | | | |
| 3: | UPPER | 594 | 57 | 85 | 8 | 2 | 7 | 1 | 2 | +1 | −3 |
| | LOWER | 679 | 65 | | | 5 | 8 | 1 | | | |
| 4: | UPPER | 720 | 69 | 85 | 8 | 0 | 8 | 5 | 2 | +1 | −3 |
| | LOWER | 805 | 77 | | | 0 | 9 | 5 | | | |
| 5: | UPPER | 824 | 79 | 85 | 8 | 3 | 9 | 7 | 2 | −1 | +3 |
| | LOWER | 909 | 87 | | | 0 | 10 | 7 | | | |

HORIZONTAL STROKE POSITION INFORMATION

HORIZONTAL STROKE 1 : ( 72, 167, 2)

HORIZONTAL STROKE 2 : (335, 430, 3)

HORIZONTAL STROKE 3 : (594, 679, 5)

HORIZONTAL STROKE 4 : (720, 805, 0)

HORIZONTAL STROKE 5 : (824, 909, 0)

Y COORDINATES OF THE LOWER LINE ⎯⎯⎯⎯⎯⎯⎯⎯⎯⎯⎯⎯⎯⎯⎯⎯⎯⎯⎯⎯⎯⎯⎯⎯
Y COORDINATES OF THE UPPER LINE ⎯⎯⎯⎯⎯⎯⎯⎯⎯⎯⎯⎯⎯⎯⎯⎯⎯⎯⎯⎯⎯⎯⎯⎯
OPPOSING NUMBER ⎯⎯⎯⎯⎯⎯⎯⎯⎯⎯⎯⎯⎯⎯⎯⎯⎯⎯⎯⎯⎯⎯⎯⎯

FIG. 37

| WSP | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|
| L | 2 | 1.5 | 2 | 0.5 | 0 | 3.5 | 3 | 2.5 | 2 | 1.5 | 1 | 0.5 | 0 | 3.5 | 3 | 2.5 | 2 | 1.5 | 1 | 0.5 | 0 |
| 2L | 4 | 3 | 2 | 1 | 0 | 7 | 6 | 5 | 4 | 3 | 2 | 1 | 0 | 7 | 6 | 5 | 4 | 3 | 2 | 1 | 0 |
| U | 2 | 2.5 | 3 | 3.5 | 0 | 0.5 | 1 | 1.5 | 2 | 2.5 | 3 | 3.5 | 0 | 0.5 | 1 | 1.5 | 2 | 2.5 | 3 | 3.5 | 0 |
| 2U | 4 | 5 | 6 | 7 | 0 | 1 | 2 | 3 | 4 | 5 | 6 | 7 | 0 | 1 | 2 | 3 | 4 | 5 | 6 | 7 | 0 |
| WSP%8 | 0 | 1 | 2 | 3 | 4 | 5 | 6 | 7 | 0 | 1 | 2 | 3 | 4 | 5 | 6 | 7 | 0 | 1 | 2 | 3 | 4 |
| (WSP+4)%8 | 4 | 5 | 6 | 7 | 0 | 1 | 2 | 3 | 4 | 5 | 6 | 7 | 0 | 1 | 2 | 3 | 4 | 5 | 6 | 7 | 0 |
| 7−WSP%8 | 7 | 6 | 7 | 7 | 7 | 2 | 1 | 0 | 7 | 6 | 5 | 4 | 3 | 2 | 1 | 0 | 7 | 6 | 5 | 4 | 3 |
| 7−(WSP+3)%8 | 4 | 3 | 2 | 1 | 0 | 7 | 6 | 5 | 4 | 3 | 2 | 1 | 0 | 7 | 6 | 5 | 4 | 3 | 2 | 1 | 0 |

| STROKE WIDTH Wsp | STROKE UPPER LINE U | |
|---|---|---|
| | WHEN INCORPORATED WITHIN ONE PIXEL (MOVEMENT UNNECESSARY) | WHEN STROKE TRAVERSES 2 PIXELS (MOVEMENT NECESSARY) |
| 4 | U=4~7<br>U=0<br><br>(M1=0) | U=1 (M1=−1, M2=+3)　　U=2 (M1=−2, M2=+2)　　U=3 (M1=+1, M2=−3) |
| 3 | U=3~7<br>U=0<br><br>(M1=0) | U=1 (M1=−1, M2=+2)　　U=2 (M1=+1, M2=−2) |
| 2 | U=2~7<br>U=0<br><br>(M1=0) | U=1 (M1=−1, M2=+2) |
| 1 | ALL<br><br>(M1=0) | |

FIG. 45A
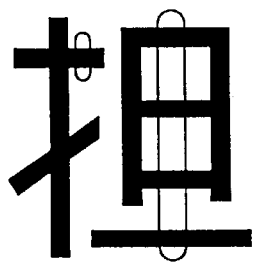
FIG. 45B          FIG. 45C          FIG. 45D
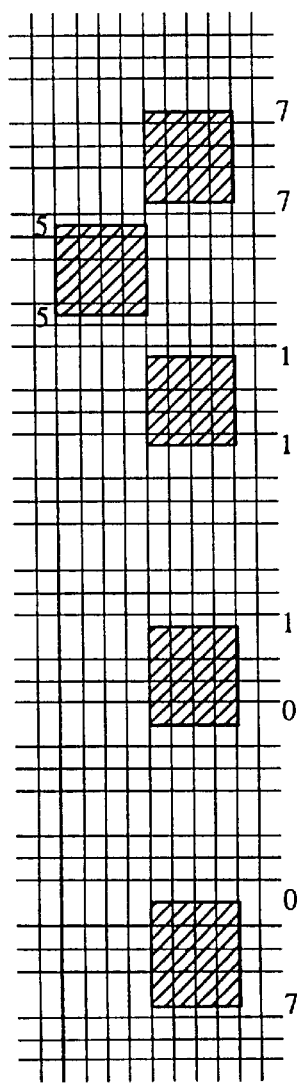 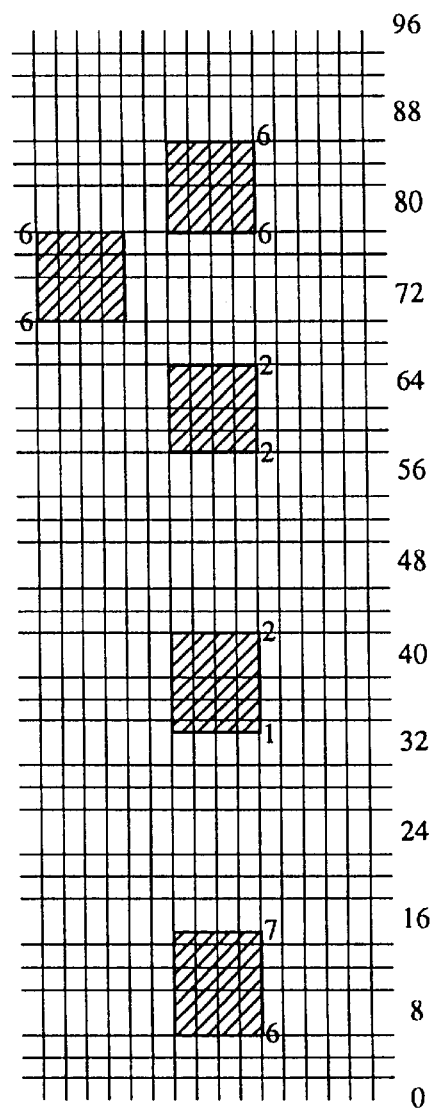 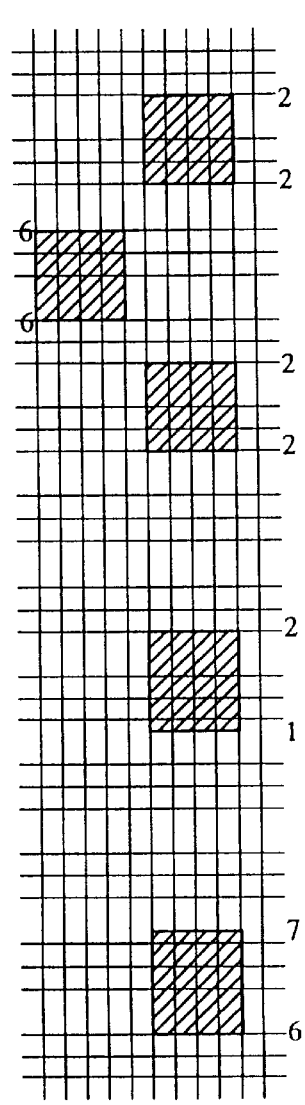

← HORIZONTAL STROKE 6
← HORIZONTAL STROKE 5
← HORIZONTAL STROKE 4

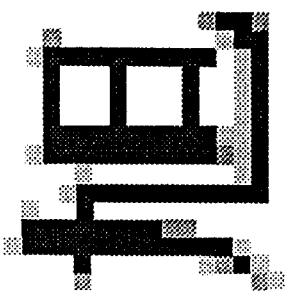
FIG. 49E
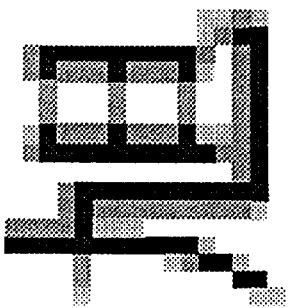
FIG. 49J
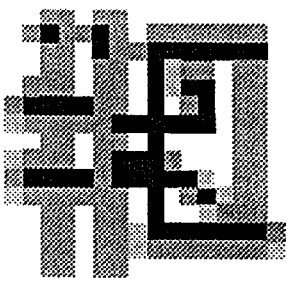
FIG. 49D
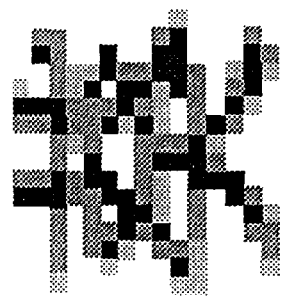
FIG. 49I
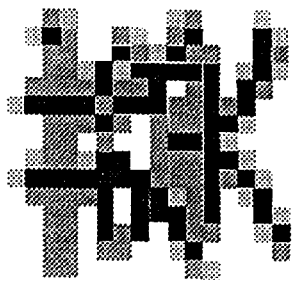
FIG. 49C
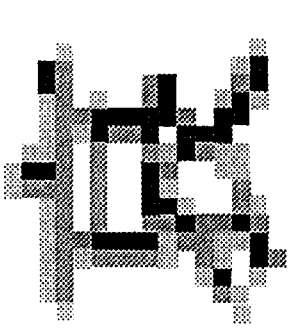
FIG. 49H
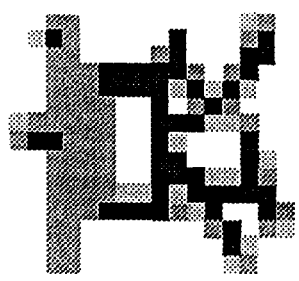
FIG. 49B
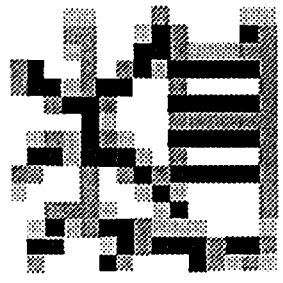
FIG. 49G
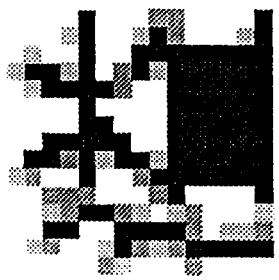
FIG. 49A
FIG. 49F

FIG. 52

| PIXEL | 1 | 2 | 3 | 4 | 5 | 6 | 7 | 8 | 9 | 10 |
|---|---|---|---|---|---|---|---|---|---|---|
| PERMITTED RANGE | 1 | 9 | 17 | 25 | 33 | 41 | 49 | 57 | 65 | 73 |
| 1/4 PIXEL BORDER | 2 | 10 | 18 | 26 | 34 | 42 | 50 | 58 | 66 | 74 |
| PERMITTED RANGE | 3 | 11 | 19 | 27 | 35 | 43 | 51 | 59 | 67 | 75 |
| PERMITTED RANGE | 5 | 13 | 21 | 29 | 37 | 45 | 53 | 61 | 69 | 77 |
| 3/4 PIXEL BORDER | 6 | 14 | 22 | 30 | 38 | 46 | 54 | 62 | 70 | 78 |
| PERMITTED RANGE | 7 | 15 | 23 | 31 | 39 | 47 | 55 | 63 | 71 | 79 |

FIG. 55

| | PIXEL | 1 | 2 | 3 | 4 | 5 | 6 | 7 | 8 | 9 | 10 |
|---|---|---|---|---|---|---|---|---|---|---|---|
| STROKE 1 | PERMITTED RANGE | 1 | 9 | 17 | 25 | 33 | 41 | 49 | 57 | 65 | 73 |
| | 1/4 PIXEL BORDER | 2 | 10 | 18 | 26 | 34 | 42 | 50 | 58 | 66 | 74 |
| | PERMITTED RANGE | 3 | 11 | 19 | 27 | 35 | 43 | 51 | 59 | 67 | 75 |
| STROKE 3 | PERMITTED RANGE | 5 | 13 | 21 | 29 | 37 | 45 | 53 | 61 | 69 | 77 |
| | 3/4 PIXEL BORDER | 6 | 14 | 22 | 30 | 38 | 46 | 54 | 62 | 70 | 78 |
| | PERMITTED RANGE | 7 | 15 | 23 | 31 | 39 | 47 | 55 | 63 | 71 | 79 |
| STROKE 2 | 1/4 PIXEL BORDER | 2 | 10 | 18 | 26 | 34 | 42 | 50 | 58 | 66 | 74 |
| | 3/4 PIXEL BORDER | 6 | 14 | 22 | 30 | 38 | 46 | 54 | 62 | 70 | 78 |

HORIZONTAL STROKE POSITION INFORMATION

HORIZONTAL STROKE1 : ( 72, 167, 350, 900)

HORIZONTAL STROKE2 : (335, 430, 500, 800)

HORIZONTAL STROKE3 : (594, 679, 500, 800)

HORIZONTAL STROKE4 : (720, 805, 100, 360)

HORIZONTAL STROKE5 : (824, 909, 500, 800)

GRAY SCALED DATA GENERATING DEVICE WHICH BALANCES WIDTH AND SHADE OF STROKES BY REPOSITIONING THEIR CENTER LINE TO A PREDETERMINED DISTANCE FROM PIXEL BORDER

BACKGROUND OF THE INVENTION

1. Field of the Invention

The present invention relates to a gray scaled data generation device for generating gray scaled data from outline data, such as characters and graphics.

2. Description of the Related Art

It has become increasingly important in recent years to provide information processing devices, such as personal computers, electric notebooks, portable information apparatuses, and game consoles, with a character display function for setting character size, typeface, character decoration and the like.

In general, computer displays have lower resolutions than printers This difference in resolution means that binary data of black and white cannot be shown on a display at the same high quality as is possible with a printed output. When using a display, this results in the outlines of characters and images being jagged and an inability to display very precise images on such display equipment. Here, on display equipment which is capable of displaying black, white and intermediate tones (shades of gray), the detrimental effects of low resolution can be somewhat compensated by using black, white and gray pixels, resulting in an improvement in image quality. Such gray scaled data represented by black, white or intermediate tones can be generated using a common technique known in the field of computer graphics as antialiasing.

Conventional methods generate gray scaled data by first generating a black and white binary image from outline information which includes the outline data for characters and images, said image which corresponds to a number of pixels for a desired size here being enlarged in the horizontal and vertical planes by a integer multiplier. The shade of each pixel is then set according to the number of black subpixels included in a given unit area of the generated binary image (one pixel multiplied by an integer).

FIG. 3 is a function block diagram showing the construction of a conventional gray scaled date generation device. It is composed of outline information expansion/reduction unit 201 and gray scaled data generation unit 202. Gray scaled data generation unit 202 is further made up of binary data generation unit 301 and gradation value calculation unit 302.

The following is an explanation with reference to FIGS. 3 through 11A–11C of the operation of the conventional gray scaled data generation method and device constituted as described above.

FIGS. 4 and 5A and 5B are examples of outline information and stroke position information included in outline data of a character and image. In this example, the Chinese character "三" "SAN" meaning "three" is expressed by a set of lines in a 1,000 by 1,000 coordinate system (which is hereinafter referred to as 1,000 mesh). In this example, the outline information is composed of three outlines and is expressed by the coordinated of the corner points of each outline. By joining the point indicated by these coordinates, the outlines for each line constituting the character can be displayed In this example, the last coordinate point is automatically joined with the starting coordinate point. It should be noted here that such Chinese characters often feature secondary curved lines and tertiary curved lines in addition to straight lines.

The position information of the three horizontal strokes (called "horizontal stems" in the case of a character) is stored as stroke position information. In this example, a pair of Y coordinate values of a lower line and an upper line of a horizontal stroke is stored. The width of a horizontal stroke can be obtained by subtracting the Y coordinate value of the lower line from that of the upper line. In this example, the width of each horizontal stroke is 100. It is possible here for information to be stored in other ways, such as storing a Y coordinate value of the lower line and stroke width as horizontal stroke information, and adding them to the outline information as attributes of coordinates. If vertical strokes exist, vertical stroke information is stored in the same way. This stroke position information is generally referred to as hint information, which is used to keep the width of the stroke consistent after expansion/reduction.

The following is an explanation of the generation of gray scaled data composed of 10 by 10 pixels for one character (10 by 10 making a total of 100 pixels) using the outline data.

Outline information expansion/reduction unit 201 expands/reduces outline data, enlarging the number of pixels of the desired size in the horizontal and vertical planes by a integer multiplier. In this example, the desired size is 10 by 10 pixels, If the multiplier rate is set to 8 in each axes, outline information of the outline data of 1,000 mesh is reduced to that of 80 (10*8) mesh. It should be clear here that other multipliers may be used.

The reason integer multiplication is used is explained as follows. When the desired size is 10 by 10 pixels, outline information of the outline data of 1,000 mesh is reduced to 10 mesh. However, in order to generate gray scaled data, a gradation value of each pixel has to be decided. Accordingly, each pixel is divided and the proportion of the black component part of the pixel is obtained, with the gradation level then being decided according to this proportion. As one example, if each side of a pixel is divided by eight, one pixel can be divided into 64 small pixels. Here, the mesh which divides one pixel is referred to as a "submesh", a divided small pixel in referred to as a "subpixel", a border between pixels is referred to as a "pixel border", a border between subpixels is referred to as a "subpixel border", a point of intersection of subpixel borders is referred to as a "grid" (the four corners of each pixel), and a point of intersection of subpixel borders is referred to as a "subgrid" (the four corners of each subpixel). In FIG. 6, pixels are shown divided into subpixels with thick lines representing pixel borders and thin lines representing subpixel borders. In this example, one side of a pixel is divided into 8, so that each pixel is divided into 64 subpixels. Expanding/reducing outline data by subdividing pixels in a character of the desired size by 8 in both axes corresponds to transforming the outline date into a coordinate system represented by submeshes (subpixels). In this example, 1,000 mesh data is reduced to 80 submesh (10 mesh) data.

FIG. 7 shows outline information of outline data reduced to 80 submesh. If a simple reduction is carried out, the width of the three horizontal strokes in the character "三" "SAN" may not be equal due to quantization error. However in this example, stroke width is kept equal due to the execution of what is called "hint processing", which uses stroke position information to keep the stroke width consistent In this example, the width of the three strokes are all 100 in 1,000 mesh, before reduction to eight in the 80 subminsh (eight subpixel width) which is determined by 100*80/1000=8. It should be noted here that hint processing is widely used to improve quality when binary data is generated from an outline font. Without hint processing, stroke width becomes inconsistent, thereby spoiling the appearance of the displayed character.

Binary data generation unit 301 generates binary image data from the outline information of the outline data which is expanded/reduced by outline information expansion/reduction unit 201. FIG. 8 shows binary data of 80 by 80 subpixels generated from outline information of the reduced outline data in FIG. 7.

Gradation value calculation unit 302 generates gray scaled image data, calculating gradation value of each pixel from the binary data generated by binary data generation unit 301. If one pixel is divided by eight in each axis, one pixel of the final gray scaled image data is represented by 64 subpixels. Gradation value calculation unit 302 calculates a gradation value for one pixel of the final gray scaled image data based on the number out of the 64 subpixels which are black, using this as the final gradation value of that pixel. In case of generating gray scaled image data of eight shades, a gradation value is calculated by dividing the number of black subpixels in one pixel by eight, corresponding to gradation values from 0–7 (if the number of black subpixel is 64, gradation value is still set at 7). Gradation value 0 represents white, gradation values 1–6 represent middle tones (the greater the value, the darker the shade), and gradation value 7 represents black. FIG. 9 shows gray scaled image data generated by binary data of 80 by 80 subpixels in FIG. 8.

In the conventional art, even if there is consistency in width of horizontal/vertical strokes in outline information of the outline data after expansion/reduction, their appearance on display differs depending on the position of the strokes, which can spoil the appearance of the character.

In FIGS. 7 and 8, the three horizontal strokes are of equal width at 8 subpixels. However, the positions of the three horizontal strokes inside pixels ore different from each other. In FIGS. 10A, 10B, and 10C an enlargement of how three horizontal strokes are positioned is shown, with left portion representing the top stroke (horizontal stroke 3), the middle portion representing the middle stroke (horizontal stroke 2); and the right portion representing the bottom stroke (horizontal stroke 1) The upper line of the top stroke is on the seventh subpixel border from the top (so that the stroke only fills ⅛ of the pixel), the upper line of the middle stroke is on the fourth subpixel border from the top (so that the stroke fills half the pixel); and the upper line of the bottom stroke falls exactly on the pixel border (so that the stroke fills the pixel). FIGS. 11A, 11B, and 11C are grey scaled data corresponding to the three strokes in FIGS. 10A, 10B, and 10C.

In the right portion, horizontal stroke 1 is too clearly drawn and so looks thin on display. Since there are no middle tones, the presence of other strokes such as curved lines or slanting lines will result in inconsistency between the thickness of lines. In the middle portion, horizontal stroke 2 looks too faint and wide on display, as if blurred. As shown in this figure, strokes positioned differently on the submeshes end up being displayed using different gradation tones. Therefore the three strokes look different in the gray scaled data in FIG. 9 resulting in inconsistent stroke width on a low-resolution display or liquid crystal panel. When there are two strokes of different widths in the data, there have even been cases with conventional techniques whereby the stroke which should look thicker looks thinner than the other on the display. If hint processing is not carried out to keep stroke width consistent, there can be further deterioration in the shape of the character on the display.

This example has focused on binary data in which one pixel is divided into 64 subpixels (8 by 8submesh). It is also possible for the pixel to be divided into 256 subpixels (16 by 16 submesh) so that more accurate grey scaled data can be generated. However, this does not solve the above mentioned problems.

SUMMARY OF THE INVENTION

It is an object of the present invention to provide a gray scaled data generation device capable of generating gray scaled data from outline data like characters and figures, with a stroke width and darkness of shade being consistent, resulting in balanced display.

This object can be achieved by a gray scaled data generation device which generates characters and figures of a size which is a fixed number of pixels as gray scaled data, based on outline data which includes outline information which expresses outlines of strokes included in characters and figures and stroke information which shows positions of horizontal and vertical stroke. The gray scaled data generation device has an optimizing unit for optimizing a position of a stroke, said position being in a coordinate system in which the position is expressed in terms of fine pixels given by dividing every pixel of said size in both a horizontal and a vertical direction, by moving a position of a stroke expressed in the stroke information to a position which satisfies certain criteria related to distances from a border of each pixel; an outline generation unit for generating outlines in said coordinate system from the outline information, for each stroke which has had its position optimized; and a gray scaled data generation unit for generating gray scaled data for each pixel unit based on the generated outlines.

According to the configuration above, the optimal arrangement determination unit determines an arrangement position of each stroke, satisfying certain criteria about the distance from each pixel border, outline generation unit generates the outline according to the arrangement position, and gray scaled data generation unit generates gray scaled data. Therefore, as all strokes are arranged with the certain criteria being satisfied, stroke width and darkness of shade is consistent, resulting in high quality of characters or figures on display.

Also the optimizing unit may includes an initial position calculation unit for calculating, for every stroke, a position of a stroke in a coordinate system in which the position is expressed in terms of fine pixels given by dividing every pixel of said size in both a horizontal and a vertical direction, based on a position of each stroke shown in the stroke information; and a position conversion unit for converting a position of each stroke in said coordinate system into an optimal position which satisfies the certain criteria related to distances from a border of each pixel in said coordinate system.

According to the configuration above, an optimal position is determined in a coordinate system of fine pixels given by dividing every pixel in both a horizontal and a vertical direction. This improves accuracy of characters or figures on display.

Also, the position conversion unit may execute position; conversion so that a position of a center line of each stroke is converted so as to be placed on said optimal position.

According to the configuration above, as the optimizing unit determines an optimal position using the coordinates of stroke center line, coordinates of the stroke center line can be set for the optimal position.

Also, the optimal position which satisfies the certain criteria may be a position at a given distance from a horizontal border of a pixel for a horizontal stroke and a position at a given distance from a vertical border of a pixel for a vertical stroke.

According to the configuration above, consistency of the stroke width can be maintained by placing all stroke positions at a given distance from the pixel border.

Also, the optimal position which satisfies the certain criteria may be a position at a given distance from one of an upper and lower edge of a pixel for a horizontal stroke and a position at a given distance from one of a left and right edge of a pixel for a vertical stroke.

According to the configuration above, since there are two positions in each pixel which can be used as the optimal position, the shape of characters or figures con be displayed accurately.

Also, said given distance may be approximately ¼ of a length of an edge of each pixel.

According to the configuration above, since optimal positions exist at equal intervals, the shape of characters or figures can be displayed accurately and a favorable balance between the strokes can be maintained.

Also, the position conversion unit may set a position with a shortest movement distance from an initial stroke position as an optimal position when there are a number of positions which satisfy the certain criteria for a stroke.

According to the configuration above, as the optimal position is a position with a shortest movement distance from the initial stroke positions the shapes of characters or figures can be faithfully reproduced.

Also, the initial position calculation unit may calculate, for each stroke, coordinates of a stroke center line in said coordinate system based on the stroke information, and the position conversion unit may convert said coordinates calculated for a stroke center line to coordinates for the optimal position.

According to the configuration above, the optimal position can be obtained using coordinates of the stroke center line.

Also, the initial position calculation unit may calculate, for each stroke, stroke width and coordinates for one of a stroke upper line and a stroke lower line in said coordinate system based on the stroke information, and the position conversion unit may include:

a relative position calculation unit for calculating a relative position of an optimal position from at least one of an upper line pixel border and a lower line pixel border by performing a given calculation using the calculated stroke width; and a coordinate conversion unit for calculating coordinates which correspond to a relative position which minimizes a movement amount of one of an upper line and a lower line of a stroke and converting coordinates of an initial position of one of an upper line and a lower line of a stroke into said calculated coordinates.

According to the configuration above, relative coordinates of stroke upper or lower line at the optimal position can be calculated based on the stroke width instead of on the position of the stroke center line.

Also, the relative position calculation unit may calculate a remainder left by dividing a total of a stroke width and a given offset in the coordinate system by a division number for dividing each pixel into fine pixels and may calculate at least one relative position as a potential optimal position of one of an upper and a lower line of a stroke based on the remainder.

According to the configuration above, the use of relative coordinates allows single figure numbers to be used for calculation so that a speedier process can be realized.

Also, the coordinate conversion unit may include: a potential position judgement unit for judging which potential optimal position calculated as a relative position minimizes a movement amount of a stroke; and a calculation unit for calculating coordinates of an upper and a lower line of a stroke according to the potential optimal position judged to minimize the movement amount of the stroke.

The position conversion unit may set any position where the stroke is incorporated within a pixel as an optimal position when the stroke width calculated by the initial position calculation unit is below ½ of a length of an edge of a pixel and the stroke is not incorporated within a pixel.

Also, the position conversion unit may set any position where the stroke is incorporated within a pixel as an optimal position when the stroke width calculated by the initial position calculation unit is below a length of an edge of a pixel and the stroke is not incorporated within a pixel.

According to the configuration above, when the stroke width is below ½ or a full length of an edge of each pixel, the optimal position is one of the positions where the stroke is incorporated within one pixel. This prevents strokes of narrow width looking blurred on display, resulting in a clearer display of characters and figures.

Also the optimal position which satisfies certain criteria may be set as a permitted range in a vicinity of a position whose distance from a pixel border is ¼ of a length of an edge of each pixel, and the position conversion unit may set any position within the permitted range as an optimal position.

According to the configuration above, the position conversion unit is capable of determining the optimal arrangement position more flexibly, co that the shape of characters or figures can be displayed more accurately.

The position conversion unit may assign priority to strokes in an order beginning with a stroke having a least number of optimal positions and converts positions according to the order of priority when a number of optimal positions satisfy the certain criteria.

Also the stroke information may include information showing priority of strokes, and the position conversion unit may have a stroke designation unit for designating strokes according the order of priority and may convert stroke positions in order from the designated strokes.

According to the configuration above, the position conversion unit converts positions according to the order of priority, so that key strokes, strokes which form the main structure of the gray scaled data, and strokes whose movement amount should be minimized have their positions converted with highest priority.

The position conversion unit, when it moves a stroke to the optimal position so that a distance to a nearest stroke in a direction of movement is below a given threshold value, may select an optimal position in opposite movement direction which satisfies the certain criteria.

According to the configuration above, small spaces between two strokes are displayed clearly. This prevents two strokes looking as if they were a combined thick stroke.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 5A, amd 5B are examples an example of outline information and stroke position information included in outline data of a character and image;

FIGS. 10A, 10B and 10C show an enlargement of how three horizontal strokes data are positioned;

FIGS. 11A, 11B, and 11C are the gray scaled data corresponding to the three strokes in FIGS. 10A, 10B and 10C;

FIG. 13A and 13B show an example of the stroke center lines and movement directions;

FIG. 15 shows the stroke optimal arrangement positions;

FIG. 16 shows an example of the expansion/reduction method by the outline information expansion/reduction means;

FIGS. 20A–20H show gray scaled data corresponding to FIG. 19A–19H;

FIG. 24 is an example of a stroke table;

FIG. 37 is a table showing how U and L change at an optimal arrangement position along with changes of stroke width $W_{sp}$;

FIG. 43 shows process of determining a first and second potential movement amount according to stroke width $W_{sp}$ and upper line U;

FIGS. 45A–45D show flow horizontal strokes for a Chinese character "担" "TAN";

FIGS. 49A–48J shows examples of generated gray scaled data of 16 by 16 pixel size;

FIG. 52 shows an example of the optimal arrangement standard table of the fourth embodiment when a permitted range is ±1;

FIG. 55 shows an example of the optimal arrangement standard table when the permitted numbers are set based on the stroke width of each stroke in the fifth embodiment;

DESCRIPTION OF THE PREFERRED EMBODIMENTS

FIRST EMBODIMENT

Figure 1A:
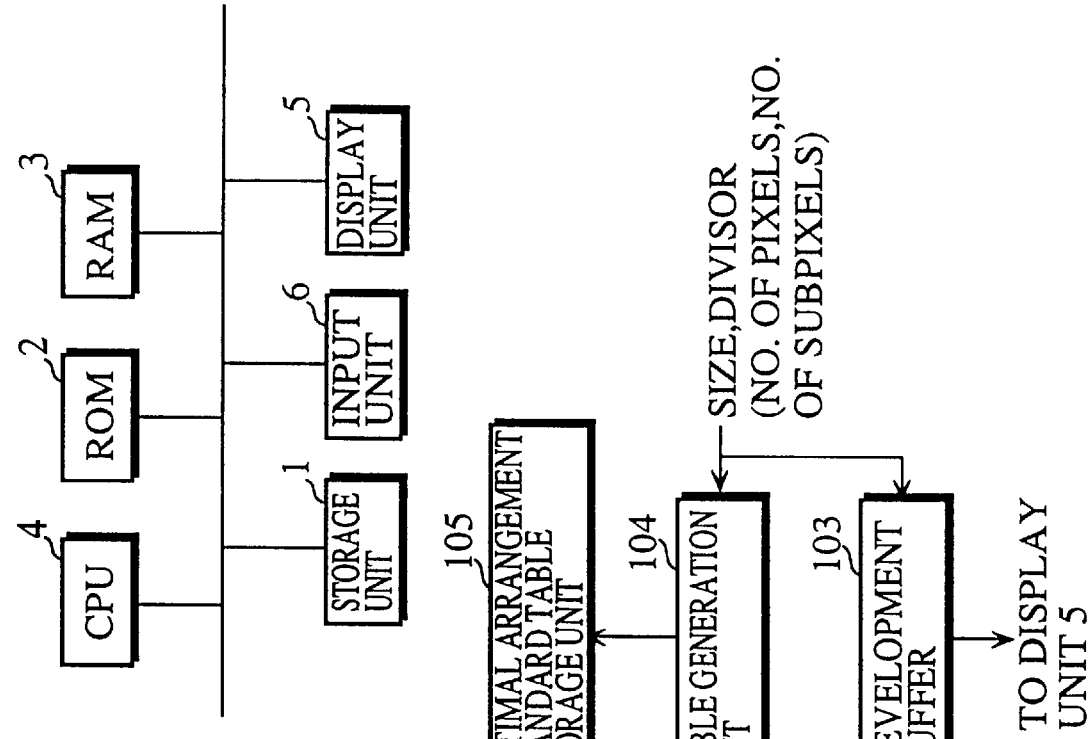
FIGS. 1A and 1B are block diagrams of the gray scaled data generation method and device of the first embodiment of the present invention.

FIG. 1A is a block diagram showing an example hardware configuration of the gray scaled data generation device of the first embodiment of the present invention. The gray scaled data generation device comprises storage unit 1, ROM 2, RAM 3, CPU 4, display unit 5, and input unit 6.

Storage unit 1 is a so-called secondary storage device and is used to store outline data for expressing fonts, as well as various program files and data files.

The main role of ROM 2 is to store the program in which the gray scaled data generation method of the present invention is described.

RAM 3 is a memory into which outline data, programs and data are downloaded from storage unit 1. It is also used as a work area.

CPU 4 executes the program in ROM 2 and so uses the outline data in RAM 3 to generate gray scaled data of a size indicated by either input unit 6 or the program.

Display unit 5 includes a display device capable of displaying gray scaled data which used to display the gray scaled data generated by the present device. Specific examples of display devices include liquid crystal display panels, CRTs and the like.

Input unit 6 receives indications from the user, such as character size designation and the like.

Figure 1B:
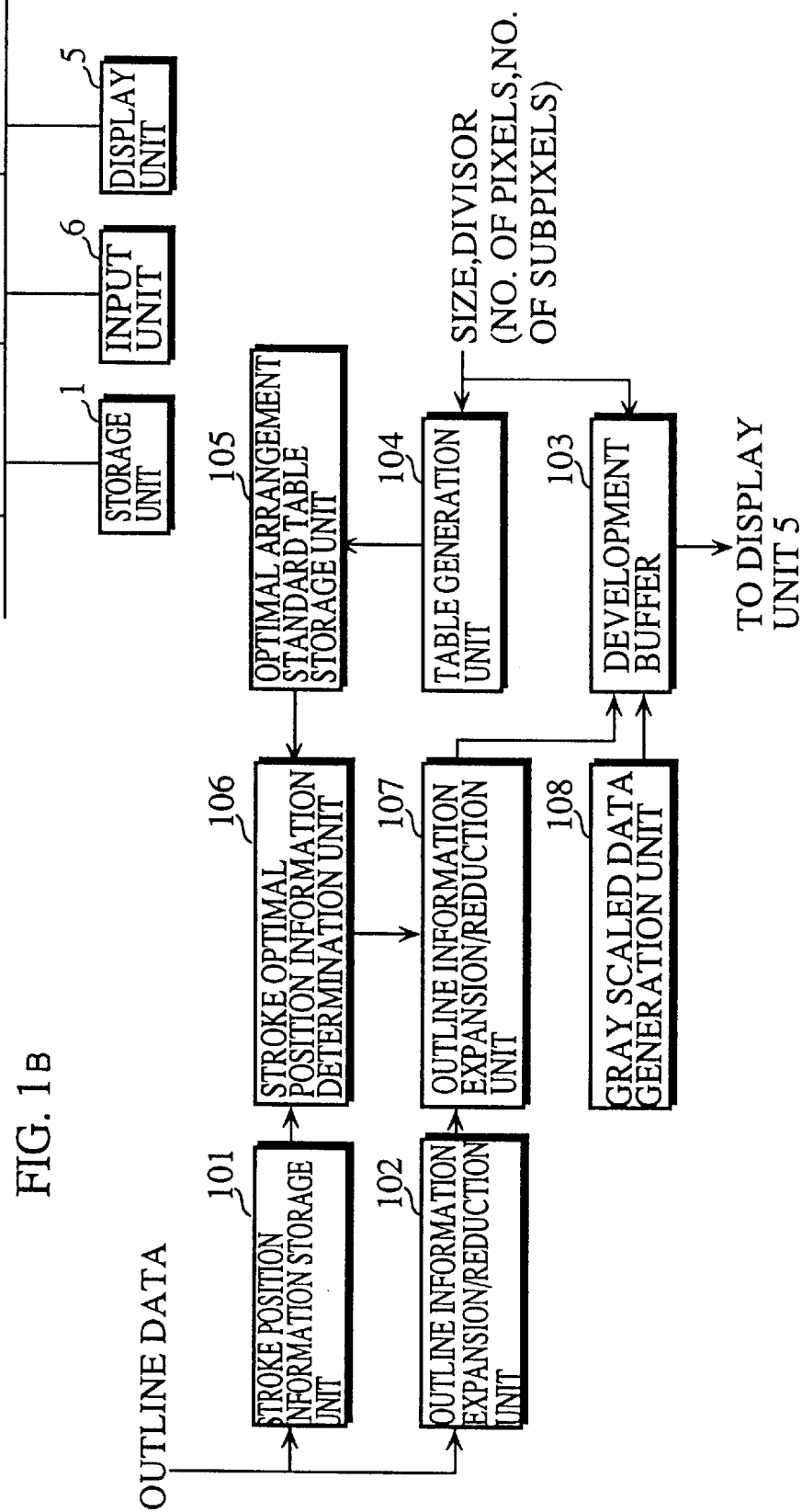

FIG. 1B is a function block diagram showing the gray scaled data generation device realized by CPU 4 executing the program stored in ROM 2 of FIG. 1B. This gray scaled data generation device comprises stroke position information storage unit 101, outline information storage unit 102, development buffer 103, table generation unit 104, optimal arrangement standard table storage unit 105, stroke optimal arrangement position information determination unit 106, outline information expansion/reduction unit 107, and gray scaled data generation unit 108. The relation with FIG. 1A is explained as follows: stroke position information storage unit 101, outline information storage unit 102 and optimal arrangement standard table storage unit 105 are made up of storage areas in RAM 3, while the other units are realized by CPU 4 executing the program stored in ROM 2.

Figure 4:
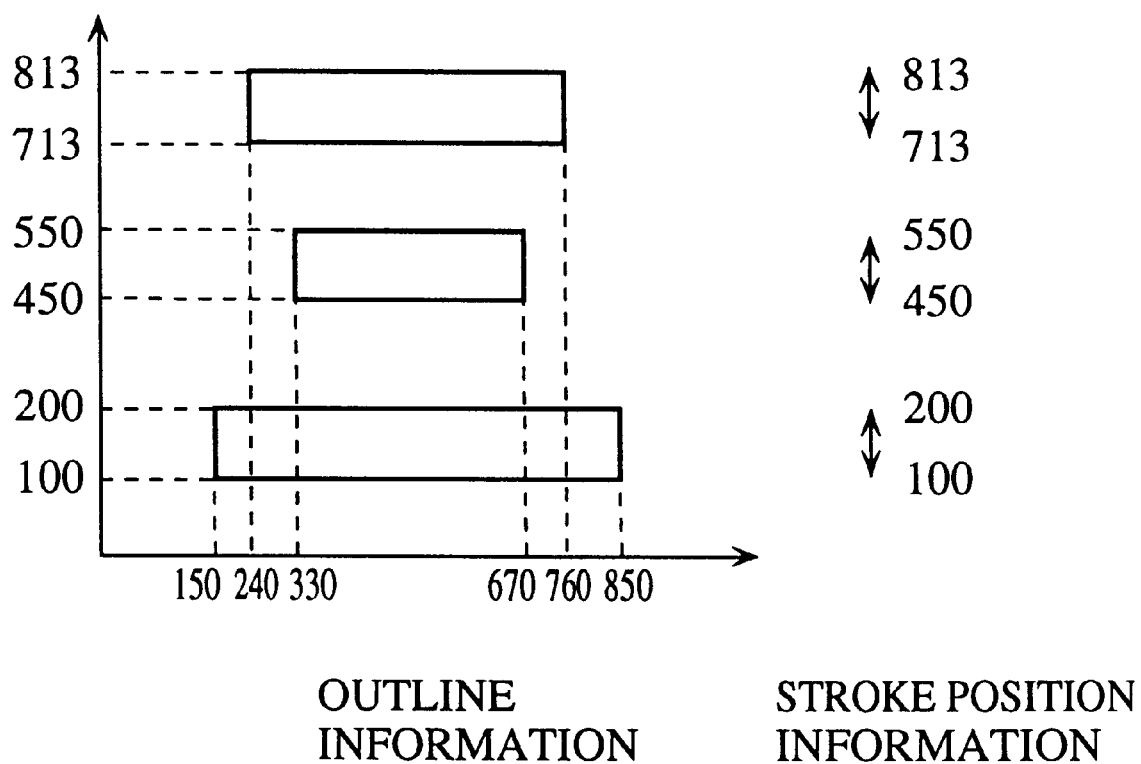
FIG. 4 is an example of outline information and stroke position information included in outline data of a character and image.
Figure 6:
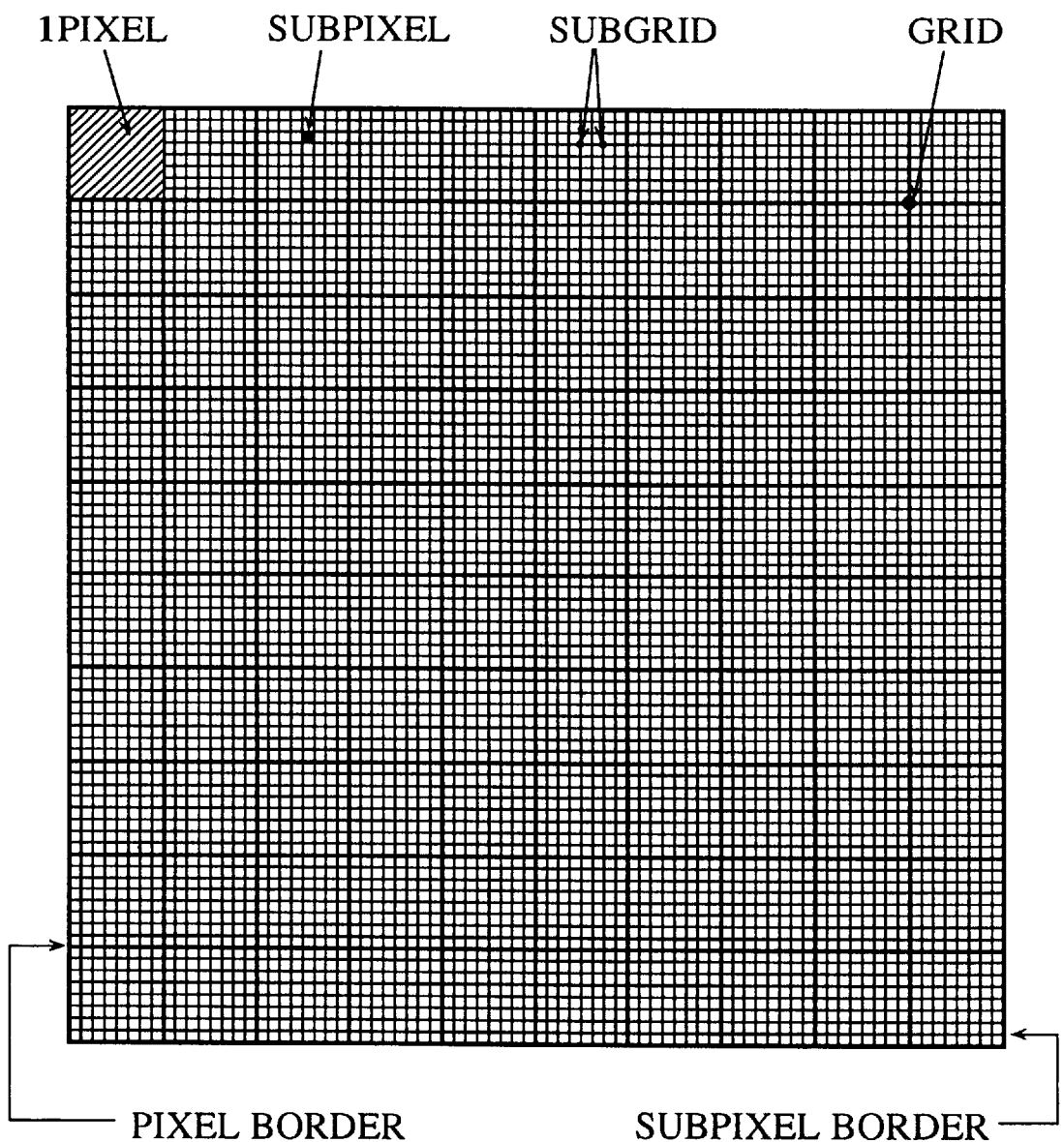
FIG. 6 shows pixels divided into subpixels with thick lines representing pixel borders end thin lines representing subpixel borders.
Figure 7:
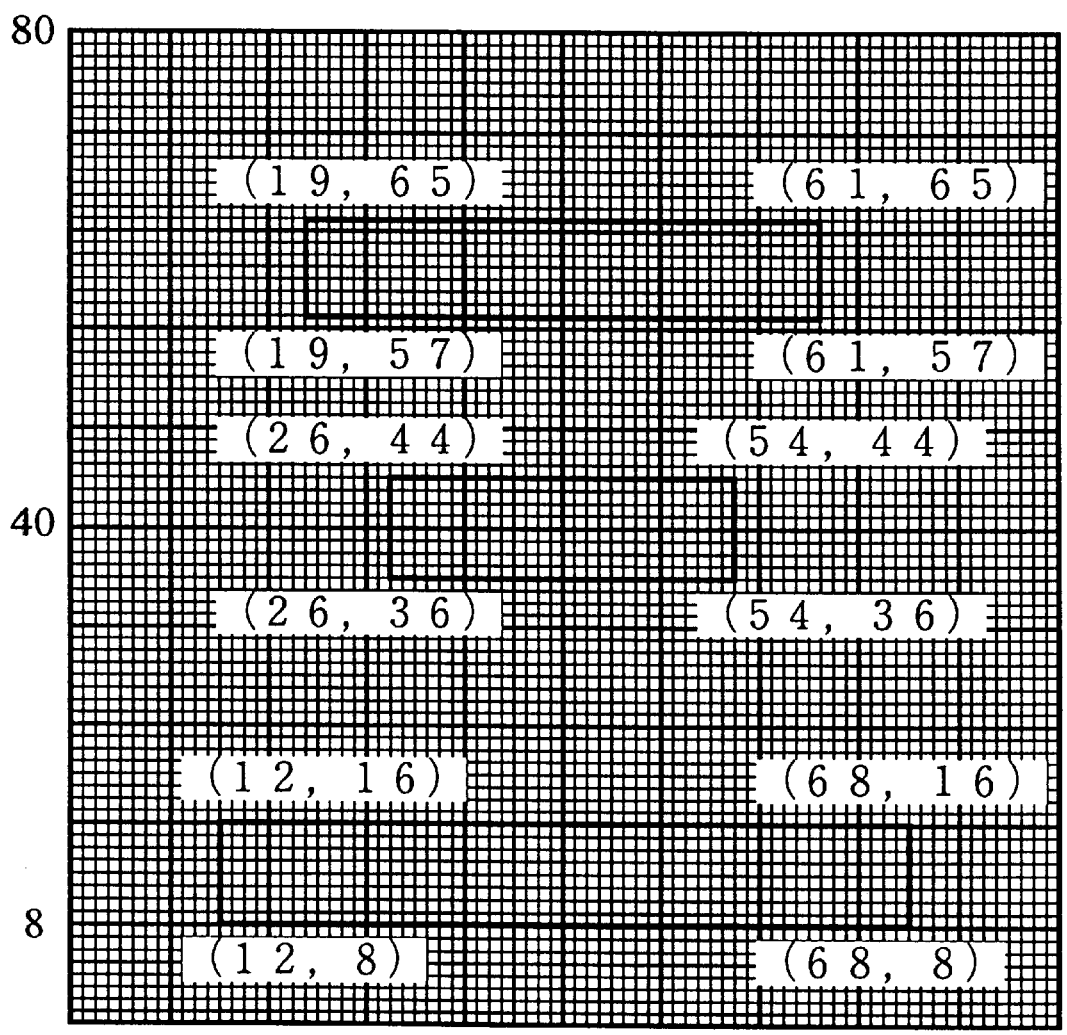
FIG. 7 shows the outline information of outline data reduced to 80 submesh.
Figure 8:
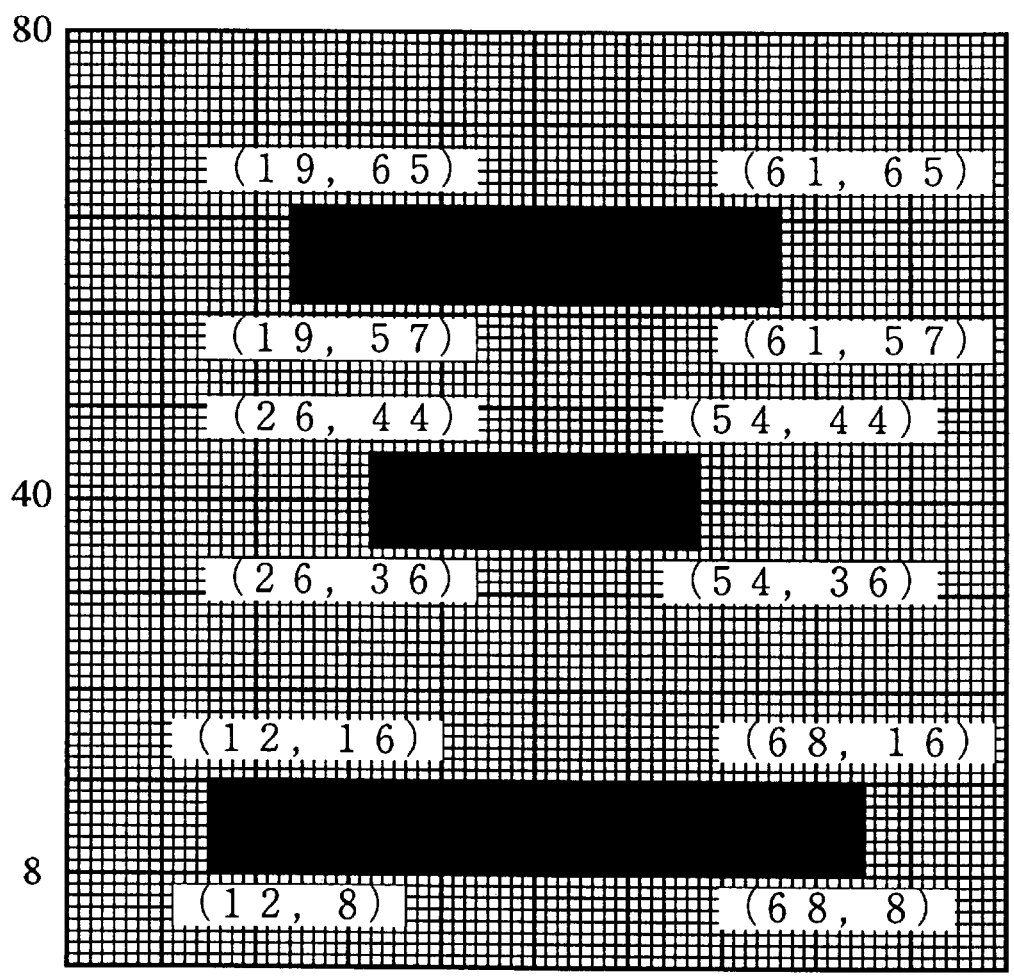
FIG. 8 shows binary data of 80 by 80 subpixels generated from outline information of the reduced outline data in FIG. 7.
Figure 9:
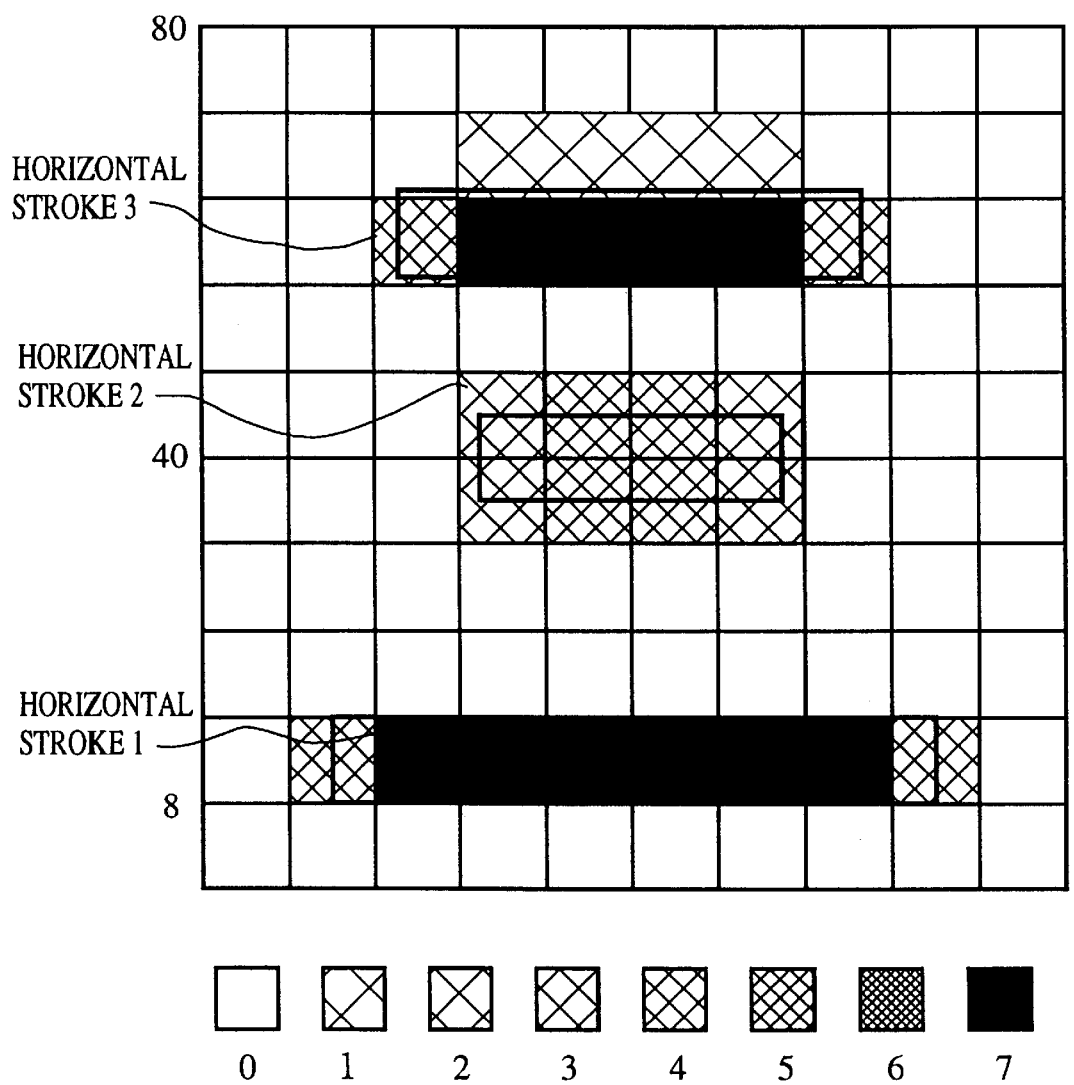
FIG. 9 shows the gray scaled image data generated by binary data of 80 by 80 subpixels in FIG. 8.

As shown in FIG. 1B, stroke position information storage unit 101 stores the stroke position information in the outline data about a character or image to be displayed on the screen. In this first embodiment, outline data includes stroke position information and outline information which are expressed in 1,000 mesh. Stroke position information is expressed as a pair of Y coordinates of an upper and lower line (edge) for a horizontal stroke and as a pair of X coordinates of a left and right line (edge) for a vertical stroke. For the case of the outline data for representing the Chinese character "三" "SAN" in Gothic script shown in FIG. 4, stroke position information storage unit 101 stores a pair of Y coordinates ($L_n$, $U_n$) for each horizontal stroke n (n=1–3), these pairs being shown in FIGS. 5A and 5B.

Outline information storage unit 102 stores outline information about a character or image to be displayed on the screen. Outline information is expressed by a plurality of pairs of coordinates for the corner points of the outline. In the case of the outline data for expressing the character "三" "SAN" in Gothic script in FIG. 4, this unit 102 stores a plurality of coordinates of outlines 1–3 as outline information, this outline information being shown in FIGS. 5A and 5B.

Development buffer 103 temporarily stores outline data which is developed in the process of generating gray scaled data. Specifically, development buffer 103 has areas for storing a total number of pixels which corresponds to the desired size of character and the subpixel unit which is determined by a divisor showing how finely pixels are divided into subpixels. In order to generate gray scaled data, outline data should be expanded/reduced into a submesh coordinate system. In the present embodiment, the desired size is 10 by 10 pixels, and the divisor is eight. In this case, 64 subpixels (8 by 8 subpixels) correspond to one pixel in the final gray scaled data, with one character in the gray scaled data being developed using a coordinate system of 80 by 80 submesh. It should be clear here that other divisors may be used.

Table generation unit 104 finds potential optimal positions at which horizontal/vertical strokes can be placed in a submesh coordinate system according to the desired size (a number of pixels) and number of subpixels, and stores these potential optimal positions in optimal arrangement standard table storage unit 105. Potential optimal positions are used as standards when stroke center lines are moved and arranged by stroke optimal arrangement position information determination unit 106. In Embodiment 1, the ¼ and ¾ subpixel borders are the optimal arrangement positions. In this case, table generation unit 104 finds all the coordinates of the ¼ and ¾ subpixel borders and stores them in optimal arrangement standard table storage unit 105.

Figures 2, 3:
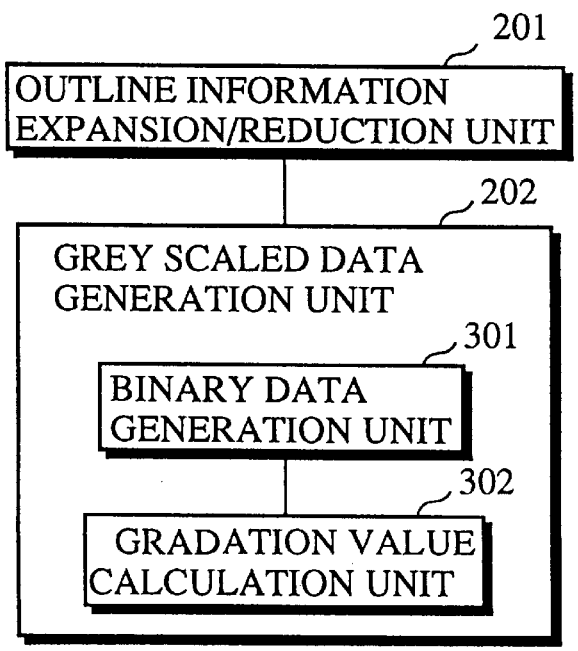
FIG. 2 is an example of an optimal arrangement standard table of the first embodiment.
FIG. 3 is a function block diagram showing the construction of a conventional gray scaled data generation device.

Optimal arrangement standard table storage unit 105 stores the potential optimal positions which are generated by table generation unit 104 in the form of a table (hereinafter called the optimal arrangement standard table), an example of which is shown in FIG. 2. FIG. 2 shows the relation of pixel positions in a 10 by 10 mesh coordinate system and the coordinates of the vertical ¼ and ¾ subpixel borders in a 80 by 80 submesh coordinate system. A table of horizontal ¼ and ¾ subpixel borders and pixel positions can be stored in the same manner.

Stroke optimal arrangement position information determination unit 106 refers to optimal arrangement standard table storage unit 105 and determines stroke optimal arrangement position after expansion/reduction for each stroke included in stroke position information storage unit 101.

Figure 12:
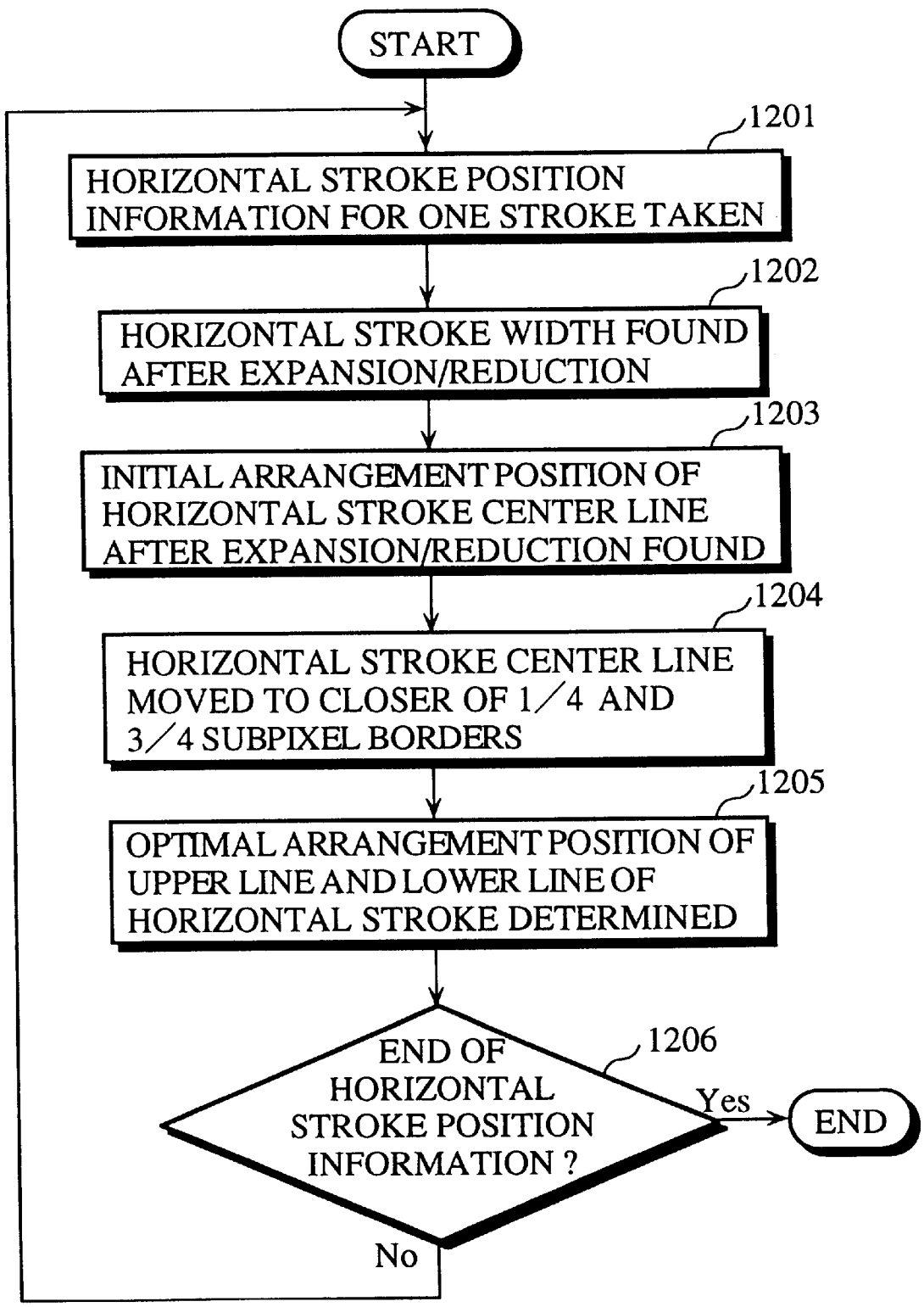
FIG. 12 is a flowchart for the stroke optimal arrangement position determination process of the first embodiment of the present invention.

FIG. 12 is a flowchart for the processing of horizontal strokes by stroke optimal arrangement position determination unit 106. Processing for vertical strokes is the same.

Stroke optimal arrangement position information determination unit 106 first takes a pair of Y coordinates which indicate the upper and lower lines of a stroke from the stroke position information stored in the stroke position information storage unit 101 (Step 1201). For the case of the outline data in FIGS. 4, 5A and 5B, the position information (100, 200), (450, 550), (713, 813) for three strokes is stored. The width of each horizontal stroke is 100. First, the position information (100, 200) is taken.

Next, this unit 106 obtains stroke width after expansion/reduction from the following formula (Step 1202).

Formula 1

$$W_{sp}=(U_n-L_n)*N_p*N_{sp}/N_{org}$$

Here, $W_{sp}$ represents stroke width after expansion/reduction, $(U_n-L_c)$ represents original stroke width, $N_p$ represents a number of pixels for the desired size, $N_{sp}$ represents a number of subpixels on one side of one pixel and $N_{org}$ is a coordinate system size of original outline data. For this example, if the stroke position information is (100, 200), stroke width after expansion/reduction is determined as follows: 100*10*8/1000=8. Thin "8" is stroke width after expansion/reduction with the unit being submesh (subpixel). If all the stroke widths are the same at the beginning, they will be the same after expansion/production, so that differences in stroke width do not occur due to quantization error during calculation. In this example, the width of each horizontal stroke is 100 at the beginning, so the each stroke is of equal width of 8 subpixels after expansion/reduction. This width is used in hint processing to keep the thickness of the strokes consistent.

Stroke optimal arrangement position information determination unit 106 obtains initial arrangement position (Y coordinate) of a stroke center line after expansion/reduction from the following formula.

Formula 2

$$C_{ini}=((U+L)/2)*N_p*N_{sp}/N_{org}$$

Here, $C_{ini}$ represents Y coordinate of the initial arrangement position, $(U+L)/2$ represents an original stroke center line (in 1,000 mesh), and $N_p*N_{sp}$ represents a size of a submesh coordinate system of the desired size. For the example when the position of a center line of the first horizontal stroke (100, 200) is 150 in a 1,000 mesh coordinate system, the initial arrangement position will be 12, obtained from 150*80/1,000, when the character is reduced to an 80 submesh coordinate system. This "12" corresponds to central subgrid border of the second pixel from the bottom. Here, the value of $C_{ini}$ obtained from the above formula does not necessarily have to be integer, and so can also be a decimal.

Next, stroke optimal arrangement position determination unit 106 refers to the optimal arrangement standard table storage unit 105 and moves the stroke center line to the closer of the ¼ or ¾ subpixel border and setting the position moved to as the optimal arrangement position $C_{opt}$ (Step 1204). If the distance to ¼ and ¾ subpixel borders is the same, unit 106 moves the stroke center line in the same direction as the preceding (neighboring) horizontal stroke. If there is no preceding horizontal stroke or if the preceding horizontal stroke was not moved, unit 106 can move the center line to either of the ¼ and ¾ subpixel borders. If as in the example shown in FIGS. 13A and 13B, the initial position $C_{ini}$ is the center of the pixel (in other words, on the ½ subpixel border), then the movement distance to either the ¼ or ¾ subpixels borders is the same at 2 subpixel width. In this situation, the stroke may be moved to either the ¼ or ¾ subpixel borders if there is no preceding stroke. In the illustrated example, the stroke is moved to the ¾ subpixel border. (Here, if the comparison of distance is executed using a higher degree of accuracy than the subpixel unit, more accurate judgement can be made)

In addition to the above process, stroke optimal arrangement position decision unit 106 determines arrangement position of stroke upper and lower lines according to the following formulas, using stroke width $W_{sp}$ which is obtained in Step 1202 and optimal arrangement position $C_{opt}$ of the stroke center line which is determined in Step 1204. (Step 1205).

Formula 3

$$U_{opt}=C_{opt}+W_{sp}/2$$

Formula 4

$$L_{opt}=U_{opt}-W_{sp}$$

Figure 14:
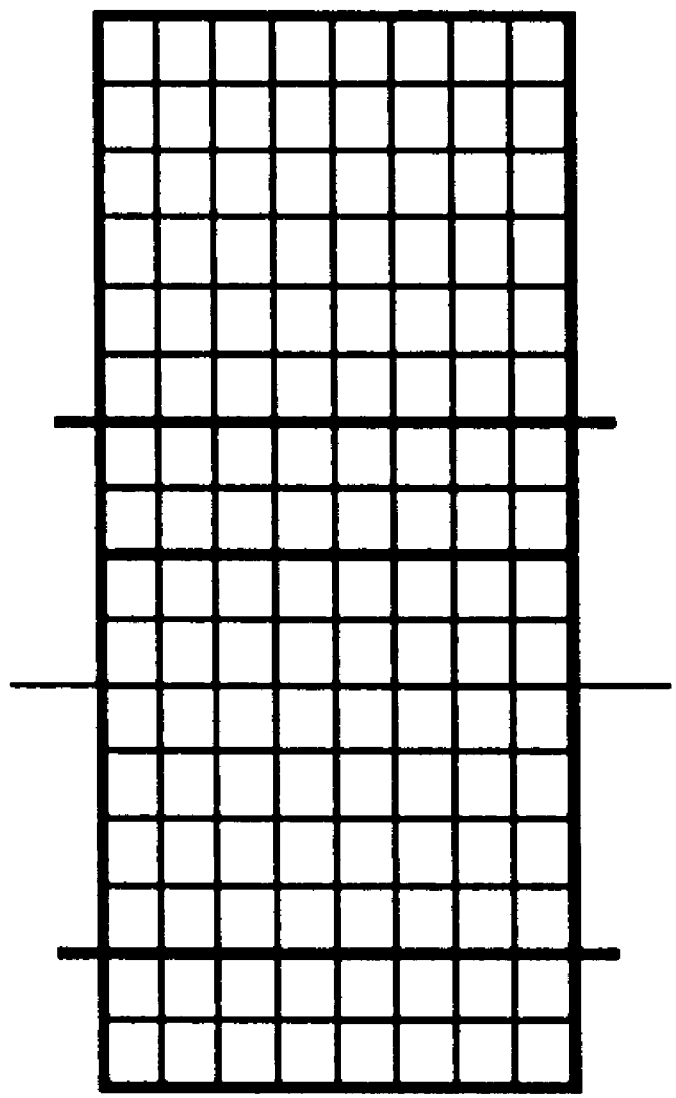
FIG. 14 shows the positions of a lower line and an upper line of a stroke after movement.

Here, $U_{opt}$ represents position of stroke upper line and $L_{opt}$ represents position of stroke lower line. According to formula 3, stroke optimal arrangement position determination unit 106 adds half of stroke width $W_{sp}$ to stroke center line arrangement position $C_{opt}$ and determines position $U_{opt}$ by quantization so that the stroke upper line falls exactly on the subgrid. According to formula 4, this unit 106 determines lower line position $L_{opt}$ by subtracting stroke width $W_{sp}$, which is an integer expressed in subpixel units, from the stroke upper line. This method keeps the width of the stroke consistent. During quantization, this unit 106 places the center line of the stroke on a subpixel border so as to minimize the error in the center line initial position $C_{ini}$. Since $C_{opt}$ is 14 for stroke 1 in FIGS. 5A and 5B, the positions of the lower and upper lines of this stroke are the 10 and 18 subpixel positions shown in FIG. 14.

After this, stroke optimal arrangement position determination unit 106 judges whether the above processing has been completed for all the strokes included in the stroke position information and completes the processing for determining optimal arrangement position if there are any unprocessed strokes (Step 1206). In this example, there are three pieces of stroke position information, so that the processing is repeated three times. For the case of stroke 2, the distance to ¼ and ¾ borders is the same, as was also the case for stroke 1. In this situation, the stroke optimal arrangement position determination unit 106 moves the center line to ¼ border in accordance with the movement direction of stroke 1. As for stroke 3, the initial position of the center line is on the ⅞ subpixel border, so that the unit 106 moves the center line to the ¾ border which is closer than the ¼ border. If vertical strokes exist, optimal arrangement if positions are obtained in the some way. FIG. 15 shows the stroke optimal arrangement positions and the positions of the stroke upper and lover lines for horizontal stroke n (n=1–3). Here, $W_{sp\_h}$ is stroke width, $C_{opt\_n}$ is a stroke optimal arrangement position, $U_{opt\_n}$ is the stroke upper line coordinate; $L_{opt\_n}$ is the stroke lower line coordinate.

Outline information expansion/reduction unit 107 expands/reduces the outline information included in the outline data in accordance with the stroke optimal arrangement position and the coordinates of the stroke upper and lower lines, all of which are determined by stroke optimal arrangement position determination unit 106. In this example, this unit 107 reduces outline information in FIGS. 4, 5A and 5B into an 80 submesh coordinate system in accordance with the stroke optimal arrangement positions shown in FIG. 15.

The following explanation is about how a Y coordinate in the 1,000 mesh coordinate system is converted into a y coordinate in the 80 submesh coordinate system. The unit 107 first converts coordinate points $U_{\_n}$ and $L_{\_n}$ of the stroke upper and lower lines in the 1,000 mesh coordinate system into coordinate points $U_{opt\_n}$ and $L_{opt\_n}$ in the submesh coordinate system. Following this, unit 107 converts other coordinate points into values obtained by linear interpolation between the coordinate points $U_{opt\_n}$ and $L_{opt\_n}$ of the stroke upper and lower lines, storing the obtained values in development buffer 103. As one example, if there are three horizontal strokes, unit 107 converts coordinates corresponding to starting and end points and stroke lower and upper lines using Formulas 5–12, before converting the coordinates in-between using linear interpolation, using Formulas 13–19.

|  | 1,000 mesh | 80 submesh |
|---|---|---|
| Formula 5 | | |
| Formula 13 | $Y = 0$ | $y = 0$ |
| Formula 6 | $0 < y < L_{\_1}$ | $y = Y \cdot (L_{opt\text{-}1}/L_{\_1})$ |
| Formula 14 | $Y = L_{\_1}$ | $y = L_{opt\_1}$ |
| Formula 7 | $L_{\_1} < Y < U_{\_1}$ | $y = L_{opt\_1} + (Y - L_{\_1})*(U_{opt\_1} - L_{opt\_1})/(U_{\_1} - L_{\_1})$ |
| Formula 15 | $Y = U_1$ | $y = U_{opt\_1}$ |
| Formula 8 | $U_{\_1} < Y < L_{\_2}$ | $y = U_{opt\_1} + (Y - U_{\_1})*(L_{opt\_2} - U_{opt\_1})/(L_{\_2} - U_{\_1})$ |
| Formula 16 | $Y = L_{\_2}$ | $y = L_{opt\_2}$ |
| Formula 9 | $L_{\_2} < Y < U_{\_2}$ | $y = L_{opt\_2} + (Y - L_{\_2})*(U_{opt\_2} - L_{opt\_2})/(U_{\_2} - L_{\_2})$ |
| Formula 17 | $Y = U_{\_2}$ | $y = U_{opt\_2}$ |
| Formula 10 | $U_{\_2} < Y < L_{\_3}$ | $y = U_{opt\_2} + (Y = U_{\_2})*(L_{opt\_3} - U_{opt\_2})/(L_{\_3} - U_{\_2})$ |
| Formula 18 | $Y = L_{\_3}$ | $y = L_{opt\_3}$ |
| Formula 11 | $L_{\_3} < Y < U_{\_3}$ | $y = L_{opt\_3} + (Y - L_{\_3})*(U_{opt\_3} - L_{opt\_3})/(U_{\_3} - L_{\_3})$ |
| Formula 19 | $Y = U_{\_3}$ | $y = U_{opt\_3}$ |
| Formula 12 | $U_{\_3} < Y < 1,000$ | $y = U_{opt\_3} + (Y - U_{\_3})*(80 - U_{opt\_3})/(1,000 - U_{\_3})$ |
| | $Y = 1,000$ | $y = 80$ |

Figure 17:
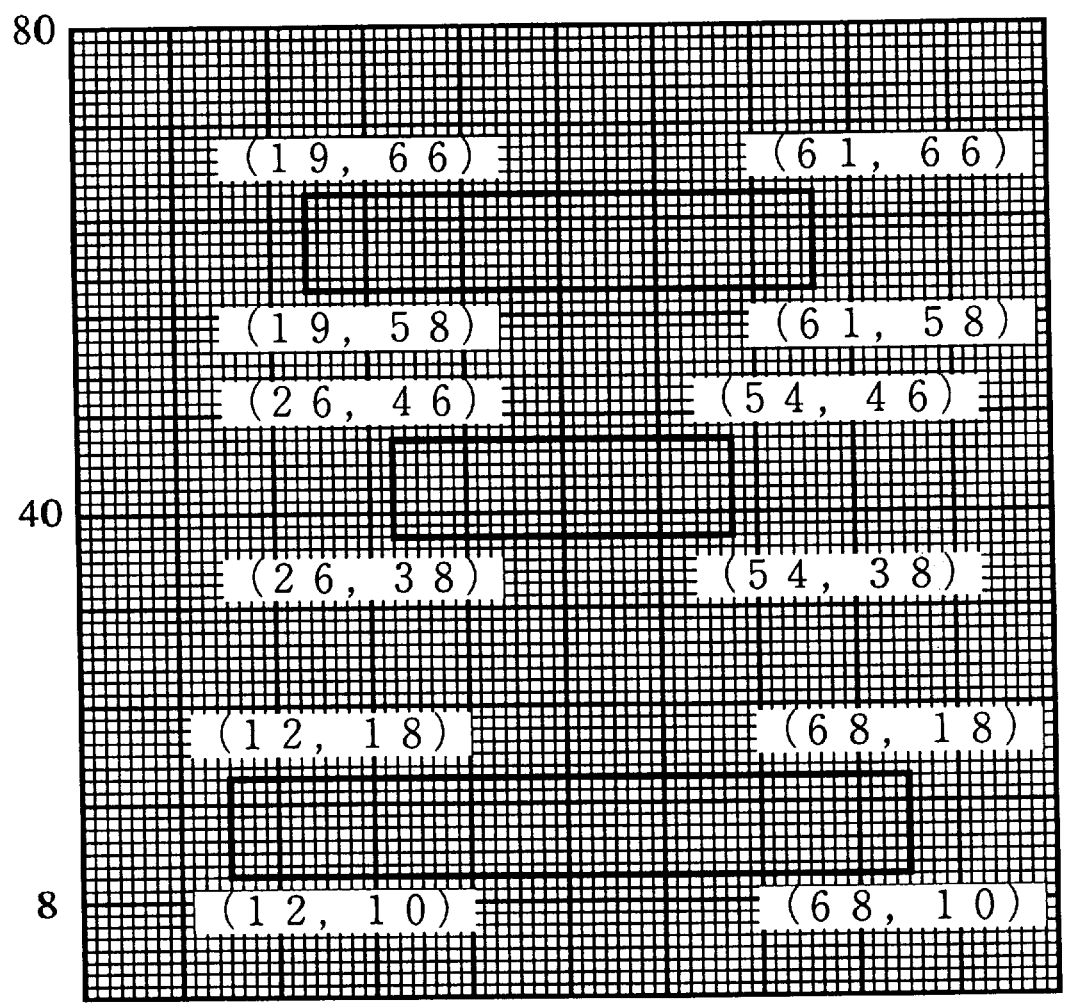
FIG. 17 shows outline information reduced to 80 submesh after stroke optimal arrangement.

FIG. 16 shows formulas for conversion based on coordinates $U_{opt\_n}$ and $L_{opt\_n}$ on the upper and lower lines shown in FIG. 15. By converting Y coordinates in 1,000 mesh coordinate system according to FIG. 16, coordinate points of the stroke upper and lower lines are converted into optimal arrangement positions, with other coordinate points being converted into values obtained by linear interpolation in-between the optimal arrangement positions, the obtained coordinates being stored in development buffer 103. FIG. 17 shows the outline information of the 1,000 mesh coordinate system of FIGS. 4, 5A and 5B converted into an 80 submesh coordinate system. Using this conversion method, all coordinate points are reduced into the 80 submesh coordinate system. For the Chinese character " 三 " "SAN", the information consists of only the stroke upper and lower lines, but even for characters and images which include both straight and curved lines, this reduction can still be performed. Since the character "three" includes no vertical strokes, all X coordinates can be converted according to the formula: x=X*(80/1000). In the case of a character or image including vertical strokes, conversion is carried out in accordance with the vertical stroke optimal arrangement positions in the same way as with horizontal strokes.

Figure 18:
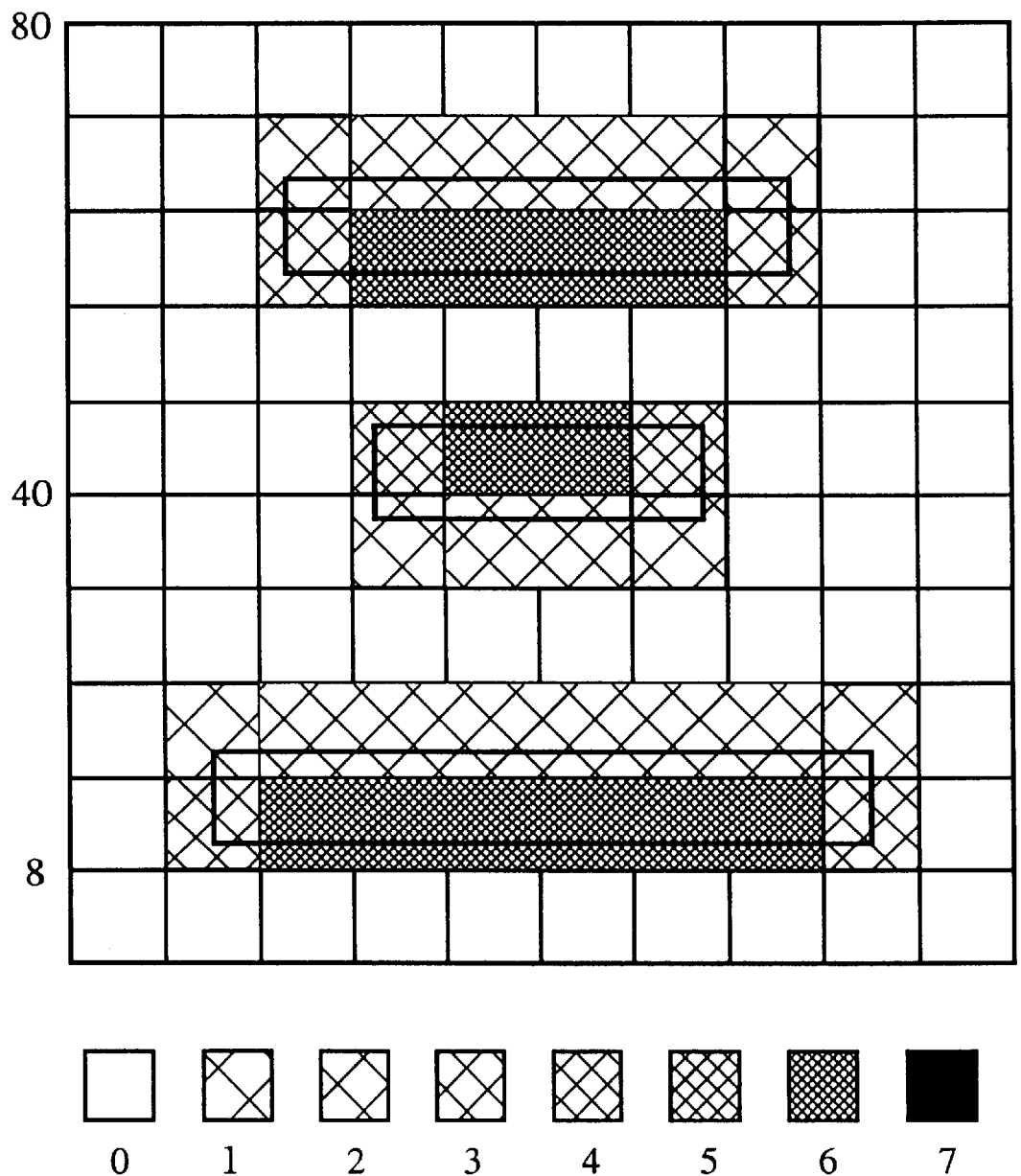
FIG. 18 shows gray scaled data of eight shades generated from the outline information in FIG. 17.
Figure 19A:
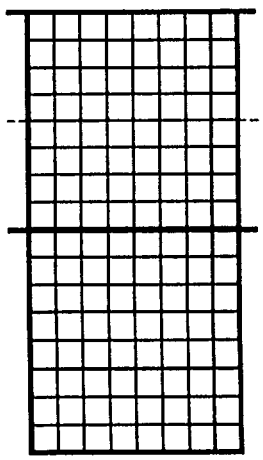
FIGS. 19A–19H show eight patterns of arrangement, with the stroke width corresponding to eight subpixels.
Figure 19B:
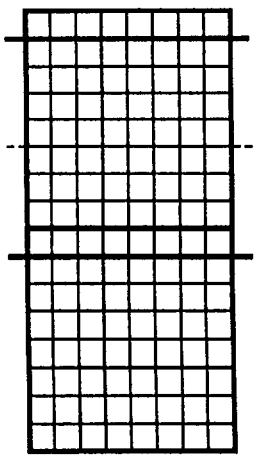
Figure 19C:
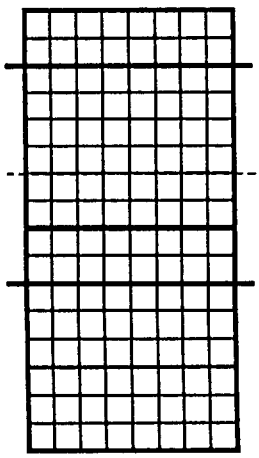
Figure 19D:
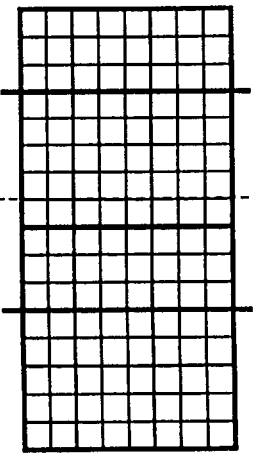
Figure 19E:
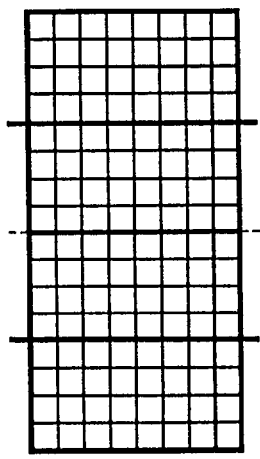
Figure 19F:
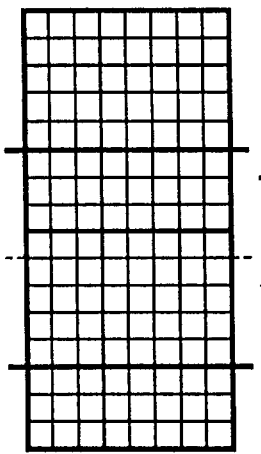
Figure 19G:
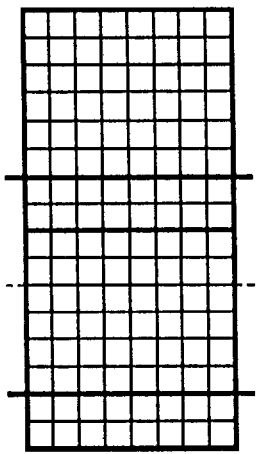
Figure 19H:
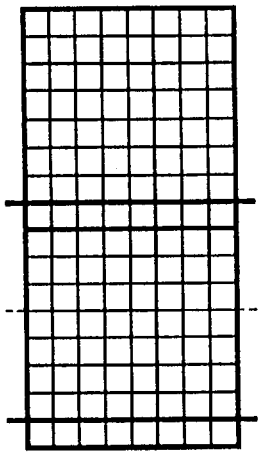

Gray scaled data generation unit 108 generates gray scaled data from the expanded/reduced outline information generated by outline information expansion/reduction unit 107. The construction of this part can be the same as that shown in FIG. 3 or gradation values can be calculated from the proportionate area of the black component which is obtained by multiplication without generating binary data. FIG. 18 shows eight shades of gray scaled data generated from outline information in FIG. 17 by gray scaled data generation unit 108. Since stroke optimal arrangement position determination unit 106 places strokes having a same width in a same subpixel position within a pixel, the widths of the strokes in FIG. 18 look equal, having same darkness of shade and no blurring, which results in an improvement in display quality over the case shown in FIGS. 9 and FIGS. 11A–11C. In FIG. 18, three horizontal strokes having the same width are converted into a same pattern of shades, so that they can be displayed with good balance and little unevenness in the darkness of shade on a low-resolution display or liquid crystal panel.

As explained above, stroke optimal arrangement position determination unit 106 determines position of a center line In a pixel so that strokes having the same width look the same on display. Predetermining the position of a canter line of a stroke improves display quality, no matter where the stroke is placed.

Selecting the ¼ or ¾ subpixel border as the optimal arrangement position of a stroke center line has the following additional effect.

In "Description of the Related Art", examples of a stroke which looks too clear and a stroke which looks blurred on display were shown as FIGS. 10A–10C and 11A–11C. The drawing on the right depicts a stroke whose center line is placed on ½ subpixel border, with this stroke looking too clear and thin on display. In the character, only this stroke is represented by binary data (black and white), so that it will upset the balance of the character, should the character include slanting lines or curved lines represented in a middle tone, resulting in unevenness in darkness of shades. In the drawing in the center, the central line of the stroke is placed on a pixel border, so that middle tone stretches over two pixels, making the stroke look thick and blurred on display. Depending on the characteristics of the liquid crystal panel, the stroke may almost disappear due to the brightness of the screen. Here, if stroke width corresponds to eight subpixels, there will be eight patterns of arrangement as shown in FIG. 19A–19H, with the dotted lines representing the stroke center lines FIGS. 20A–20H shows the gray scaled data corresponding to FIG. 19A–19H. On display, the most striking difference is between (1) and (5), where in (1) the stroke center line is on the ½ subpixel border and in (5) the stroke center line is on the pixel border. In (3) and (7) the stroke center line is placed on the ¼ and ¾ subpixel borders, respectively, with this producing the best balance in thickness of stroke and darkness of shade among the eight arrangements. Such strokes are well suited to display alongside slanting lines and curved lines represented by middle tones and so allow good balance for the character as a whole. Having a same darkness of shade ensures that part of a character or image will not be so faint as to disappear from the display.

In the present invention while there are no other patterns which look the same as (1) or (5), there will always be one other pattern which looks the same on display if a stroke center line is moved to the ¼ or ¾ subpixel border. Also, minimizing the movement distance of a stroke from the initial arrangement position ensures reductions in the trueness of form of characters due to excessive movement of strokes can be avoided.

These characteristics can still be applied to cases in which stroke width does not correspond to eight subpixels. If stroke width is increased gradually by one subpixel, this change in appearance is shown smoothly on the display, so that a stroke of greater width is never displayed so as to appear thinner than others and vice versa.

As for fonts, various typefaces of small size and different weight (thickness) in the same typeface can be displayed on the screen with a natural balance and no unevenness in the darkness of shade.

In Embodiment 1, one pixel is divided into 64 subpixels (8 by 8 submeshes), although the pixel can be divided into 256 subpixels (16 by 16 submeshes) so that more subtle differences in form can be expressed, resulting in an improvement in image quality.

When the movement distance of a center line is the same to each possible position, movement is carried out in accordance with the movement direction of the preceding stroke to maintain good balance between neighboring strokes.

Here, it is possible to employ other methods not mentioned in Embodiment 1. Stroke position information can be stored as attributes of coordinate points in the outline information, and the coordinate point can be moved based on a stroke optimal arrangement position determined from these attributes during expansion/reduction of the outline information. Alternatively, instead of moving a stroke center line to the ¼ or ¾ subpixel border, the stroke width con be divided by the submesh divisor (8 in this embodiment) with the stroke upper line and lower lines then being adjusted in accordance with the remainder left by the division calculation, this producing the same effect as placing the stroke central line on ¼ or ¾ subpixel border.

In the present embodiment, stroke optimal arrangement position determination unit 106 determines an optimal arrangement position, referring to optimal arrangement standard table storage unit 105. However, the optimal arrangement position may be determined by detection of which of the ¼ or ¾ subpixel border requires less distance for moving. In this case, adjusting the stroke is important so that a stroke center line falls on the closer of the ¼ and ¾ subpixel borders.

Here, outline information expansion/reduction unit 107 carries out expansion/reduction when two horizontal strokes do not overlap on the X axis but on the Y axis. Supposing that a horizontal stroke's lower line is $L_1$, its upper line is $U_1$, and another horizontal stroke's lower line is $L_2$, and its upper line is $U_2$, with value of Y coordinates being $L_1<L_2<U_1<U_2$, outline information expansion/reduction unit 107 performs linear interpolation between $L_1$–$L_2$, $L_2$–$U_1$, and $U_1$–$U_2$.

SECOND EMBODIMENT

The gray scaled data generation device of second embodiment of the present invention can be explained as follows. Its hardware configuration is the same as that in FIG. 1A of first embodiment except that the gray scaled date generation device of the present embodiment determines an optimal arrangement position of each stroke by calculation according to a program without using an optimal arrangement position determination table and adjusts stroke positions in accordance with the positions of adjacent (neighboring) strokes. Accordingly a different program is stored in ROM 2. The following explanation will touch on only the differences with the first embodiment.

Figure 21:
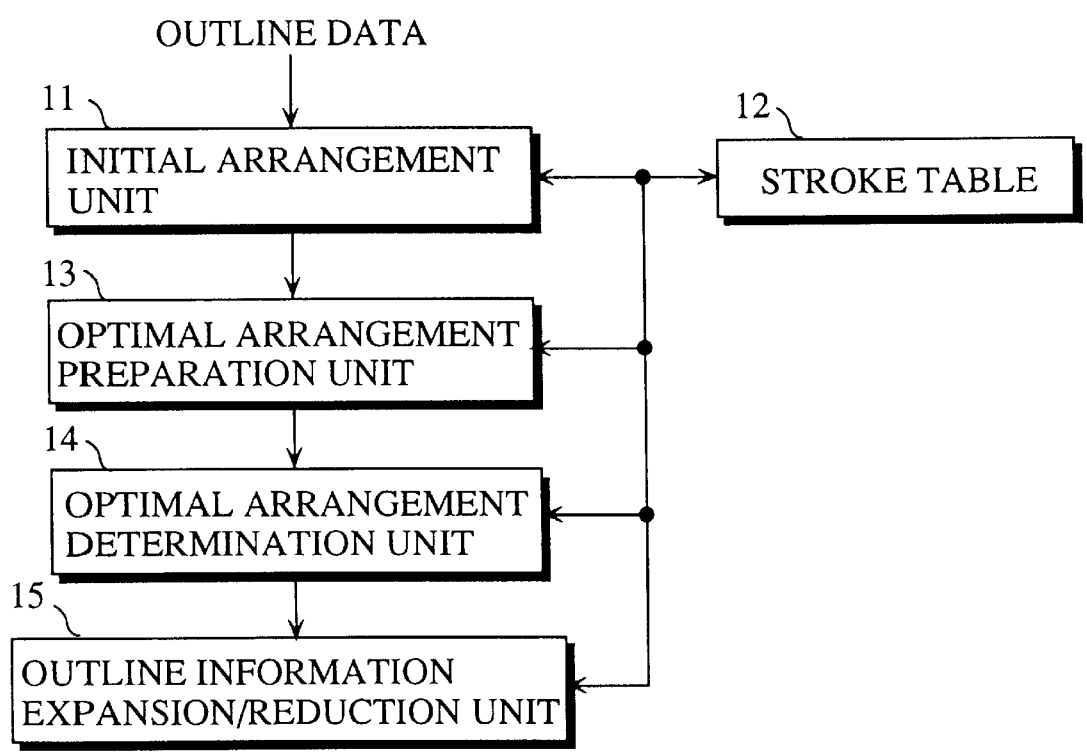
FIG. 21 is a simplified function block diagram of the gray scaled data generation device of the second embodiment.

FIG. 21 is a simplified function block diagram of the gray scaled data generation device realized by CPU 4 executing the program in ROM 2 of FIG. 1A. The gray scaled data generation device comprises initial arrangement unit 11, stroke table 12, optimal arrangement preparation unit 13, optimal arrangement position determination unit 14 and outline information expansion/reduction unit 15.

Initial arrangement unit 11 converts coordinates of each horizontal and vertical stroke in the character or image to be displayed using gray scaled data defined in the coordinate system of the outline data into coordinates in a subpixel coordinate system. In the following example, the outline date is defined in a 1,000 by 1,000 mesh coordinate system, the final data size is 12 by 12 pixels (12 by 12 meshes), and each pixel is divided into 8 by 8 subpixels (a 96 by 96 submesh coordinate system). In this case, initial arrangement unit 11 stores Y coordinates of a stroke upper and lower line and stroke width in the 1,000 mesh coordinate system in stroke table 12 Initial arrangement unit 11 also calculates Y coordinates of a stroke upper and lower line and stroke width in the 96 submesh coordinate system and stores them in stroke table 12. Initial arrangement unit 11 executes the same processes for vertical strokes.

Stroke table 12 is provided in RAM 3 and is made up of a horizontal stroke table and a vertical stroke table. The horizontal stroke table stores information about the Y coordinates, the stroke width, and the optimal arrangement position of each horizontal stroke, This information is successively stored by initial arrangement unit 11, optimal arrangement preparation unit 13 and optimal arrangement position determination unit 14. Specifically, the information about the initial arrangement is stored by initial arrangement unit 11, the information about the potential optimal arrangement positions is stored by optimal arrangement preparation unit 13 and information about the optimal arrangement position is stored by optimal arrangement position determination unit 14. Here, information in a vertical stroke table is stored in the same manner as that in a horizontal stroke table except that X coordinates are used instead of Y coordinates.

Optimal arrangement preparation unit 13 calculates potential optimal arrangement positions of each stroke based on the information about the initial arrangement position in stroke table 12. As in first embodiment, the ¼ or ¾ subpixel borders inside each pixel are set as the standard arrangement positions. Potential optimal arrangement positions are calculated as the movement amount of each stroke center line to the ¼ or ¾ subpixel border. Unless a stroke center line falls exactly on the ¼ or ¾ subpixel border, there are two potential movement amounts. Optimal arrangement is preparation unit 13 calculates the potential movement amounts using a relative coordinate of a stroke upper line within a pixel instead of the Y coordinate of a stroke center line and stores the potential movement amounts in the stroke table. The relative coordinate is a subpixel coordinate within a pixel. When a pixel is made up of 8 by 8 subpixels, the value of the relative coordinate ranges from 0–7 (this coordinate value is referred to as the subpixel value hereinafter). In this system, the ¼ and ¾ subpixel borders are expressed as the subpixel values 2 and 6. Here, optimal arrangement preparation unit 13 calculates the potential optimal relative coordinate value on which the upper line should be placed using the subpixel value of the upper line and stroke width in the initial arrangement and calculates the potential movement amount from the initial arrangement position to the standard arrangement positions.

Optimal arrangement position determination unit 14 determines the optimal arrangement position of a stroke, adjusting potential movement amount calculated by optimal arrangement preparation unit 13 according to the position of the stroke relative to other strokes and selecting the optimal movement amount. Here, optimal arrangement position determination unit 14 will normally select the smallest potential movement amount, although when the distance to another stroke becomes smaller than a given value, it will select the second smallest potential movement amount, calculating the coordinates of the stroke upper/lower line based on the selected amount and storing these coordinates in the stroke table.

Outline information expansion/reduction unit 15 expands/ reduces the outline information included in the outline data based on the information about the optimal arrangement position in stroke table 12, in the same way as outline information expansion/reduction unit 107 in the first embodiment.

Figure 22:
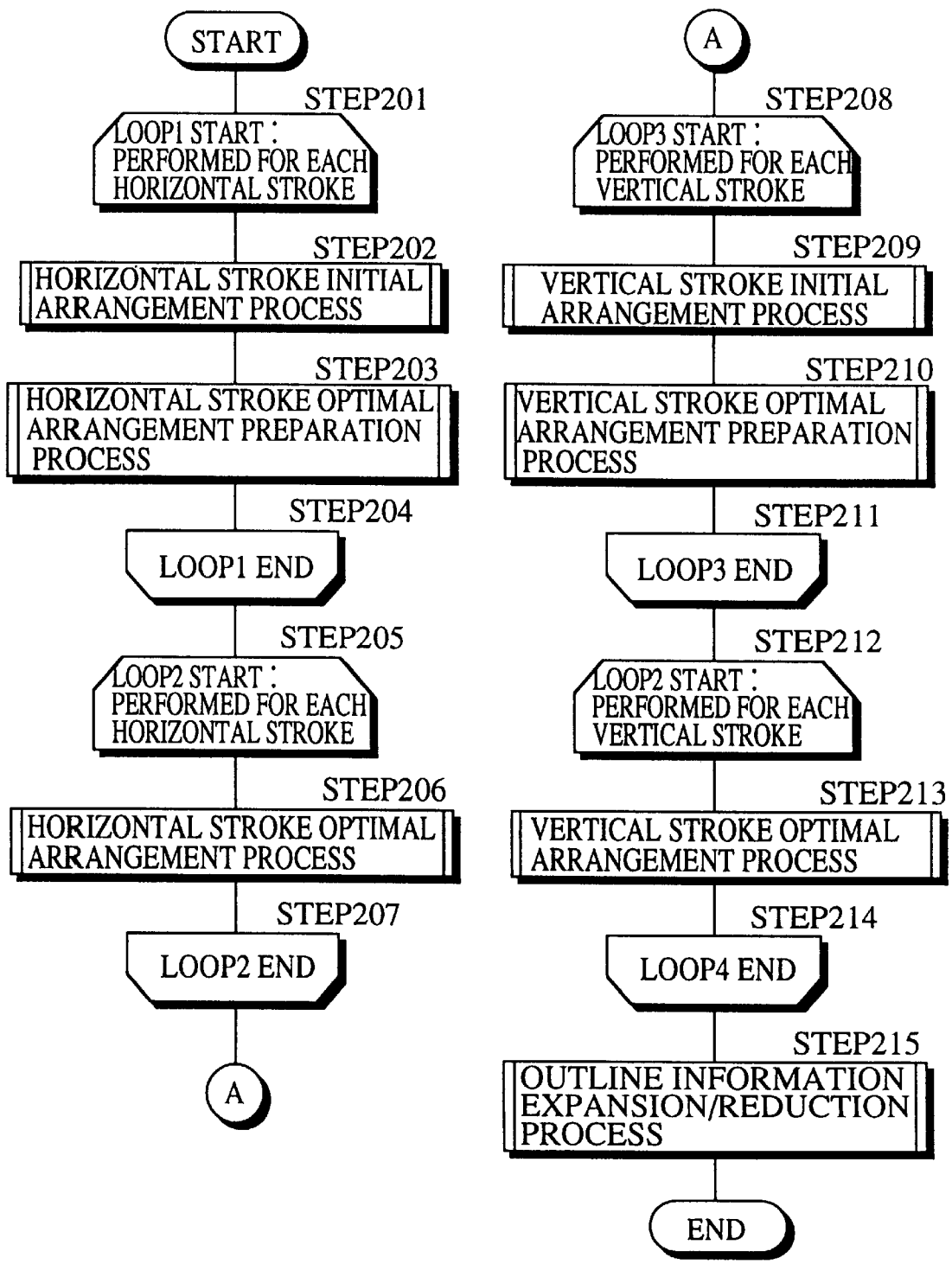
FIG. 22 is a simplified flowchart showing the gray scaled data generation process for the gray scaled data generation device of the second embodiment.

FIG. 22 is a simplified flowchart showing the gray scaled data generation process for the gray scaled data generation device of the present embodiment.

First, for a horizontal stroke, initial arrangement unit 11 executes the initial arrangement process in Loop 1 (Steps 201, 202, and 204), optimal arrangement preparation unit 13 executes the optimal arrangement preparation process in Loop 1 (Steps 201, 203, 204), and optimal arrangement position determination unit 14 executes the optimal arrangement process in Loop 2 (Steps 205–207). Next, for a vertical stroke, initial arrangement unit 11 executes the initial arrangement process in Loop 3 (Steps 208, 209, 211), optimal arrangement preparation unit 13 executes the optimal arrangement process in Loop 3 (Steps 208, 210, and 211), and optimal arrangement position determination unit 14 executes the optimal arrangement process in Loop 4 (Steps 212–214). Finally, outline information expansion/ reduction unit 15 executes the expansion/reduction process. In the above process, the content of Loops 1 and 2 for a horizontal stroke and Loops 3 and 4 for a vertical stroke are the same except for the data used (Y coordinates and x coordinates), so only the case of a horizontal stroke is given.

<Initial Arrangement Process>

Figure 23:
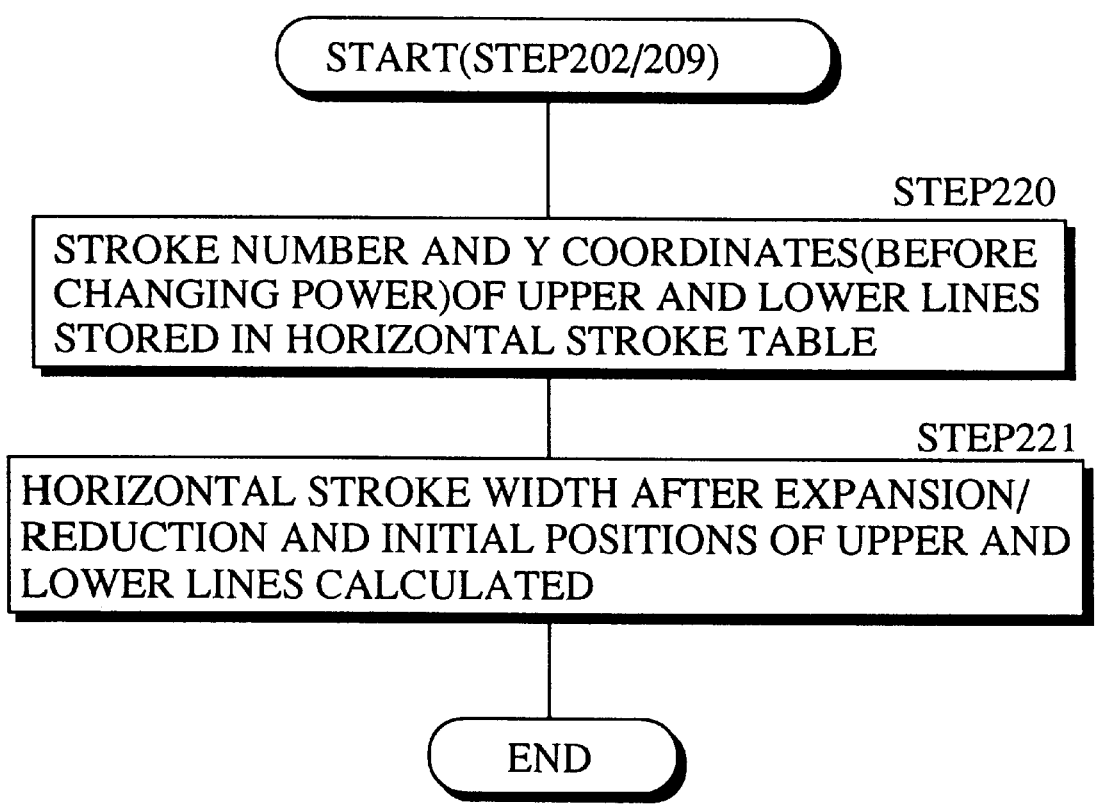
FIG. 23 is a detailed flowchart for the initial arrangement process shown in Step 202 in FIG. 22.

FIG. 23 is a detailed flowchart of the initial arrangement process executed by initial arrangement unit 11 in Step 202 in Loop 1 and Step 209 in Loop 3 in FIG. 22. In the following explanation, a stroke having the ordinal number "i" in processed in Loop 1.

Initial arrangement unit 11 retrieves horizontal stroke position information for the horizontal stroke having the ordinal number "i" from the outline data about a character or image to be displayed using gray scaled data. Initial arrangement unit 11 stores the stroke number, the Y coordinates of the stroke upper and lower lines and stroke width before changing the power (in the outline data coordinate system) and the opposing numbers in the horizontal stroke table of stroke table 12 (step 220). Based on these values, initial arrangement unit 11 calculates the initial arrangement positions of stroke lower and upper lines and other such values after changing the power (submesh coordinate system) which It stores in the stroke table. Here, the opposing numbers are the numbers of the strokes which are adjacent to a horizontal stroke above or below (such strokes being referred to as opposing strokes hereinafter).

Figures 25A, 25B:
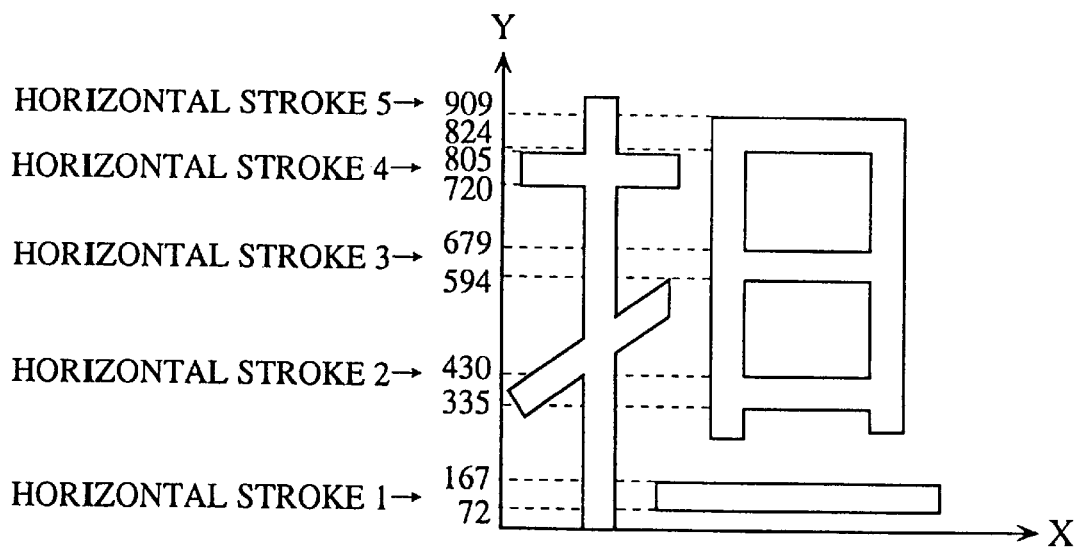
FIGS. 25A and 25B are concrete examples of horizontal stroke information of outline data.

FIGS. 24, 25A and FIG. 25B show concrete examples of a horizontal stroke table and the horizontal stroke information in the outline data. In FIG. 24, numerical values are shown as being registered in all of the columns, although such values are cleared before the start of the initial arrangement process. Once the initial arrangement process has been commenced, values are registered and updated in corresponding columns along with the execution of the various processes. In this example, FIG. 24 shows the outline data of the Chinese character "担" "TAN" which is shown in FIG. 25A, while FIG. 25B shows the position information of the horizontal strokes. The position and outline information of vertical strokes have been omitted. As shown in FIG. 25B, each horizontal stroke is expressed by the Y coordinates of the lower and upper line and an opposing number. Here, each Y coordinate is expressed in the coordinate system of the outline data (1,000 by 1,000 mesh coordinate system). As for opposing numbers, only the numbers of an opposing strokes which are above the corresponding stroke are shown in FIG. 25B, since the existence of opposing strokes which are below can be understood from the opposing stroke numbers of the strokes which ore below. In FIG. 25A, opposing strokes of horizontal stroke are horizontal strokes 2 and 5. Here, "opposing" means that there is a possibility that the boundary between the two strokes will be adjacent to each other (in two adjacent pixels or in a same pixel) in the final font generated after the outline date has been reduced. It can be seen from the proximity of the upper line of horizontal stroke 2 and lower line of horizontal stroke 3 that these strokes oppose one another. In FIG. 25A, horizontal stroke 3 is an opposing stroke of horizontal stroke 5, but horizontal stroke 4 is not.

In the horizontal stroke table shown in FIG. 24, the Y coordinates (before changing power) of the upper and lower lines are the Y coordinates of stroke upper and lower lines in stroke position information in FIGS. 25A and 25B. In the "opposing number" column, the upper entries represent numbers of opposing stroke below and lower entries represent numbers of opposing stroke above the stroke in question. The numbers of opposing strokes above are shown by the stroke position Information, and numbers of opposing strokes below are obtained by the initial arrangement unit 11 from the numbers of opposing strokes above. The "Y coordinates (after changing power)" column shows the Y coordinates after they have been converted into a 96 by 96 submesh coordinate system. Similarly "Stroke width (before and after changing power)" are expressed by values in the outline data coordinate system and in the submesh coordinate system. Initial arrangement unit 11 obtains the Y coordinates and stroke width from the following formulas (Step 221).

--- stroke width (before changing power)
  = Y coordinate before changing power (upper) −
    Y coordinate before changing power (lower)
stroke width (after changing power)
  = stroke width (before changing power)*$N_p$*$N_{sp}/N_{org}$
Y coordinate (lower line, after changing power)
  = Y coordinate (lower line, before changing power)*$N_p$*$N_{sp}/N_{org}$
Y coordinate (upper line, after changing power)
  = Y coordinate (lower line, after changing power) +
    stroke width (after changing power)

---

When Y coordinates and stroke width after changing power are decimals, they are changed to integers by rounding up numbers with a decimal part which is 0.5 or over, or otherwise rounding down. Should stroke width become 0 by this rounding off, then it is changed to 1.

"Pixel value" represents the pixel positions of the lower and upper lines of a stroke in a 12 by 12 pixel coordinate system. "Subpixel value" represents each subpixel position (relative coordinate) of stroke lower and upper lines inside a pixel, not the Y coordinate in the 96 by 96 submesh coordinate system. Here, initial arrangement unit 11 obtains pixel values and subpixel values from the following formulas (Step 221).

pixel value=[Y coordinate (after changing power)/$N_{sp}$]

where [ ] means rounding off a decimal part.

subpixel value=Y coordinate (after changing powers)%$N_{sp}$.% is an operator for obtaining a remainder after division.
<Optimal Arrangement Preparation Process>

Figure 26:
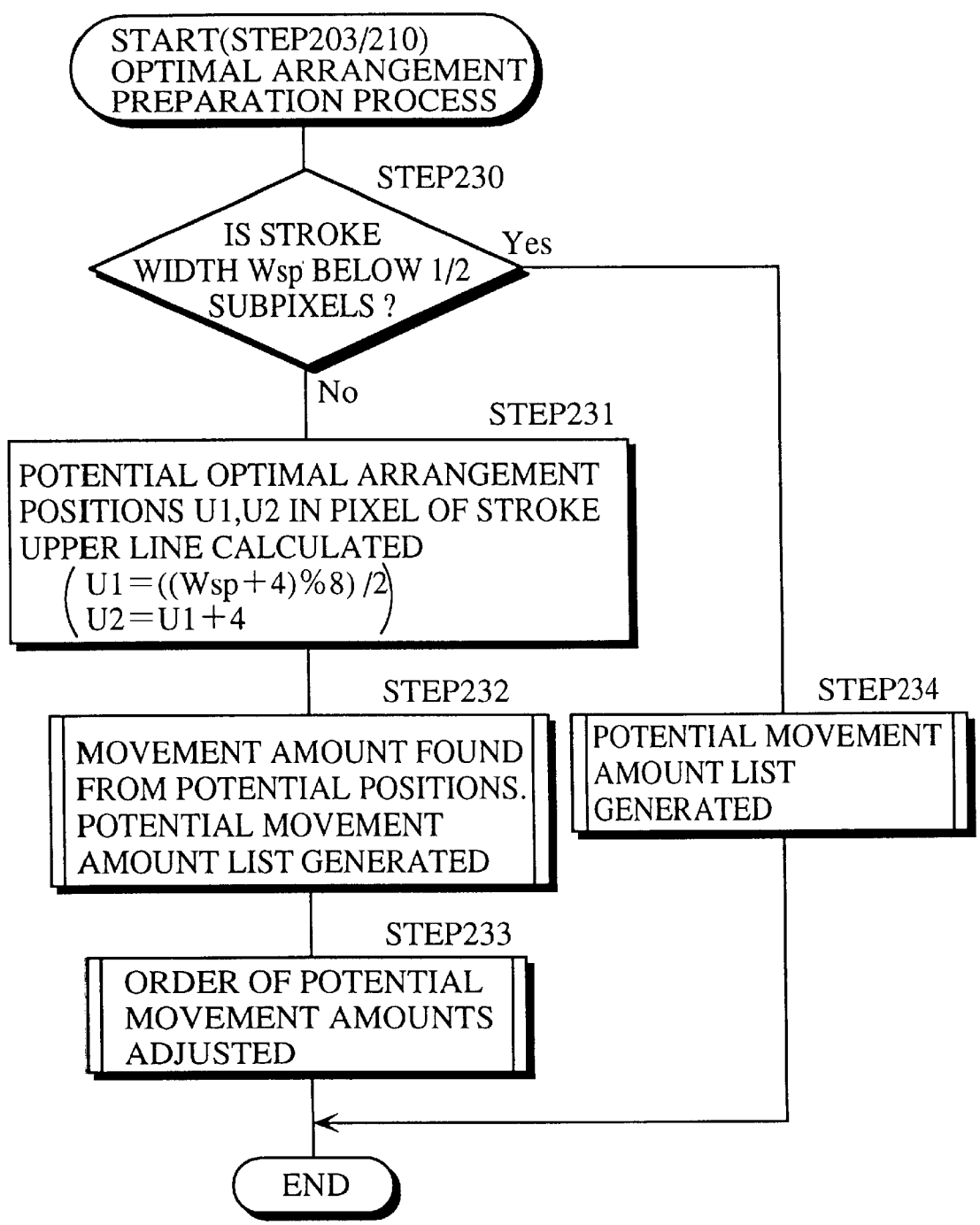
FIG. 26 is a detailed flowchart for the optimal arrangement preparation process in step 203 In FIG. 22.
Figure 27A:
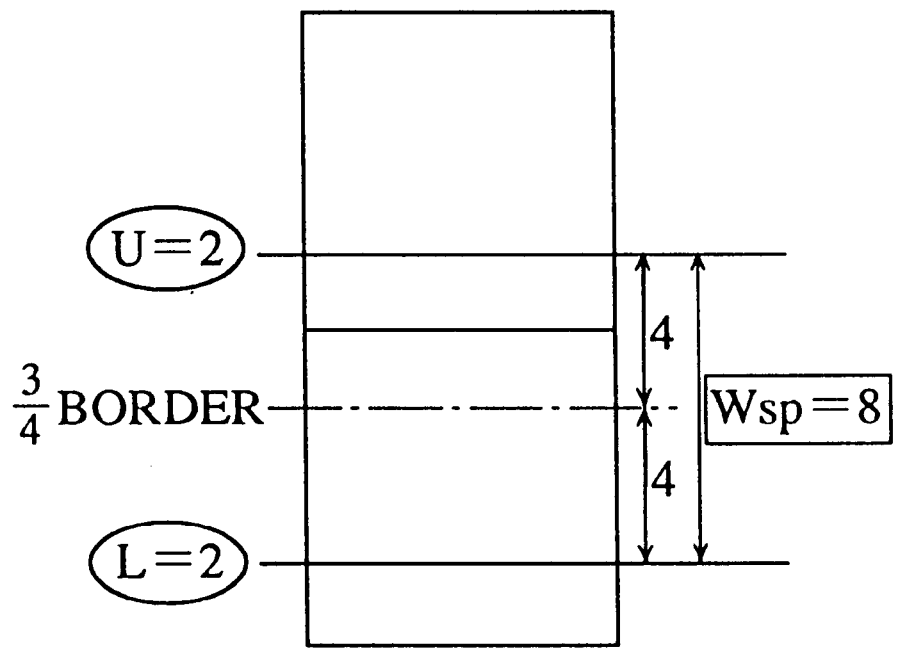
FIGS. 27A and 27B show strokes whose center lines are placed on ¾ and ¼ subpixel borders, with stroke width $W_{sp}$ being 8.
Figure 27B:
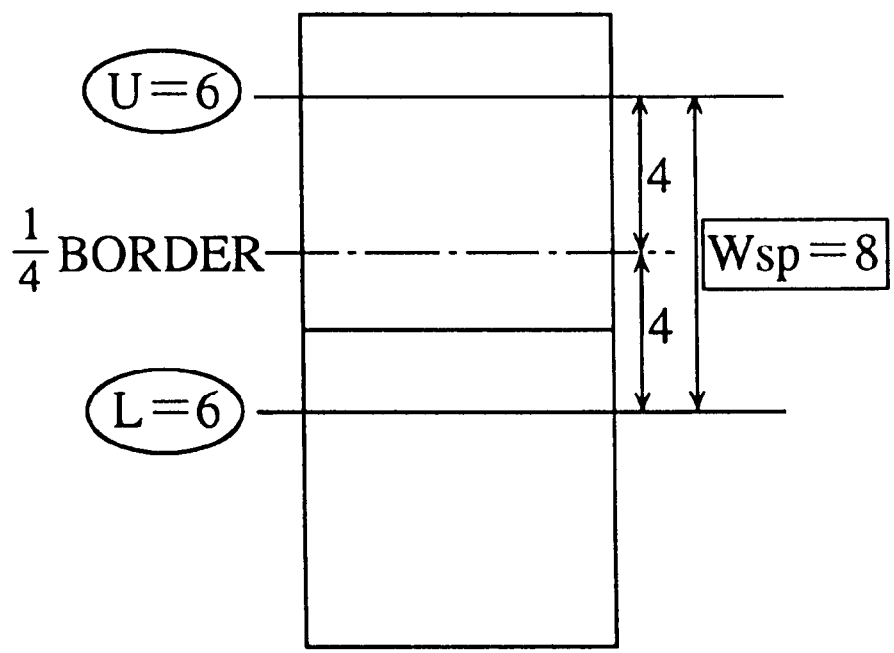
Figure 28A:
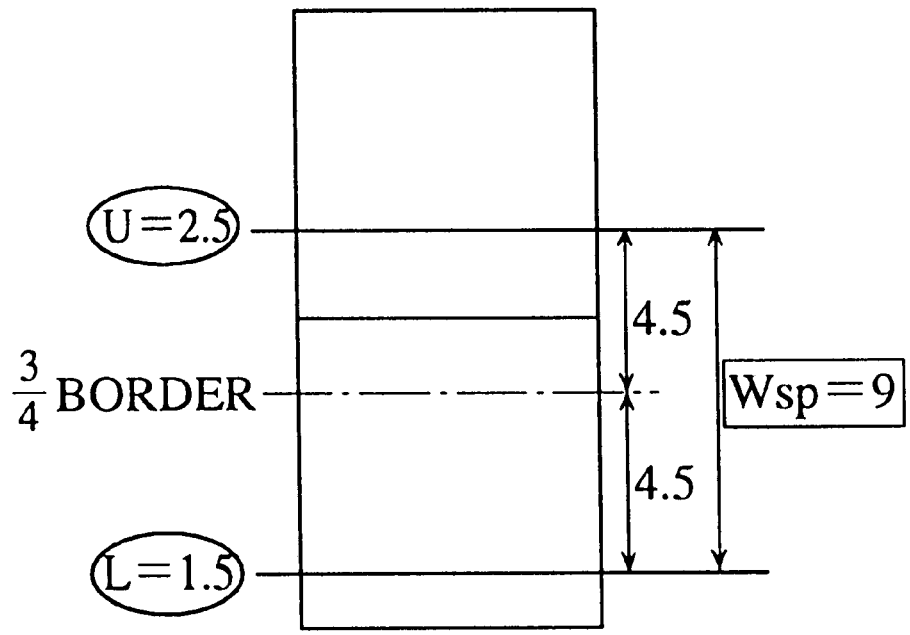
FIGS. 28A and 28B show strokes whose center lines are placed on ¾ and ¼ subpixel borders, with stroke width $W_{sp}$ being 9.
Figure 28B:
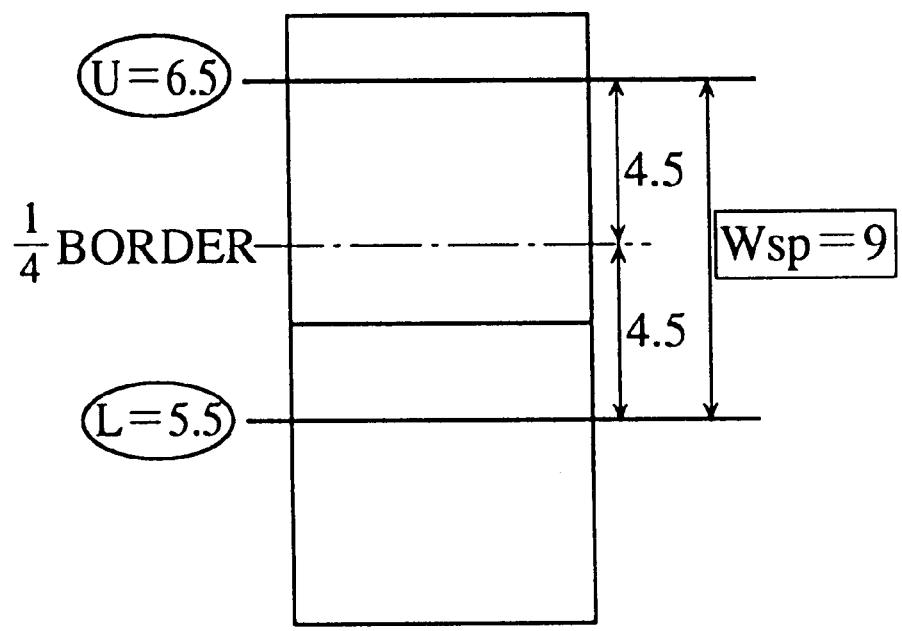
Figure 29A:
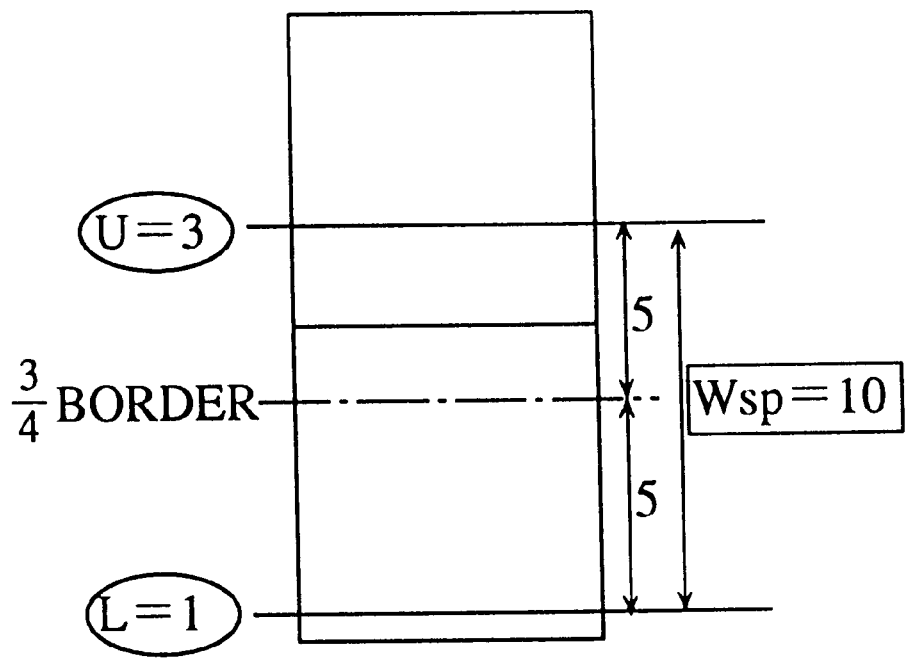
FIGS. 29A and 29B show strokes whose center lines are placed on ¾ and ¼ subpixel borders, with stroke width $W_{sp}$ being 10.
Figure 29B:
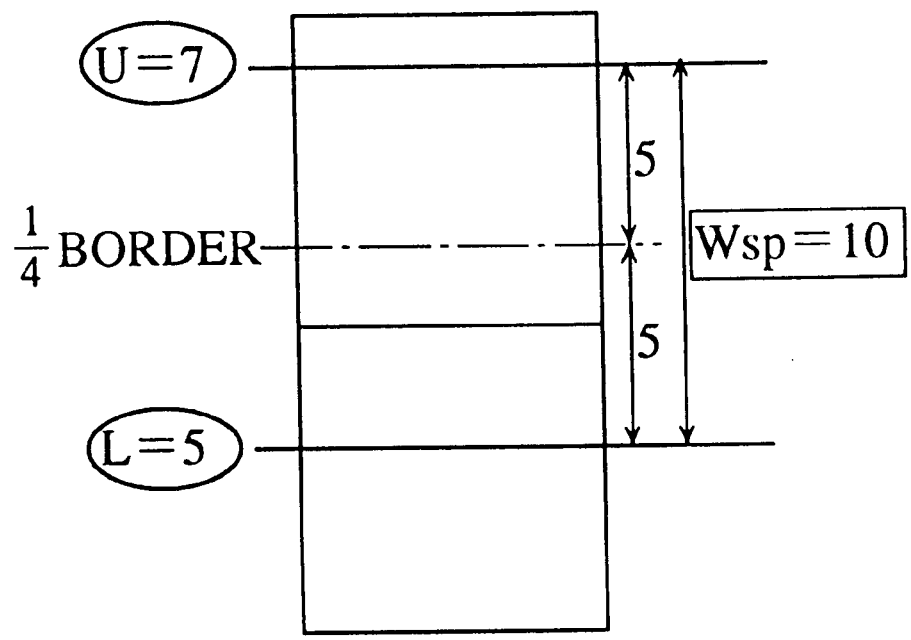
Figure 30A:
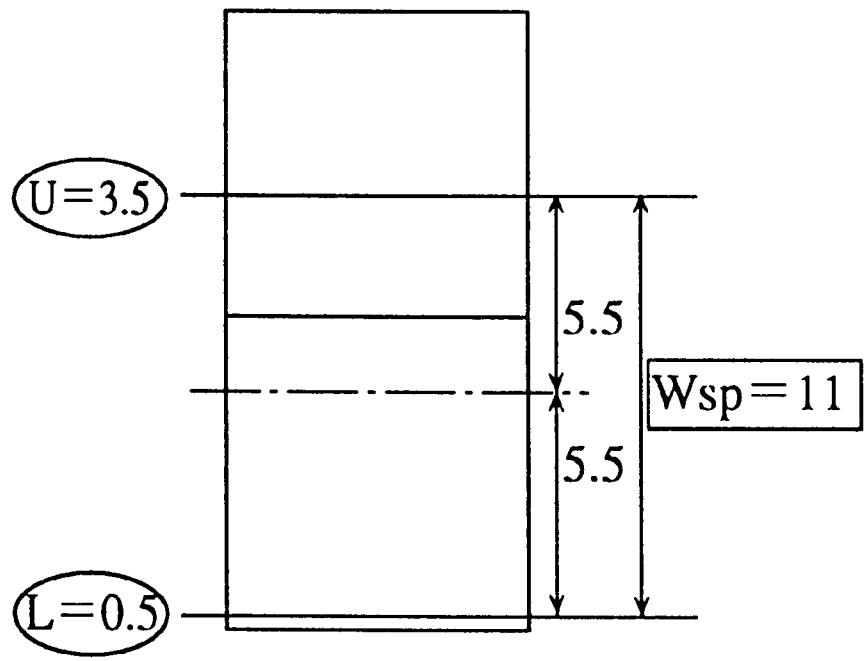
FIGS. 30A and 30B show strokes whose center lines are placed on ¾ and ¼ subpixel borders, with stroke width $W_{sp}$ being 11.
Figure 30B:
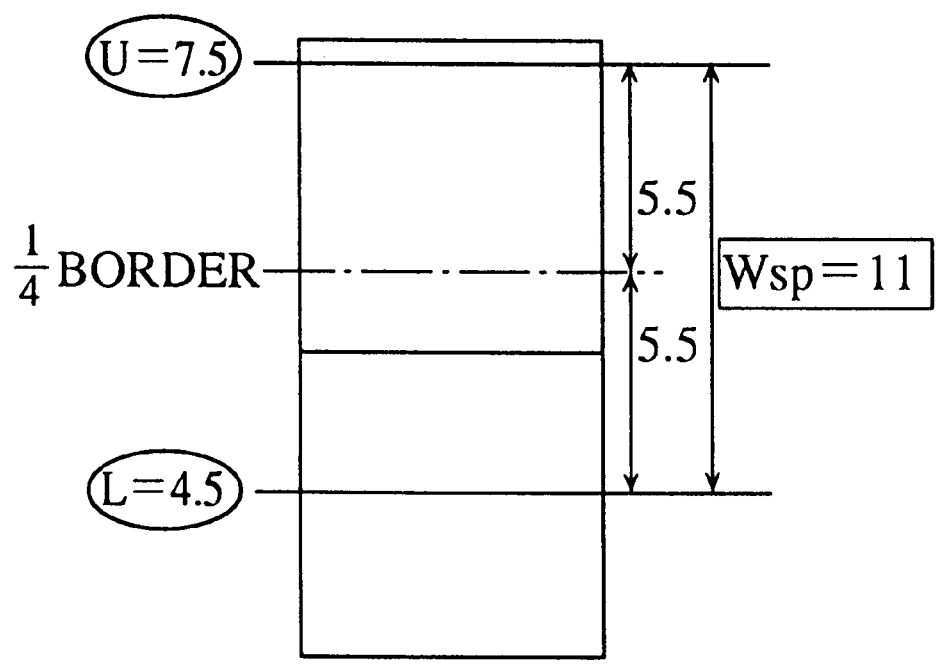
Figure 31A:
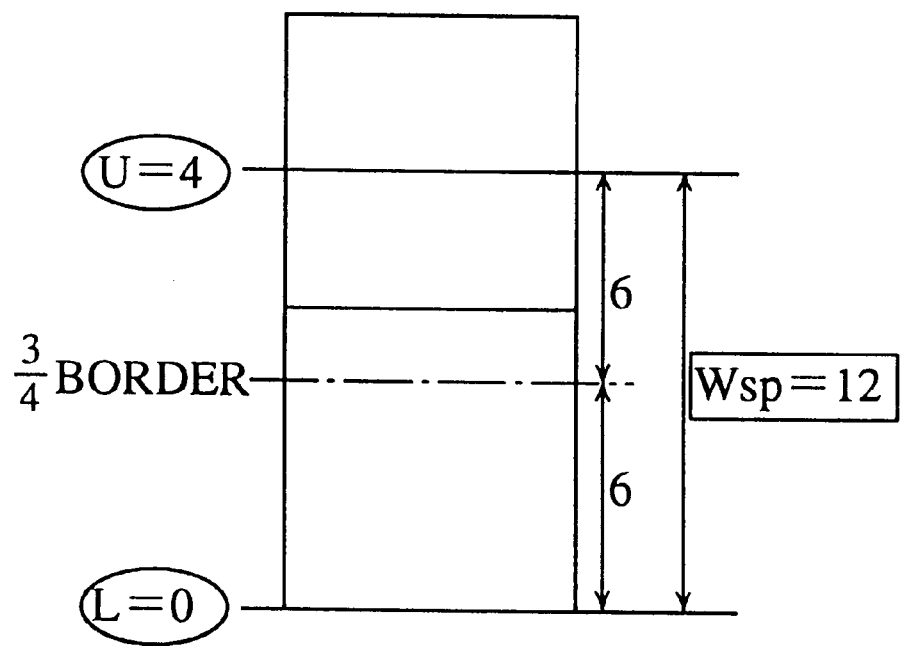
FIGS. 31A and 31B show strokes whose center lines are placed on ¾ and ¼ subpixel borders, with stroke width $W_{sp}$ being 12.
Figure 31B:
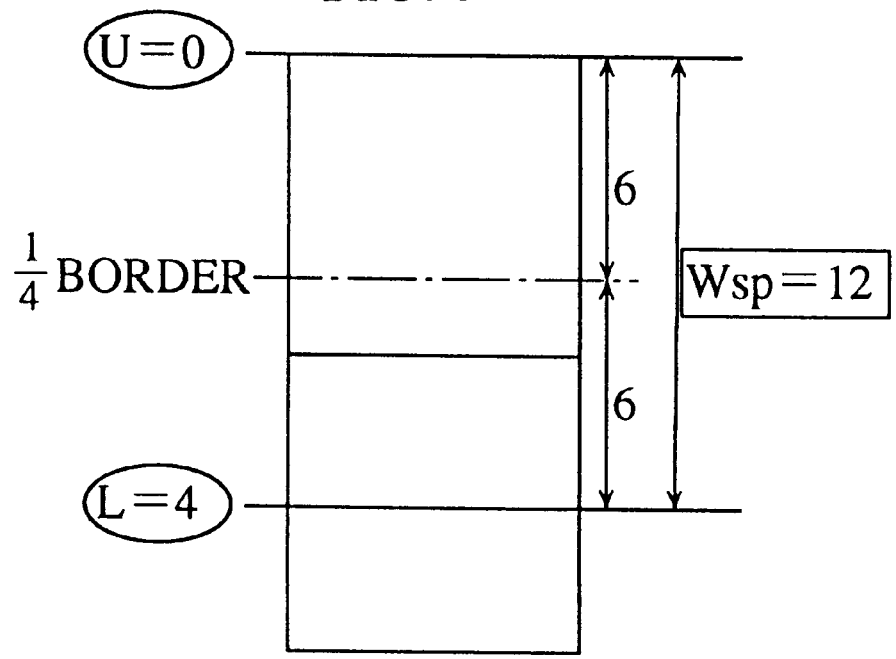
Figure 32A:
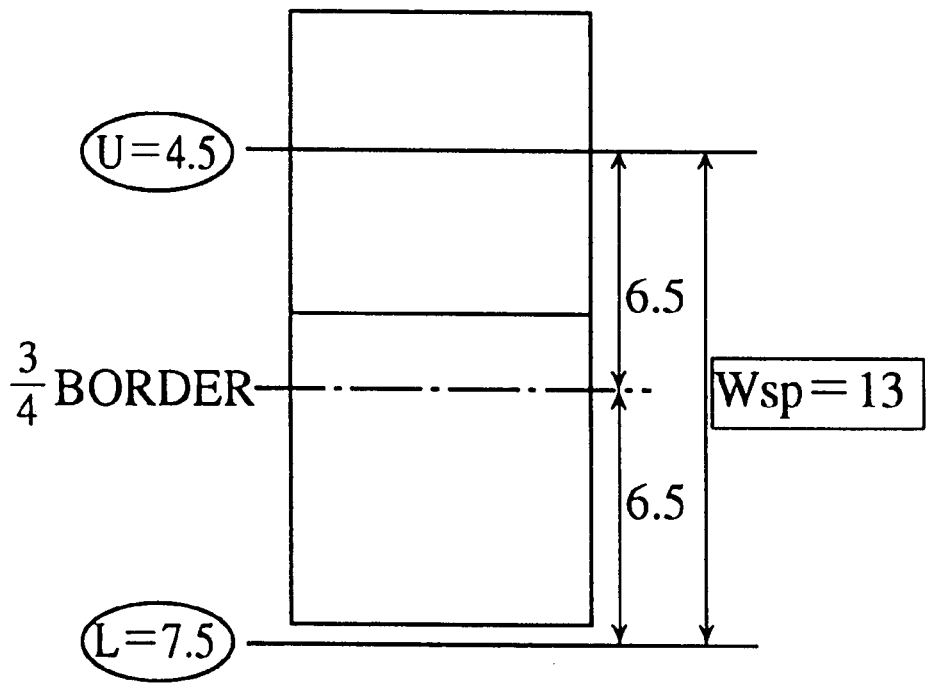
FIGS. 32A and 32B show strokes whose center lines are placed on ¾ and ¼ subpixel borders, with stroke width $W_{sp}$ being 13.
Figure 32B:
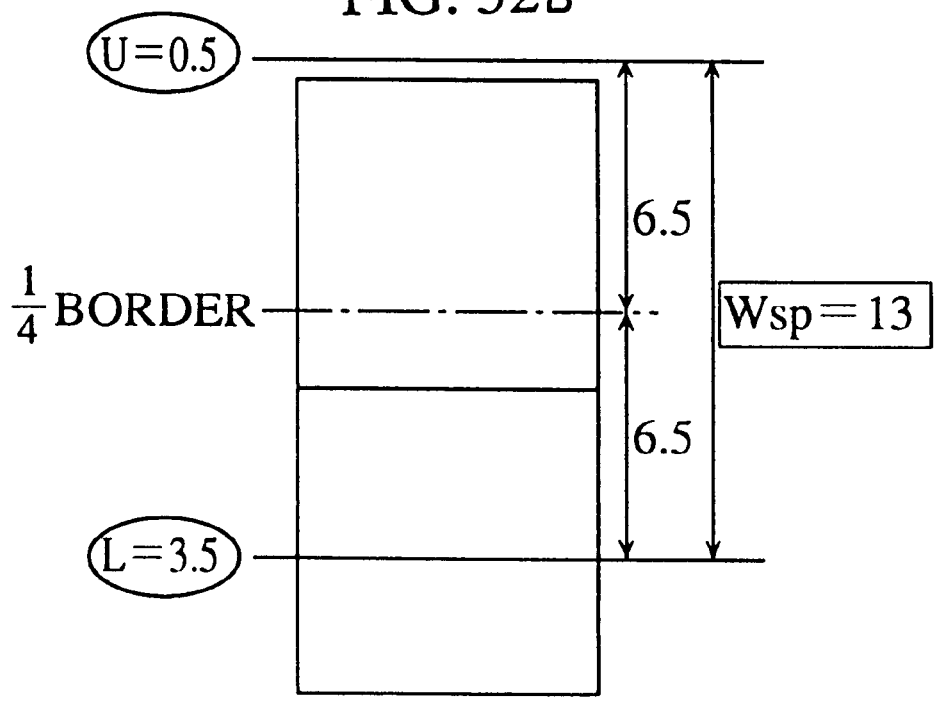
Figure 33A:
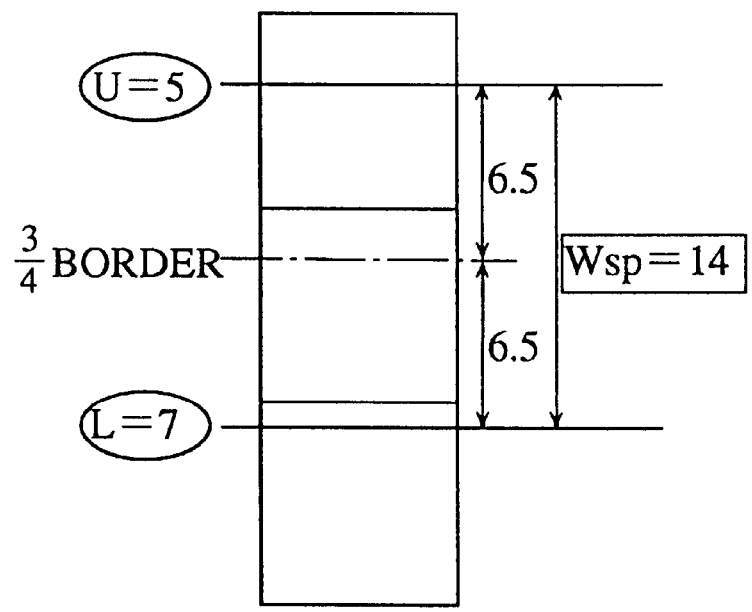
FIGS. 33A and 33B show strokes whose center lines are placed on ¾ and ¼ subpixel borders, with stroke width $W_{sp}$ being 14.
Figure 33B:
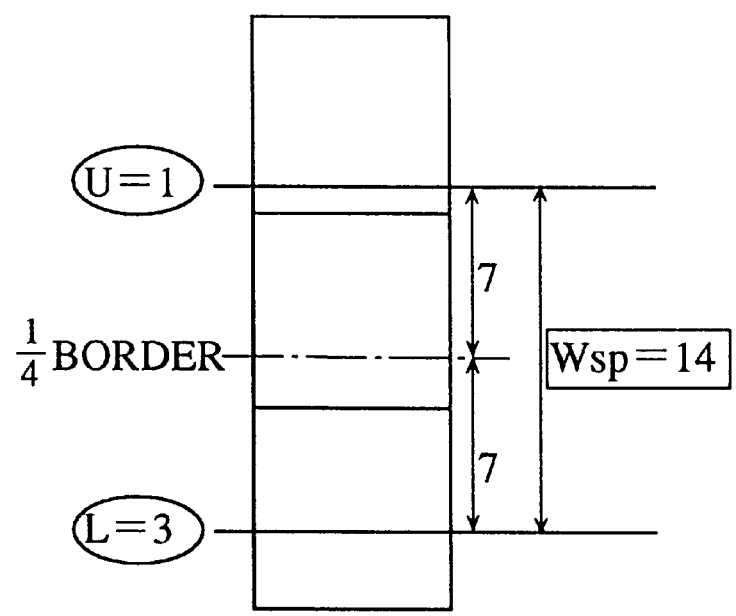
Figure 34:
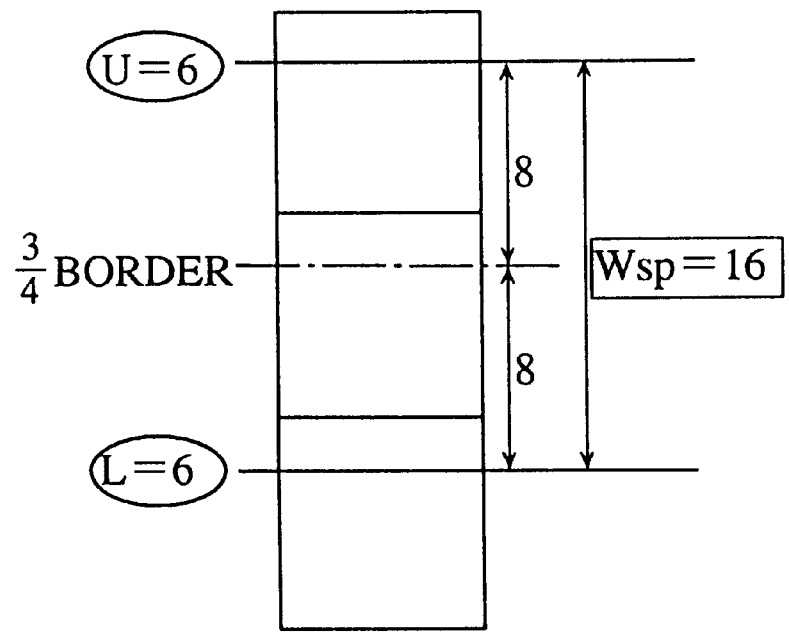
FIGS. 34A and 34B show strokes whose center lines are placed on ¾ and ¼ subpixel borders, with stroke width $W_{sp}$ being 16.
Figure 34B:
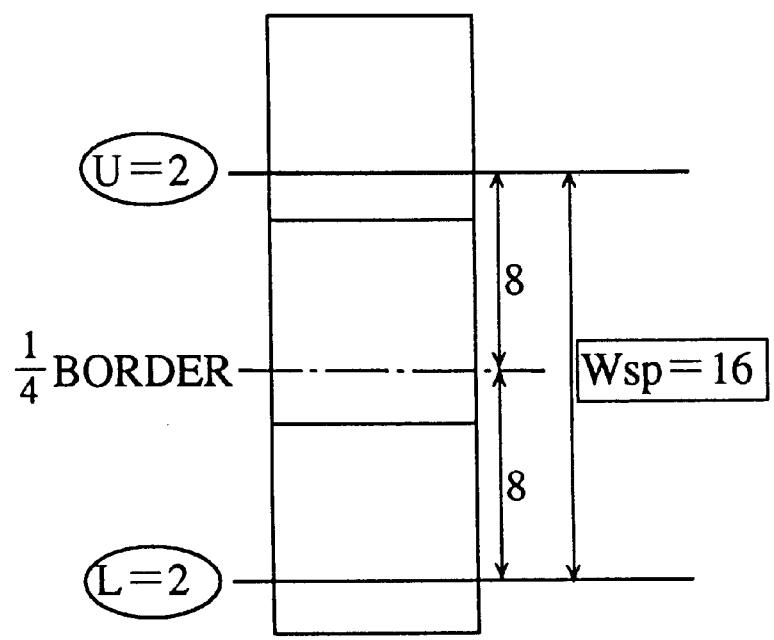
Figure 35A:
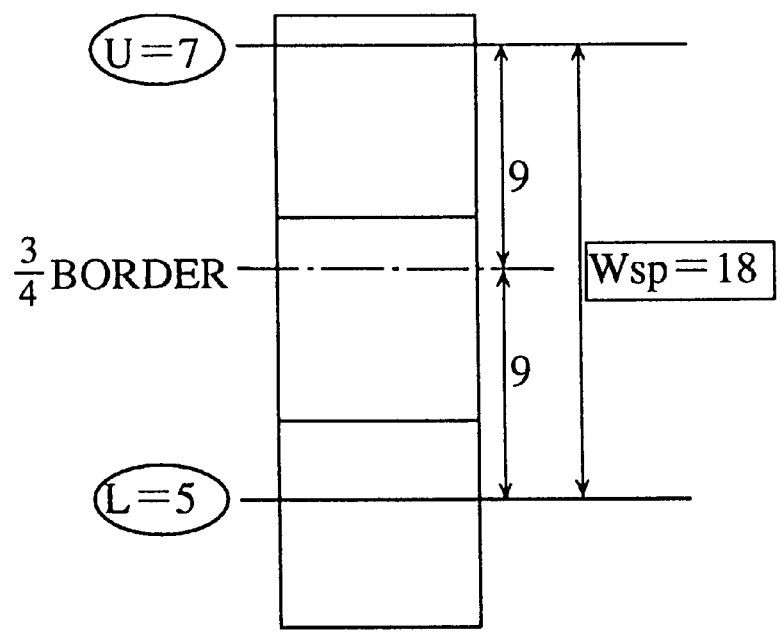
FIGS. 35A and 35B show strokes whose center lines are placed on ¾ and ¼ subpixel borders, with stroke width $W_{sp}$ being 18.
Figure 35B:
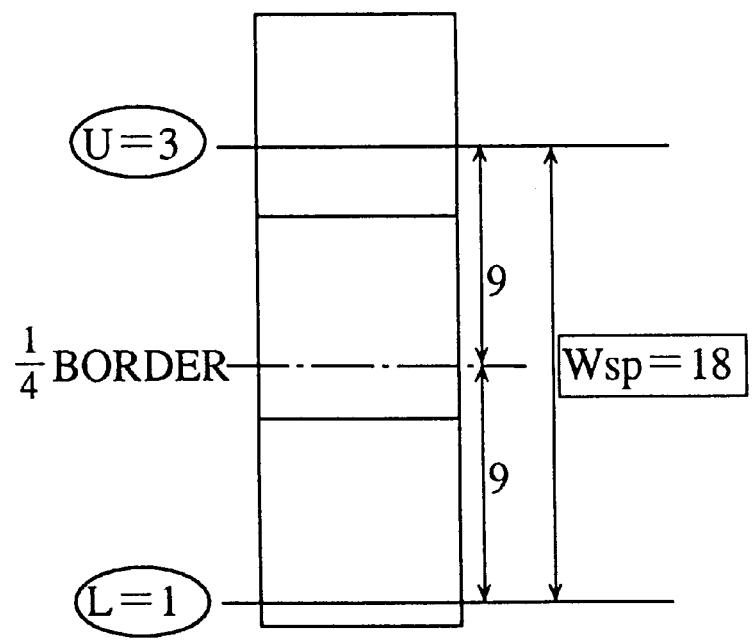
Figure 36A:
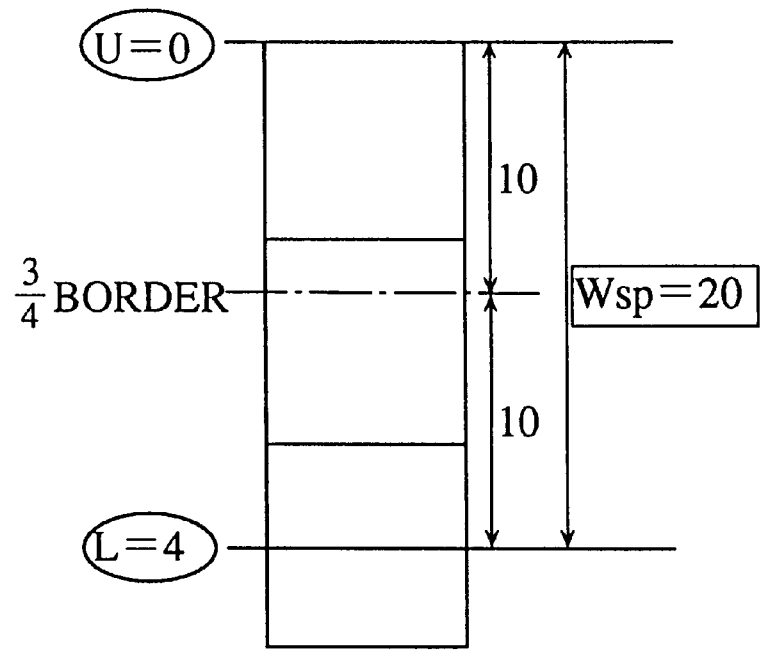
FIG. 36A and 36B show strokes whose center lines are placed on ¾ and ¼ subpixel borders, with stroke width $W_{sp}$ being 20.
Figure 36B:
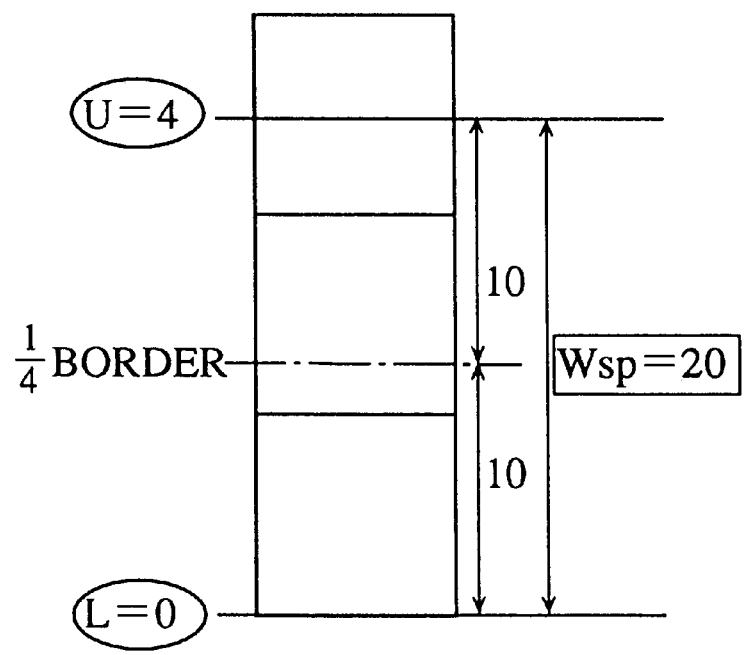
Figure 38A:
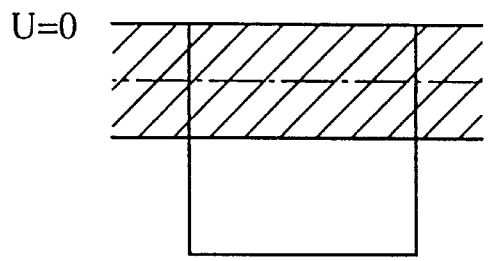
FIGS. 38A–38E show how strokes are positioned when stroke width $W_{sp}$ is below ½ pixel.
Figure 38B:
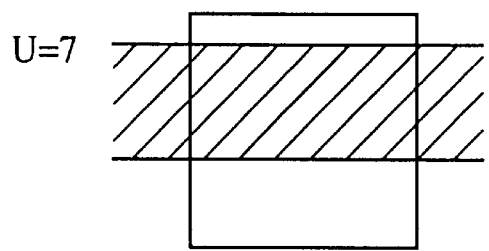
Figure 38C:
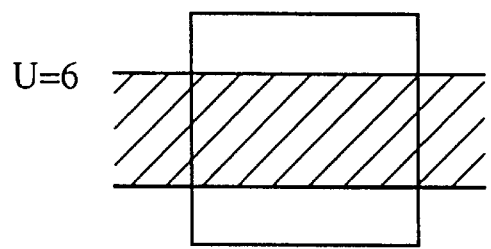
Figure 38D:
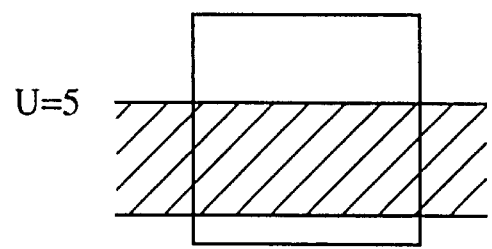
Figure 38E:
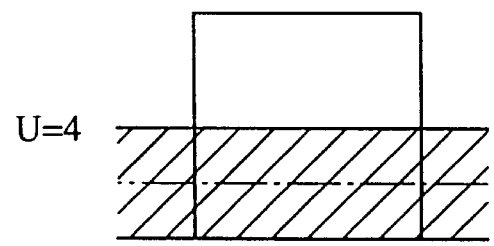

FIG. 26 is a detailed flowchart of the optimal arrangement preparation process executed by optimal arrangement preparation unit 13 in Step 203 in Loop 1 and Step 210 in Loop 3 in FIG. 22.

As shown in the figure, optimal arrangement preparation unit 13 calculates the potential optimal arrangement positions of a stroke if the stroke width is over ½ pixel (Step 230). The potential positions are expressed by the subpixel values of the stroke upper line. This is to say, a subpixel border counting from the pixel border at the bottom is used to express the optimal arrangement position. Potential optimal arrangement positions $U_1$ and $U_2$ of the stroke upper line are obtained from the following formulas (Step 231).
Formula 13

$U_1=((W_{sp}+4)\%8)/2$

Formula 14

$U_2=U_1+4$

Here, $W_{sp}$ represents stroke width after changing power, and % represents an operator for obtaining the remainder left by the division calculation. Therefore $(W_{sp}+4)\%8$ is the same as mod($(W_{sp}+4)$, 8).

The above two formulas are functions of stroke width. Once stroke width is determined, the subpixel value of a stroke upper line can be found, If $W_{sp}$ is 8 (subpixel), the potential optimal arrangement positions $U_1$ and $U_2$ are 2 and 6, respectively. If $W_{sp}$ is 9, they are 2.5 and 6.5, respectively. If $W_{sp}$ is 10, they are 3 and 7, respectively. At this stage, decimals are not changed to integers. Eventually, 2.5 is changed to 3 or 4 and 6.5 is 6 or 7, but here, optimal arrangement preparation unit 13 uses decimals in order to improve the accuracy of its calculation.

The following is a detailed explanation with reference to FIGS. 27A and 27B–36A and 36B as to how the above two formulas give the potential optimal arrangement positions of the stroke upper line. FIGS. 27A, 27B to FIG. 36A, 36B show position relation of strokes and pixels when stroke center line is placed on ¾ and ¼ borders in a pixel. FIGS. 27A and 27B–36A and 36B show the separate cases when stroke width $W_{sp}$ ranges from 8 to 13, 14, 16, 18, and 20.

In FIGS. 27A–36B, "U" represents subpixel value of an optimal arrangement position of a stroke upper line and "L" represents subpixel value of an optimal arrangement position of a stroke lower line. FIGS. 27A and 27B–36A and 36B show that when stroke width $W_{sp}$ increases by 1, "U" increases by 0.5. However, as "U" is subpixel value ($0 \leq L < 8$), it increases cyclically within a range of $0 \leq L < 8$. Also, FIGS. 27A and 27B–36A and 36B show that when stroke width $W_{sp}$ increase by one, "L" cyclically decreases by 0.5 within the range of $0 \leq L < 8$.

FIG. 37 is a table showing how U and L change along with changes of stroke width $W_{sp}$ in FIGS. 27A and 27B–36A and 36B. The reason value U is equal to or over 0 and below 4 is that smaller of the two values of Us in each of FIGS. 27A and 27B–36A and 36B is retrieved. Four is added to the other U, which is distance between ¼ border and ¾ border. As is obvious from the table, the subpixel value of 2U cyclically changes within a range of $0 \leq 2U < 8$ along with the changes of stroke width $W_{sp}$. As the remainder left by dividing stroke width $W_{sp}$ by 8 ($W_{sp}\%8$) changes with the same cycle of 2U, U can be obtained as a function of stroke width $W_{sp}$. Therefore, $2U=(W_{sp}+4)\%8$ is proved. In this way, subpixel values of optimal arrangement positions of an upper line can be calculated as a function of stroke width $W_{sp}$. Formula 13, which expresses one of the potential optimal arrangement positions $U_1$, is obtained in this manner. Formula 14, which represents the other potential optimal arrangement position $U_2$, is obtained by adding 4 to $U_1$.

Next, optimal arrangement preparation unit 13 calculates the movement amounts of the stroke upper line from the initial arrangement position (subpixel value) to potential optimal arrangement positions $U_1$ and $U_2$, respectively, and stores a list of potential movement amounts (which is referred to $M_1$ and $M_2$ hereinafter) in the stroke table. Specifically, optimal arrangement preparation unit 13 subtracts the potential optimal arrangement positions $U_1$ and $U_2$ from the initial arrangement position of a stroke upper line (subpixel value) to obtain $M_1$ and $M_2$ (Step 232), and adjusts the order of the potential movement amounts in order to maintain good balance of arrangement of strokes, in accordance with the arrangement positions of the other strokes when the stroke in question is moved by only a minimum amount (Step 233). Optimal arrangement preparation unit 13 further calculates the optimal arrangement positions of a stroke lower and upper lines according to the movement amount after the adjustment, end stores them in stroke table 12 (Step 233).

Moreover, when the stroke width is below ½ pixel in Step 230, optimal arrangement preparation unit 13 obtains the potential movement amounts of a stroke based on the initial arrangement position (subpixel value) of a stroke upper line and stroke width (subpixel value), so that the stroke is incorporated within one pixel (step 234).

The reason the above processes are executed instead of Steps 231–233 can be explained as follows.

When stroke width is below ½ pixel (4 subpixels in the present embodiment), so long as a stroke is incorporated within one pixel, it will look the same after the final reduction no matter where a stroke center line is placed. This can be explained by looking at FIGS. 38A–38E. Strokes are placed so that they are incorporated within one pixel in each of the five drawings, with stroke width $W_{sp}$ corresponding to four subpixels. In all of the illustrated examples, the luminosity of the pixel after reduction is 50% (Shade 4 in the eight shades of luminosity), so that they will all look the same in the final gray scaled data. Accordingly, optimal arrangement preparation unit 13 obtains the potential movement amount when stroke width is below ½ in Step 234 so that movement amount from the initial arrangement position becomes the smallest. This helps maintain the original shape of the character as much as possible after expanding/reduction process.

<Potential Movement Amount List Generation Process (Part 1)>

Figure 39:
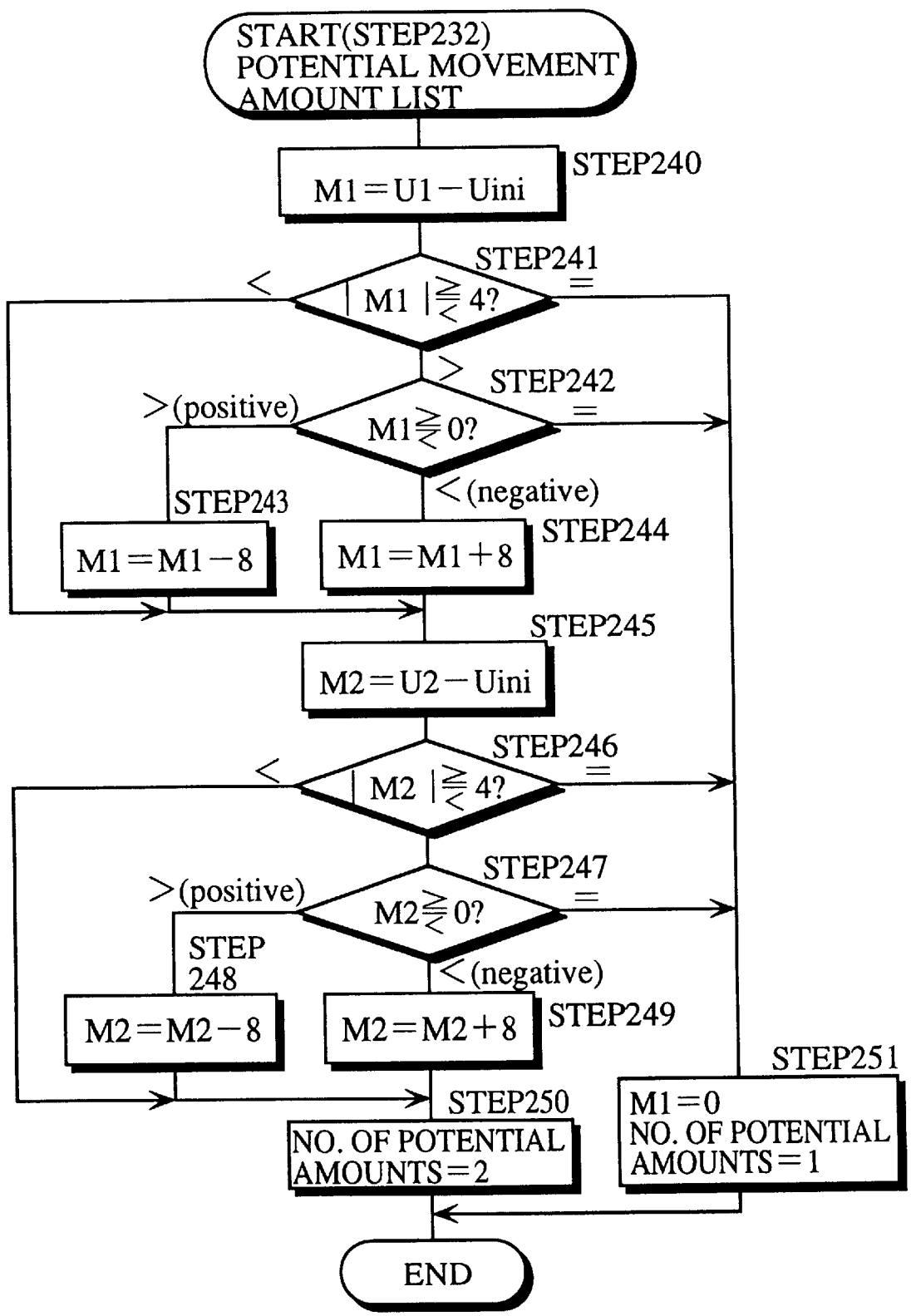
FIG. 39 is a detailed flowchart showing potential movement amount list process in Step 232 in FIG. 26.
Figure 40B:
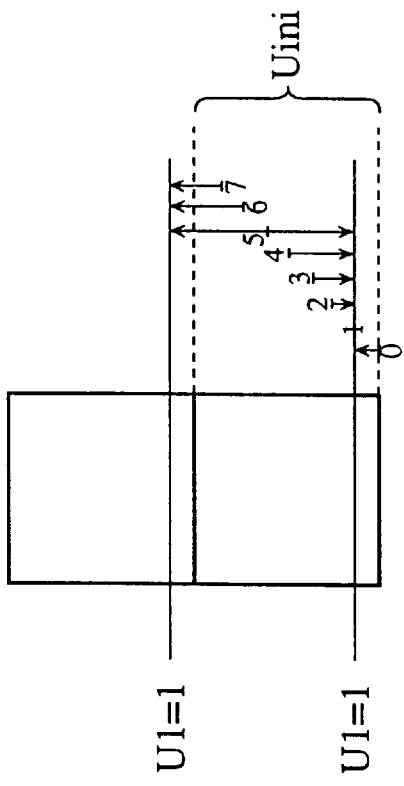
FIGS. 40A, 40B, and 40C show relation between potential positions $U_1$, $U_2$ expressed by relative coordinates and potential movement amounts.
Figure 40C:
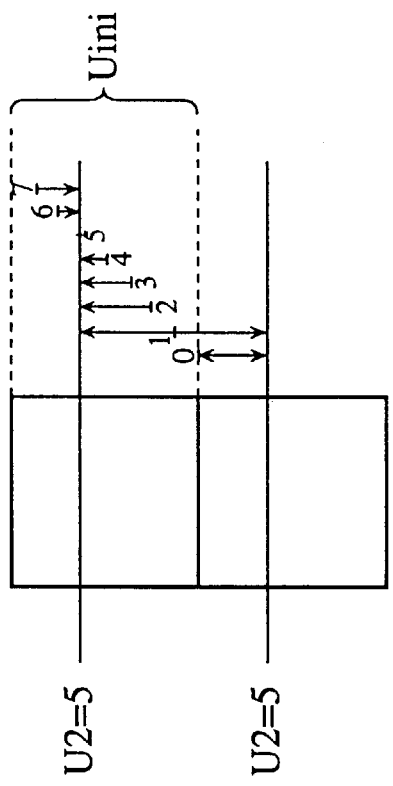
Figure 40A:
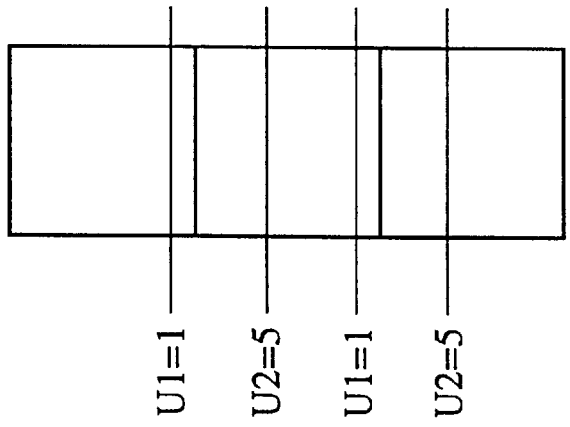

FIG. 39 is a detailed flowchart showing adjustment process executed by optimal arrangement preparation unit 13 in Step 232 in FIG. 26. Optimal arrangement preparation unit 13 obtains the movement amounts to potential optimal arrangement positions $U_1$ and $U_2$ calculated in Step 231. Specifically, as shown in FIG. 40A, potential optimal arrangement positions $U_1$ and $U_2$ are subpixel values expressed as relative coordinates in a pixel, so it is necessary to also consider the potential optimal arrangement positions $U_1$ and $U_2$ in an adjacent pixel. For the potential optimal arrangement position $U_1$, there are two possible movement amounts: one is movement to the potential optimal arrangement position $U_1$ in the same pixel as the initial position $U_{ini}$ of a stroke upper line; the other is movement to the potential optimal arrangement position $U_1$ in iv C;the pixel above. The same can be said for potential optimal arrangement position $U_2$. In FIG. 40A, the potential optimal arrangement positions $U_1$ and $U_2$ are 1 and 5 in each pixel. In FIG. 40B, arrows show the movement amounts from various initial arrangement positions $U_{ini}$ to the potential optimal arrangement positions $U_1$ in adjacent pixels. In this case, when $0 \leq U_{ini} \leq 4$, the movement amount from the initial arrangement position $U_{ini}$ to the potential optimal arrangement position $U_1$ in the same pixel is shorter than that from initial arrangement position $U_{ini}$ to the potential optimal arrangement position $U_1$ in the pixel above. When $U_{ini}=5$, the movement amount is the same for either pixel and when $6 \leq U_{ini} \leq 7$, the movement amount from the initial arrangement position $U_{ini}$ to the potential optimal arrangement position $U_1$ in the pixel above is shorter than that from the initial arrangement position $U_{ini}$ to the potential optimal arrangement position $U_1$ in the same pixel. As shown in FIG. 40C, when $2 \leq U_{ini} \leq 7$, the movement amount from the initial arrangement position $U_{ini}$ to the potential optimal arrangement position $U_2$ in the same pixel is shorter than that from the initial arrangement position $U_{ini}$ to the potential optimal arrangement position $U_2$ in the pixel below. When $U_{ini}=1$, the movement amount is the same for $U_2$ in either pixel and when $U_{ini}=0$, the movement amount from the initial arrangement position $U_{ini}$ to the potential optimal arrangement position $U_2$ in the pixel below is shorter than that from the initial arrangement position $U_{ini}$ to the potential optimal arrangement position $U_2$ in the same pixel. Optimal arrangement preparation unit 13 calculates the minimum potential movement amounts $M_1$ and $M_2$ for potential optimal arrangement positions $U_1$ and $U_2$, respectively, using the characteristics mentioned above.

In FIG. 39, optimal arrangement preparation unit 13 retrieves the potential optimal arrangement position $U_1$ and its initial arrangement position $U_{ini}$ for the stroke having ordinal number "i" from the stroke table, subtracts $U_{ini}$ from $U_1$, and stores the value of the difference in the stroke table as the potential movement amount $M_1$ (Step 240). If potential $U_1$ is a decimal, it is not changed to an integer. If the value is positive, it signifies upward movement, while if the value is negative, it signifies downward movement.

Next, optimal arrangement preparation unit 13 adjusts the movement amounts so as to be minimized in accordance with the relation between the magnitude of the potential movement amount $M_1$ and ½ pixel (four subpixels). Specifically, when $|M_1|=4$ (Step 241), since the other potential movement amount $M_2$ becomes 0 (which means the stroke is placed on either ¼ or ¾ subpixel border at the beginning), optimal arrangement preparation unit 13 updates a first potential movement amount $M_1$ to 0, and stores the number of potential amounts=1 in the stroke table (Step 251). If $|M_1|<4$ (Step 241), as shown by the arrows in FIG. 40B, $M_1$ represents the movement amount to the nearest potential arrangement position so that the value obtained in Step 240 is not changed. If $|M_1|>4$, during upward movement (Step 242:M>0), optimal arrangement preparation unit 13 subtracts eight from $M_1$ (Step 243) or during downward movement (Step 242: M<0), adds eight to $M_1$ (Step 244) so as to update the potential movement amount $M_1$ as shown in FIG. 40B.

After that, optimal arrangement preparation unit 13 obtains potential movement amount $M_2$ (Step 245) in the same manner as mentioned above, and adjusts it according to its value (Steps 246–249). After the adjustment, if $M_2$ is none of +4, −4 or 0, optimal arrangement preparation unit 13 stores "number of potential amounts=2" in the stroke table (Stop 250).

<Order of Potential Movement Amount Adjustment Process>

Figure 41:
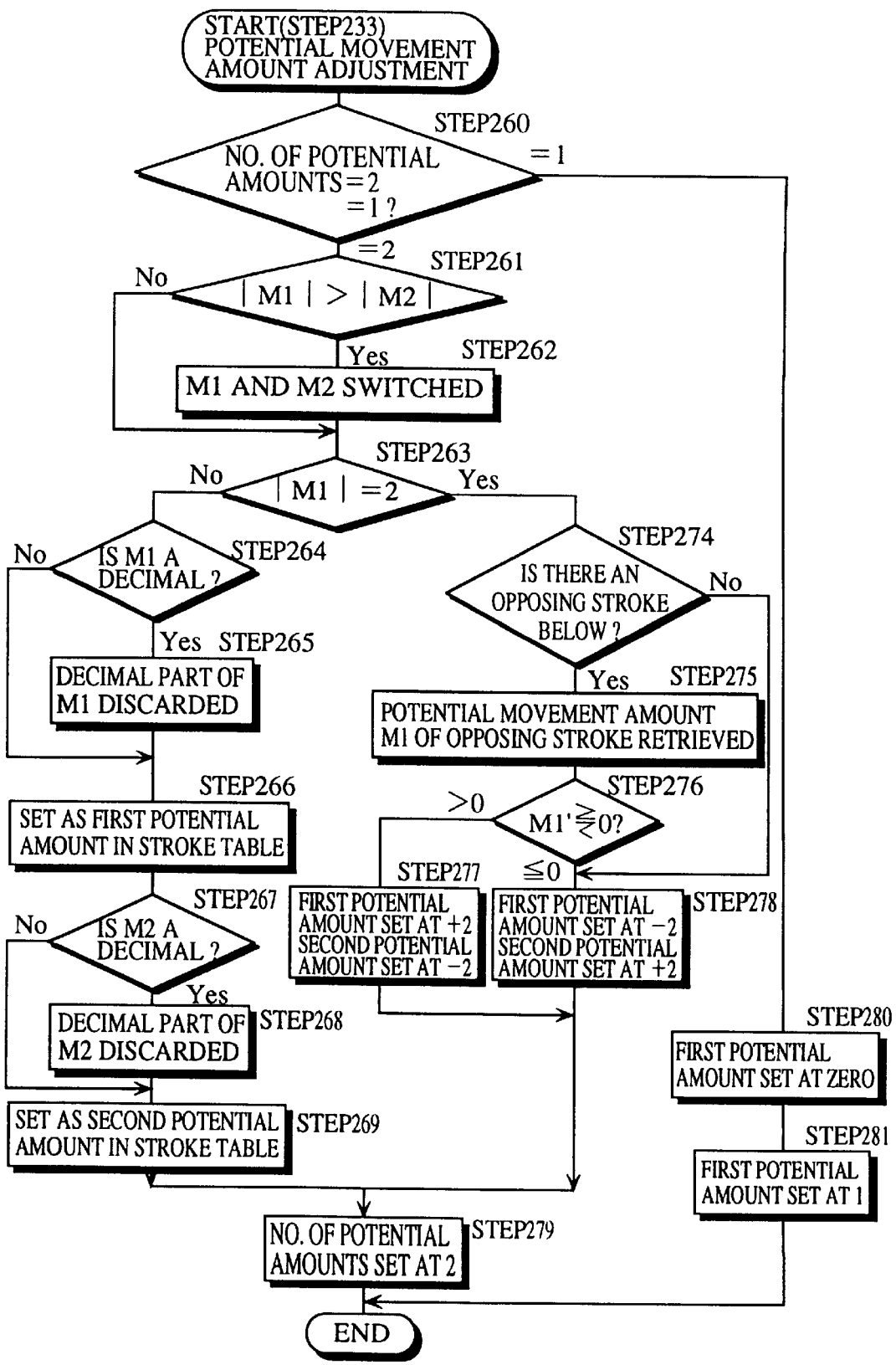
FIG. 41 shows a detailed flowchart showing the adjustment process of an order of potential movement amounts obtained by optimal arrangement preparation unit 13 in Step 233 in FIG. 26.

FIG. 41 shows a detailed flowchart showing the adjustment process of the order of potential movement amounts obtained by optimal arrangement preparation unit 13 in Step 233 in FIG. 26.

Optimal arrangement preparation unit 13 updates the first potential movement amount in the stroke table to 0 and the number of potential amounts to 1 when the number of potential movement amounts is 1 (Step 260, 280, and 281). When the number of potential movement amounts is 2, optimal arrangement preparation unit 13 updates the stroke table if necessary so that the potential movement amount $M_1$ or $M_2$ having the smaller absolute value becomes the first potential amount $M_1$.

Optimal arrangement preparation unit 13 judges whether the distance of movement of the first potential movement amount and of the second potential movement amount are the same, retrieving the first potential amount $M_1$ to find whether its absolute value is 2 or not. When the distance of movement of the two potential movement amounts is different (Step 263:no), optimal arrangement preparation unit 13 changes the value of the first potential movement amount to an integer if the amount is a decimal so that the absolute distance of movement is rounded down (steps 264 and 265), and sets the value as the first potential movement amount in the stroke table (Step 266). Decimal parts are discarded in this process, so that when $M_1$ is 2.5, it is changed to 2, and when if $M_2$ is −2.5, it is changed to −2. The same process is executed for the second potential movement amount (Steps 267–269). After that, optimal arrangement preparation unit 13 sets the number of potential movement amounts of the stroke table at 2 (Step 279).

When the distance of movement of the two potential movement amounts is the same (Step 263: yes) and there's no opposing stroke below after referring to opposing numbers in the stroke table (step 274: no), optimal arrangement preparation unit 13 sets the first potential movement amount at +2, and second potential movement amount at −2 (Step 278). If there is an opposing stroke below (Step 274: yes), optimal arrangement preparation unit 13 retrieves potential movement amount $M_1'$ of the opposing stroke (Step 275), and if $M_1'>0$, sets the first potential movement amount $M_1$ at +2 and second potential movement amount $M_2$ at −2 (Steps 276, and 277), and sets them in the stroke table (Step 279). By doing this, if the distances of movement of the two potential movement amounts are the same, then the direction of movement of the first potential movement amount $M_1$ is set at the same as the first potential movement amount of the opposing stroke below.

<Potential Movement Amount List Generation Process (Part 2)>

Figure 42:
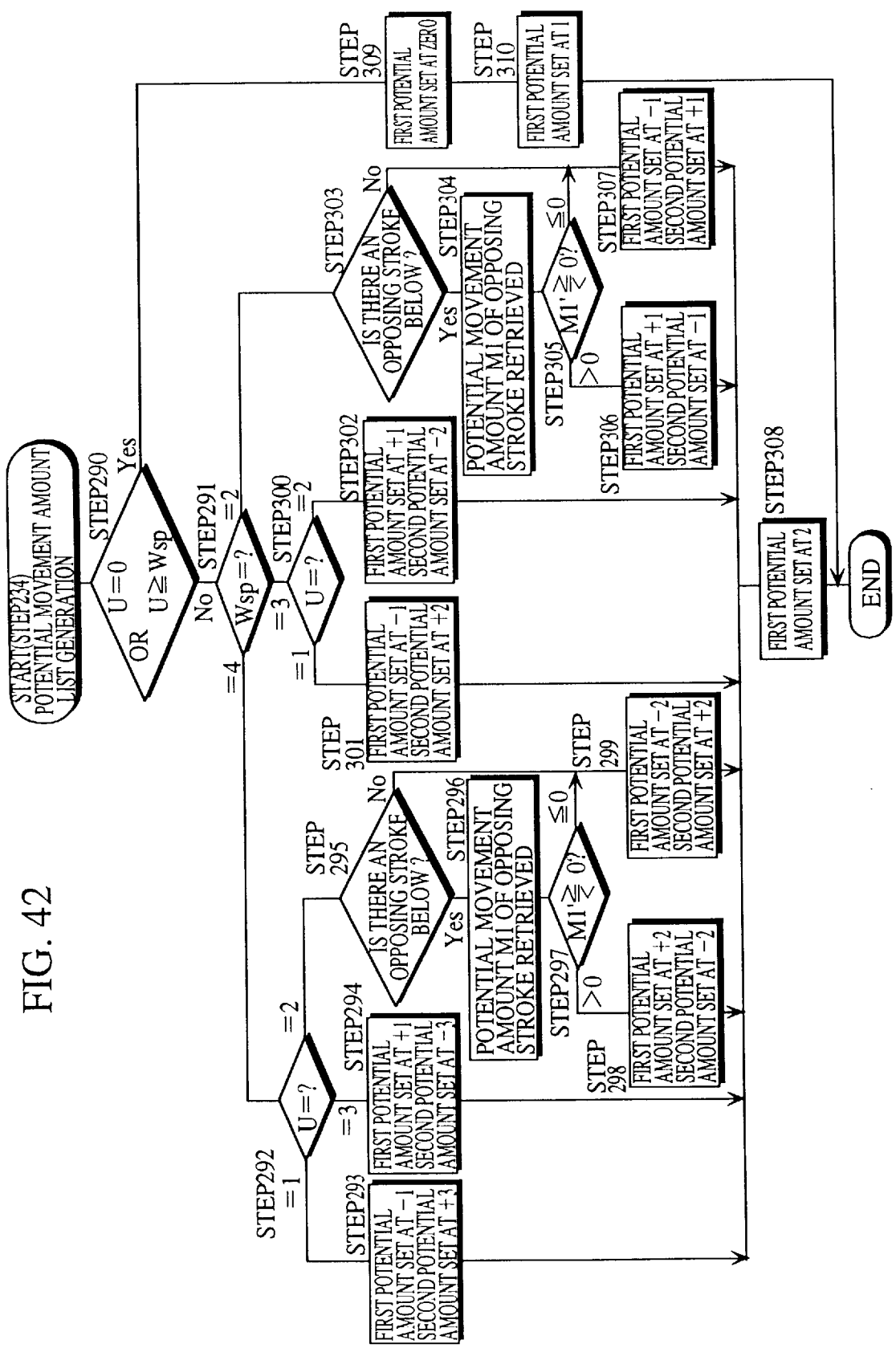
FIG. 42 is a detailed flowchart showing the potential movement amount list generation process executed by optimal arrangement preparation unit 13 when stroke width is below ½ pixel in Step 234 in FIG. 26.

FIG. 42 is a detailed flowchart showing the potential movement amount list generation process executed by optimal arrangement preparation unit 13 when stroke width is below ½ pixel in Step 234 in FIG. 26.

When stroke width $W_{sp}$ is below ½ pixel as in FIG. 42, optimal arrangement preparation unit 13 sets the first potential movement amount $M_1$ at 0 and the number of potential amounts at 1 before storing this information in the stroke table (Steps 309 and 310). This is because there is no need to move a stroke incorporated within one pixel if the subpixel value of the initial arrangement position of the upper line (U) is 0 or if this value of U is equal to or greater than stroke width $W_{sp}$ (Step 290; yes).

If U is not 0 and is smaller than $W_{sp}$ (Step 290; no), optimal arrangement preparation unit 13 determines the first and second potential movement amounts according to stroke width $W_{sp}$ and the value of upper line U. This determination process can be explained by means of FIG. 43. In FIG. 43, U is divided into two cases: in the first case, the stroke width $W_{sp}$ is incorporated within one pixel, while in the second case, a stroke traverses a pixel border. When a stroke is incorporated within one pixel, there is no need to move the stroke. When it traverses a pixel border, the stroke should be moved so that it is incorporated within one pixel. In FIG. 43, if stroke width $W_{sp}$ is 4 and the upper line U is 0 or 4–7, there is no need to move the stroke. Accordingly, the first potential movement amount $M_1$ is 0 and the number of potential amounts is 1. Here, if $W_{sp}=4$ and U=1, then the settings $M_1=-1$, $M_2=3$, and number of potential amounts=2 are made.

In FIG. 42, if $W_{sp}=4$ and U=1, optimal arrangement preparation unit 13 sets the potential movement amounts $M_1$ and $M_2$ at −1 and +3, respectively, in the stroke table (Steps 291–293). If $W_{sp}=4$ and U=3. Optimal arrangement preparation unit 13 sets the potential movement amounts $M_1$ and $M_2$ at +1 and −3, respectively (Step 294), If stroke width $W_{sp}=4$ and upper line U=2, the distances of movement of the two potential movement amounts are the same, so optimal arrangement preparation unit 13 sets the first potential amount $M_1$ at ±2 and the second potential amount $M_2$ at ±2, so that direction of movement of $M_1$ is the same as that of an opposing stroke below.

When stroke width $W_{sp}=2$ or 3, optimal arrangement preparation unit 13 sets the first and second potential movement amounts $M_1$ and $M_2$ in the same manner (Steps 300–307).

After that, optimal arrangement preparation unit 13 sets number of potential amounts at 2 in the stroke table.

<Optimal Arrangement Position Determination Process>

Figure 44:
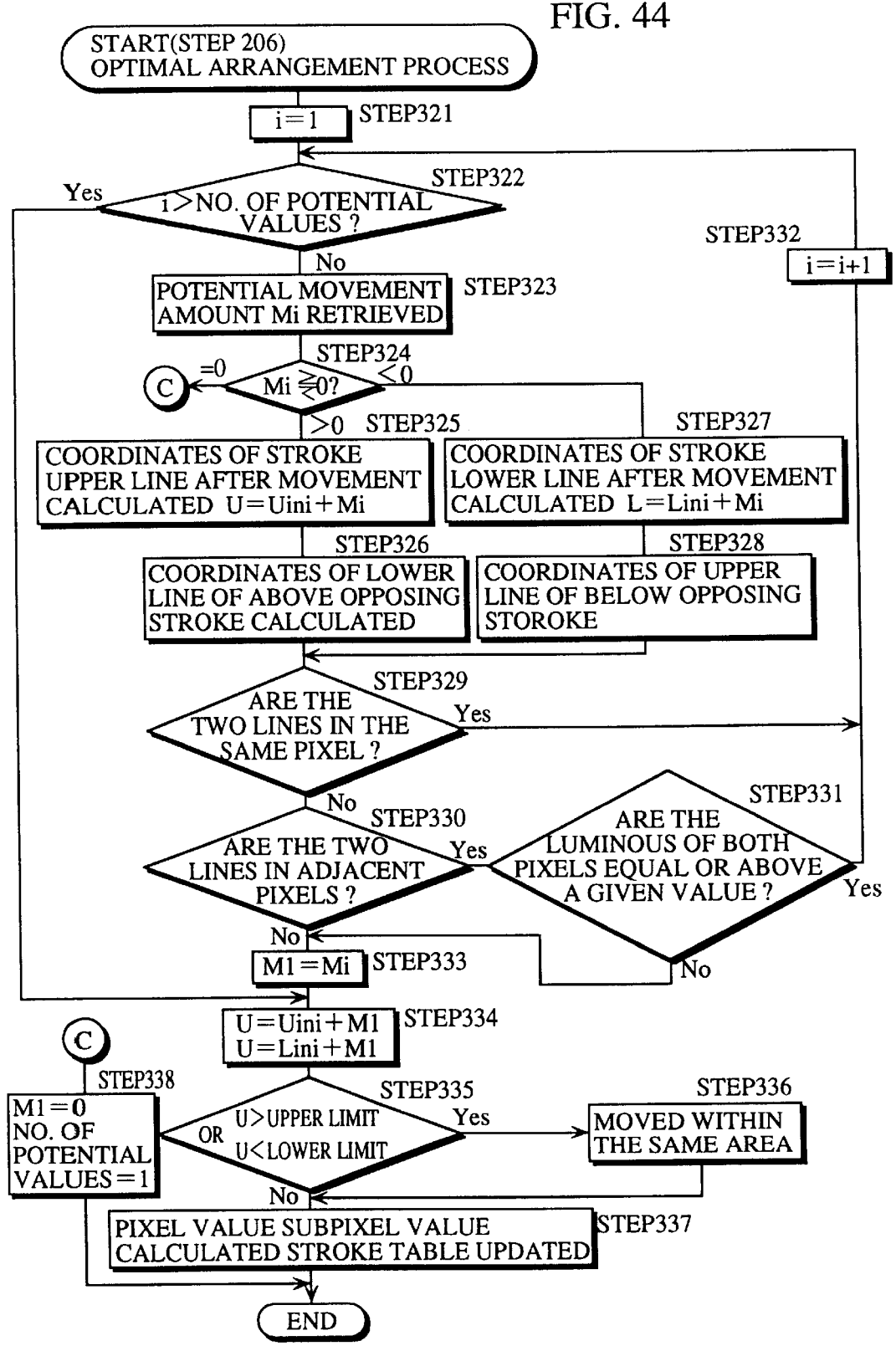
FIG. 44 shows a detailed flowchart for the optimal arrangement position determination process executed by optimal arrangement position determination unit 14 in Step 206 or 213 in FIG. 22.

FIG. 44 shows a detailed flowchart of the optimal arrangement position determination process executed by optimal arrangement position determination unit 14.

Optimal arrangement position determination unit 14 selects an optimal potential movement amount for each stroke according to the stroke table in which the movement amount list is stored by optimal arrangement preparation unit 13 and determines the optimal arrangement position based on the movement amounts.

Optimal arrangement position determination unit 14 initializes variable i to 1 in order to count potential movement amounts (Step 321), retrieves the first potential movement amount $M_1$ (Stops 322 and 223), and determines whether it represents upward movement or downward movement, in other words whether the Sign of $M_1$ is + or − (Step 324). If it is an upward movement, optimal arrangement position determination unit 14 calculates the Y coordinate of the stroke upper line after the movement ($U=U_{ini}+M_1$) and the Y coordinate of the lower line ($L'=L_{ini}'+M_1'$) of an opposing stroke above (shown by the opposing number) (Step 325, 326). If it is a downward movement, optimal arrangement position determination unit 14 calculates the Y coordinate of the stroke lower line after the movement ($L=L_{ini}+M_1$) and the Y coordinate of upper line ($U'=U_{ini}'+M_i'$) of opposing stroke below (shown by an opposing number) (Steps 327 and 328).

Optimal arrangement position determination unit 14 sets the potential movement amount at the potential movement amount $M_i$ if the following pairs of conditions (1) and (2) or (1) and (3) are satisfied based on the Y coordinates of the two strokes (U of one stroke and L of the other stroke). If the stated pairs of conditions are not satisfied, optimal arrangement position determination unit 14 selects a next potential movement amount as the potential movement amount $M_i$ and checks the conditions again. If none of the potential movement amounts satisfies the pairs of conditions the original first potential movement amount is selected.

Conditions (1) U and L are not in the same pixel
(2) U and L are not in the adjacent pixels
(3) U and L are in the adjacent pixels, but luminosity of either pixel is smaller than a given value. An upper limit is set to the given value so that darkness of the stroke does not exceed a certain degree. Specifically, it Is preferable that the given value is 50% or below.

If the two lines are in the same pixel (Step 329:yes) or if the two lines are in adjacent pixels (Step 330:yes) and the. luminosity of both these pixels are over a given value (Step 331:yes), optimal arrangement position determination unit 14 updates variable i and goes back to Step 322 (Step 332). Here, "Luminosity of the stroke" is the luminosity of the pixels in which the stroke upper line or lower lines is placed. Here, luminosity of the stroke is in proportion to the subpixel value for the case of an upper line and in proportion to 8 minus the subpixel value for a case of a lower line, If the luminosity is set a given value such as 25%, it is judged in Step 331 whether the subpixel value of the upper line is over 2 and subpixel value of the lower line is below 6.

If the two lines are not in the same pixel and not in the adjacent pixels (Step 329: no, Step 330: no), or if the two lines are in the adjacent pixels but luminosity of either stroke is smaller than a given value (Step 330: yes, 331:no), optimal arrangement position determination unit 14 sets the potential movement amount as the optimal first potential movement amount of the potential movement amount list (Step 332).

When the first potential movement amount $M_1$ satisfies (1) and (2) or (1) and (3), optimal arrangement position determination unit 14 sets $M_1$ as the optimal potential movement amount. When not $M_1$ but the second potential movement amount $M_2$ satisfies the pairs of conditions above, optimal arrangement position determination unit 14 sets $M_2$ as the optimal potential movement amount. When neither $M_1$ nor $M_2$ satisfies the conditions, optimal arrangement position determination unit 14 sets $M_1$ as the optimal potential movement amount.

After that, optimal arrangement position determination unit 14 calculates Y coordinate of the upper line ($U=U_{ini}+M_1$) at the stroke optimal arrangement position and Y coordinate of the lower line ($L-L_{ini}+M_1$) at the stroke optimal arrangement position from the first potential movement amount (optimal potential movement amount) $M_1$ in the potential movement amount list, (Step 334), moving the lower line into the area (Step 335, 336) if the Y coordinate is outside the submesh coordinate range of 80 (upper limit) to 0 (lower limit) and calculating the pixel value and subpixel value at the optimal arrangement position to update the stroke table (step 337).

The above explanation describes only the processing of horizontal strokes, but the processing for vertical strokes is the same except for X coordinates being used instead of Y coordinates.

The operation of the gray scaled data generation device of the present embodiment can be explained as follows.

The big difference between the gray scaled data generation devices of the first and second embodiments is that the present gray scaled data generation device calculates optional arrangement positions using Formulas 13 and 14 instead of using an optimal arrangement standard table. This is to say, when in the present embodiment, a stroke center line is placed on one of the ¼ and ¾ subpixel borders, the subpixel value of the stroke upper line is calculated using Formulas 13 and 14. Here, the initial arrangement process and optimal arrangement process are executed in order for all the strokes, which is also different from the first embodiment. However, a stroke center line is still placed on ¼ and ¾ subpixel border is whenever possible, which is the same with the first embodiment.

Here, suppose that initial arrangement unit 11 stores information about the initial arrangement of strokes for the Chinese character "担" "TAN" shown in FIG. 25A and 25B in the horizontal stroke table (FIG. 22, Step 202). This means that values are written into all the of columns in the stroke table shown in FIG. 24 except for the columns relating to the potential movement amount list. FIG. 45A–45B show how horizontal strokes are placed at this time. FIG. 45A shows the Chinese character "担" "TAN" stared in the stroke table in FIG. 24, while FIG. 45B is an enlargement of the parts which have been ringed. The five strokes are numbered as horizontal strokes 1–5 starting from the bottom, and subpixel values are shown for upper and lower lines for each stroke. FIG. 45B shows initial arrangement positions. In FIG. 45B, a center line of each stroke is not necessarily placed on ¼ and ¾ borders.

After this, optimal arrangement preparation unit 13 executes the optimal arrangement preparation process (FIG. 26) for each stroke.

For stroke 1, optimal arrangement preparation unit 13 calculates potential optimal arrangement positions $U_1= ((W_{sp}+4)\%8)/2=3((9+4)\%8)/2=2.5$ and $U_2=U1+4=6.5$ (FIG. 26, Step 231) and potential movement amount $M_1=U_1-U_{ini}= 2.5 -0=2.5$ (FIG. 39 Step 240). As $|M_1|<4$, (FIG. 39, Step 241), optimal arrangement preparation unit 13 stores $M_1=2.5$ as a first potential movement amount of stroke 1 in the potential movement amount list, and calculates the potential movement amount $M_2=U_2-U_{ini}=6.5-0=6.5$ (FIG. 39, Step 240). As $|M_2|>4$ and $M_2>0$ (Steps 246 and 247), optimal arrangement preparation unit 13 stores $M_2=6.5-8=-1.5$ (Step 248) as the second potential movement amount of stroke 1 in the potential movement amount list, as well as storing 2 as the number of potential amounts.

At this point, in the potential movement amount list of stroke 1, $M_1$ is +2.5, $M_2$ is −1.5, and the number of potential amounts is 2. Subsequently, optimal arrangement preparation unit 13 retrieves $M_1$ and $M_2$ from the potential movement amount list. As $|M_1|>|M_2|$, (FIG. 41, Step 261: yes), optimal arrangement preparation Unit 13 switches $M_1$ and $M_2$ in the potential movement amount list (Step 262). After that, $|M_1|=2$ is not true (Step 263:no) and $M_1$ is a decimal (Step 264: yes), so the decimal part of $M_1$ is discarded (Step 265) and $M_1=-1$ is set as the first potential movement amount in the potential movement amount list (Step 266). $M_2$ is also a decimal (Step 267: yes), so the decimal part of $M_2$ is discarded (step 268) and $M_2=+2$ is set as the second potential movement amount in the potential movement amount list (Step 269). The number of potential amounts is set at 2 (Step 279).

For stroke 2, optimal arrangement preparation unit 13 calculates potential optimal arrangement position $U_1-((W_{sp}+4)\%8)/2=((9+4)\%8)/2=2.5$, $U_2=U_1+4=6.5$ (FIG. 26, Step 231) and potential movement amount $M_1=U_1-U_{ini}=2.5-1=1.5$ (FIG. 39, Step 240). As $|M_1|<4$ (FIG. 26, Step 241), optimal arrangement preparation unit 13 stores $M_1=1.5$ as a first potential movement amount of stroke 2 in the potential movement amount list, and calculates potential movement amount $M_2-U_2-U_{ini}=6.5-1=5.5$ (FIG. 39, Step 240). As $|M_2|>4$ and $M_2>0$ (Steps 246, 247), optimal arrangement preparation unit 13 stores $M_2=5.5-8=-2.5$ (Step 248) as a second potential movement amount of stroke 2 on the potential movement amount list, and stores number of potential amounts at 2.

At this point, on the potential movement amount list of stroke 2, $M_1$ is +1.5, $M_2$ is −2.5, and number of potential amounts is 2. Subsequently, optimal arrangement preparation unit 13 retrieves $M_1$ and $M_2$ from the potential movement amount list. Since $|M_2|>|M_2|$ is not true (FIG. 41, Step 261: no), $|M_1|=2$ is not true (Step 263:no), and $M_1$ is a decimal(Step 264:yes), optimal arrangement preparation unit 13 discards decimal part of $M_1$ (Step 265) and sets $M_1=+1$ as a first potential movement amount in the potential movement amount list (Step 266). $M_2$ is also a decimal (Step 267:yes), so optimal arrangement preparation unit 13 discards decimal part of $M_2$ (step 268) and sets $M_2=-2$ as the second potential movement amount in the movement potential movement amount list (Step 269), as well as setting the number of potential amounts at 2 (Step 279).

For stroke 3, optimal arrangement preparation unit 13 calculates potential optimal arrangement positions $U_1=((W_{sp}+4)\%8/2=((8+4)\%8)/2=2$, $U_2=U_1+4=6$ (FIG. 26, Step 231), and potential movement amount $M_1=U_1-U_{ini}=2-1=1$ (FIG. 39, Step 240). As $|M_1|<4$ (FIG. 39, Step 241), optimal arrangement preparation unit 13 stores $M_1=1$ as the first potential movement amount on the potential movement amount list, and calculates potential movement amount $M_2=U_2-U_{ini}=6-1=5$ (FIG. 39, Step 240). As $|M_2|>4$ and $M_2>0$ (Steps 246 and 247), optimal arrangement preparation unit 13 stores $M_2=5-8=3$ (Step 248) as the second potential movement amount of stroke 3 in the potential movement amount list, as well as storing 2 as the number of potential amounts.

At this point, on the potential movement amount list of stroke 3, $M_1$ is +1.0, $M_2$ is −3.0 and the number of potential amounts is 2. Subsequently, the optimal arrangement preparation unit 13 retrieves $M_1$ and $M_2$ from the potential movement amount list. As $|M_1|>|M_2|$ (FIG. 41, Step 261: no), $|M_2|=_2$ is not true (Step 263:no), and $M_1$ is not a decimal (Step 264: no), optimal arrangement preparation unit 13 nets $M_1=+1$ as the first movement amount in the potential movement amount list (Step 266). $M_2$ is neither a decimal (Step 267: no), so optimal arrangement preparation unit 13 sets $M_2=-2$ as the second potential movement amount in the potential movement amount list (Step 269) and sets the number of potential amounts at 2 (Step 279).

Then optimal arrangement preparation unit 13 calculates potential movement amounts of strokes 4 and 5 in the same manner and stores them in the potential movement amount list in the stroke table along with the number of potential amounts, adjusting their order as it does so. Consequently, potential movement amount list of every stroke at this point is determined as follows.

Stroke 1: $M_1=-1$, $M_2=+2$, number of potential amounts=2
Stroke 2: $M_1++1$ $M_2=-2$, number of potential amounts=2
Stroke 3: $M_1-+1$ $M_2=-3$, number of potential amounts=2
Stroke 4; $M_1-+1$ $M_2=-3$, number of potential a mounts=2
Stroke 5: $M_1=-1$ $M_2=+3$, number of potential amounts=2

FIG. 45C shows how strokes are positioned at this point (after the optimal arrangement preparation process). In FIG. 45C, each stroke is arranged at 2 position given by (initial arrangement position + the first potential movement amount $M_1$). In FIG. 45C, the center line of each stroke falls exactly on one of the ¼ and ¾ borders. Accordingly, the thickness of each stroke will look the same after the reduction of outline date.

Next, optimal arrangement position determined unit 14 determines the optimal arrangement position for each stroke (FIG. 22, Step 206).

For stroke 1, optimal arrangement position determination unit 14 retrieves potential movement amount $M_1=-1$ (FIG. 44, Steps 321–333), calculator, coordinates of the lower line after movement ($L=L_{ini}+M_1=7-1=6$), and coordinates of upper line of opposing stroke below (Steps 327 and 328). As an opposing stroke does not exist (Step 329, 330:no), optimal arrangement position determination unit 14 confirms $M_1$ in the potential movement amount list, calculates coordinates of the upper line ($U=U_{ini}+M_1=16-1=15$), and coordinates of the lower line, ($L-L_{ini}+M_1=6$) (Step 334), and updates the stroke table, using those values as optimal arrangement positions (Steps 333–335, and 337).

As for stroke 2, optimal arrangement position determination unit 14 retrieves potential movement amount $M_1=+1$ (FIG. 44, Steps 321–333), and calculates coordinates of stroke upper line after movement ($U=U_{ini}+M_1=41+1=42$) (Step 325), calculates coordinates of lower line of opposing stroke above ($L=L_{ini}+M_1=57+1=58$) (Step 326). As U and L are neither in the same pixel nor in adjacent pixels (Steps 329 and 330:no), optimal arrangement position determination unit 14 calculates coordinates of upper line ($U-U_{ini}+M_1-41+1=42$) and coordinates of lower line ($L-L_{ini}+M1=32+1-33$), and updates the stroke table, using these values as the optimal arrangement position. (Steps 333–335, 337).

As for stroke 3, optimal arrangement position determination unit 14 retrieves potential movement amount $M_1=+1$ (FIG. 44, Steps 321–333), calculates coordinates of stroke upper line after the movement ($U=U_{ini}+M_1=79-1=78$) (Step 326). As shown In FIG. 45C, upper line of stroke 3 and lower line of stroke 5 are in the adjacent pixels (Step 330:yes), and the luminosity of each pixel is over a given value of 25% (25% each) (Step 331: yes). Therefore, optimal arrangement position determination unit 14 updates i to 2

(Step 332), and moves the process to the next potential movement amount (Step 322).

Subsequently, optimal arrangement position determination unit 14 retrieves the second potential movement amount M2=−3 (FIG. 44, Steps 321–333), and calculates coordinates of stroke lower line after movement (L=$L_{ini}$+$M_1$=57−3=54) (Step 327), and calculates coordinates of upper line of horizontal stroke 2 (U=$U_{ini}$+$M_1$=41+1−42) (Step 328). The U and L are in the adjacent pixels (Step 330:yes), and luminosity of the two pixels (25% each) is 25% over a given value (Step 331:yes), so optimal arrangement position determination unit 14 updates i to 3 (Step 332). As the next potential movement amount does not exist (step 322: yes), optimal arrangement position determination unit 14 determines the original first potential movement amount as the optimal arrangement position, with the potential movement amount list not being updated (Step 334). Consequently, coordinates of upper line of stroke 3 (U=$U_{ini}$+$M_1$=65+1= 66), and coordinates of lower line of stroke 3 (L=$L_{ini}$+$M_1$= 57+1=58) as optimal arrangement positions are stored in the stroke table. Neither $M_1$ and $M_2$ of stroke 3 satisfies the condition (3) mentioned above, so that optimal arrangement position determination unit 14 determines $M_1$ as the optimal arrangement position since the distance of movement is shorter.

As for stroke 4, optimal arrangement position determination unit 14 calculates upper and lower lines according to the first potential movement amount in the same way as stroke 2.

As for stroke 5, optimal arrangement position determination unit 14 calculates upper and lower lines according to the second potential movement amount, since even though the first potential movement amount does not satisfy the condition of (3), the second potential movement amount does.

As a result of the optimal arrangement determination process, upper and lower lines of each stroke are positioned as shown in FIG. 45D. In FIG. 45D, center lines of all strokes exactly fall on ¼ and ¾ subpixel boarders like FIG. 45C. However, strokes 3 and 5 are not positioned in the adjacent pixels in FIG. 45D. Therefore, thickness of each stroke after reduction looks the same. In addition to that, clear space can be seen between strokes 3 and 5 after reduction.

The following is an explanation of other example operations.

Figure 46A:
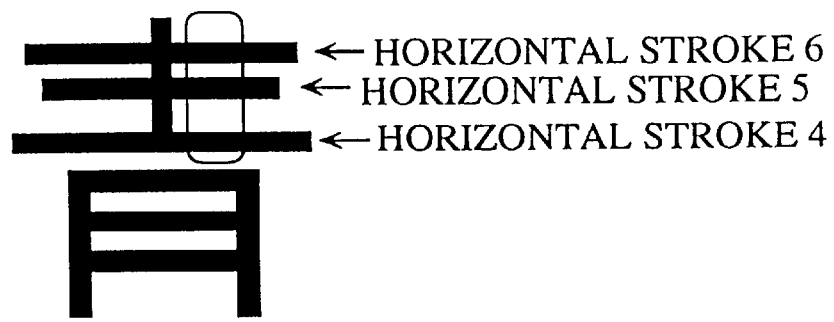
FIG. 46A is an example of outline data for a Chinese character "青" "AO"
Figure 46B:
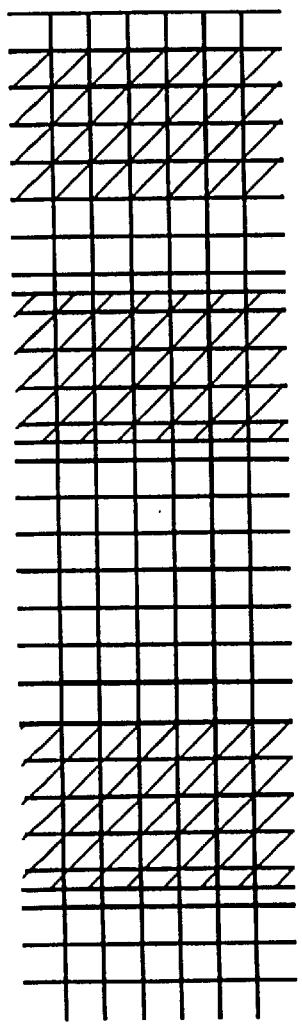
FIG. 46B shows initial arrangement positions of horizontal strokes 4–6 in the Chinese character "青" "AO"
Figure 46C:
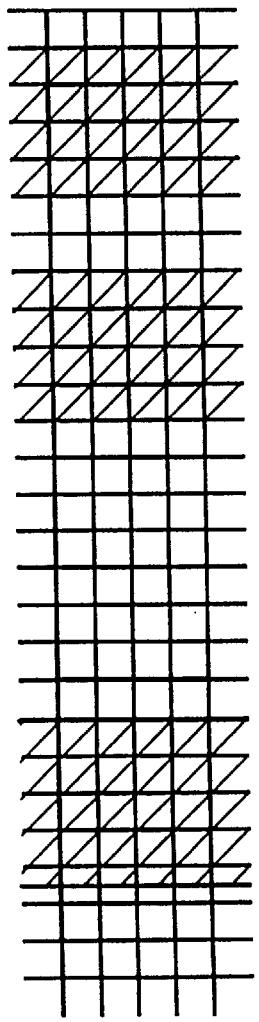
FIG. 46C shows arrangement positions of 40B which are applied optimal arrangement preparation process.

FIG. 46A is an example of outline data for the Chinese character "青" "AO" meaning "blue", FIG. 46B is an enlargement of horizontal strokes 4–6 of the upper part of the character, showing the initial arrangement positions stored in the stroke table by the initial arrangement unit 11. FIG. 46C shows stroke positions when strokes are arranged according to the first potential movement amount $M_1$ in the potential movement amount list created by optimal arrangement preparation unit 13. At this time, the center line of each stroke exactly falls on one of the ¼ and ¾ pixel borders so that the thickness of each stroke will look the same after reduction. However, the gap between strokes 5 and 6 is narrow, so that these strokes may appear as if they are a combined line after reduction.

In FIG. 46C, the Y coordinate of the upper line of stroke 5 when it is moved to the first potential movement amount $M_1$ and the Y coordinate of the lower line of opposing stroke 6 above are in adjacent pixels (FIG. 44, Step 330:yes) and luminosity of each pixel (each over 75%) is greater than a given value (30%) (Step 331: yes) so that optimal arrangement position determination unit 14 checks the second potential movement amount for stroke 5.

Figure 46D:
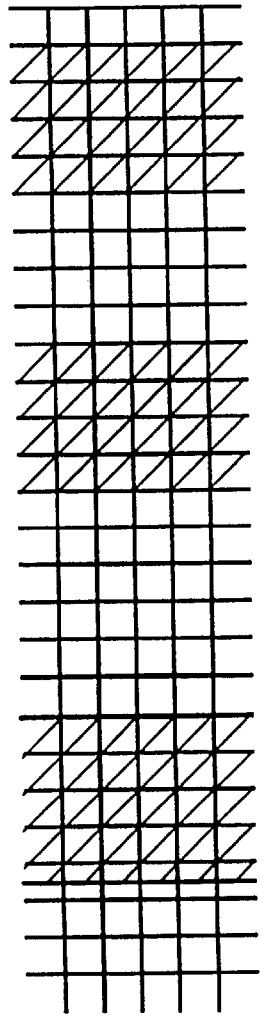
FIG. 46D shows arrangement positions of 40B which are applied optimal arrangement position process.
Figure 47A:
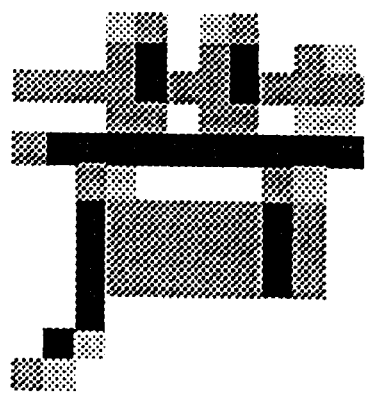
FIGS. 47A–47F show examples of generated gray scaled data of 12 by 12 pixel size.
Figure 47B:
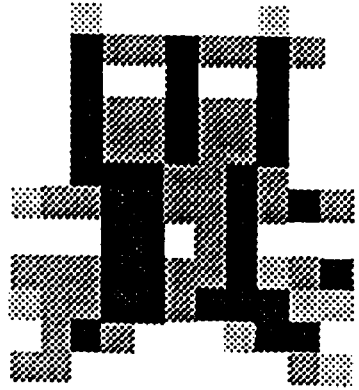
Figure 47C:
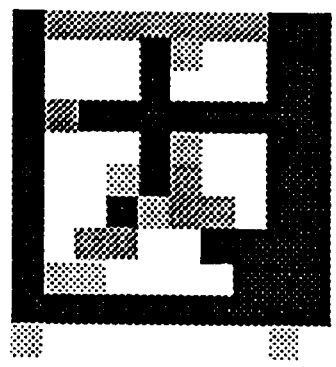
Figure 47D:
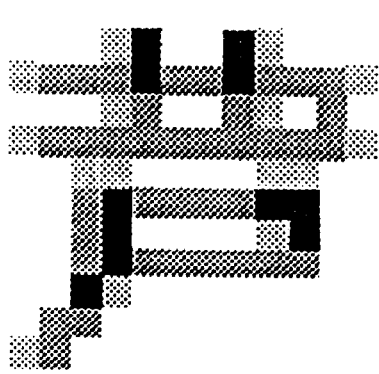
Figure 47E:
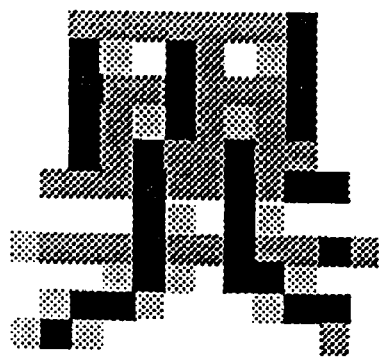
Figure 47F:
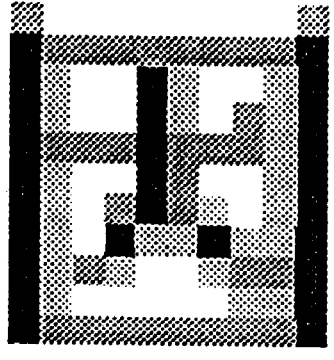
Figure 48A:
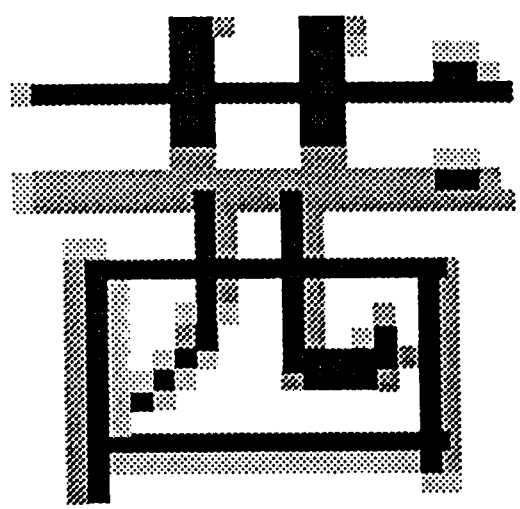
FIGS. 48A–48D show examples of generated gray scaled data of 24 by 24 pixel size.
Figure 48B:
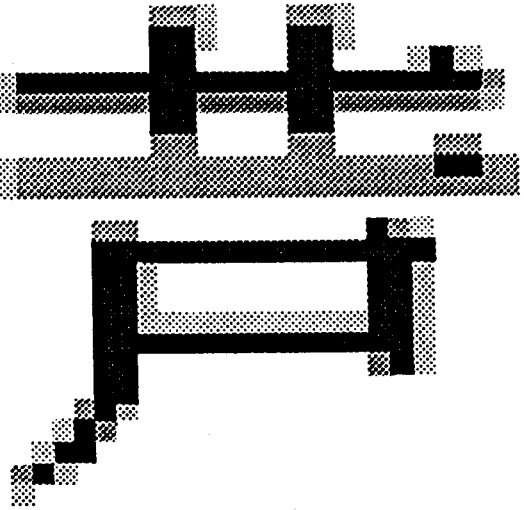
Figure 48C:
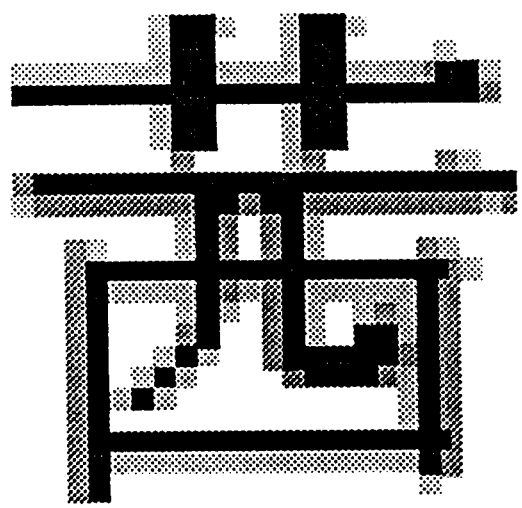
Figure 48D:
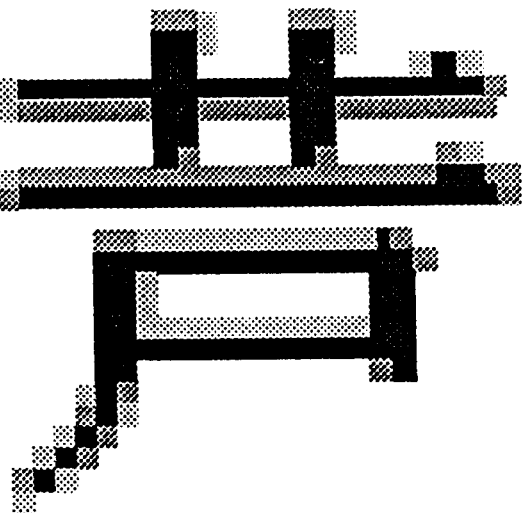

As the Y coordinate of the lower line of stroke 5 and the Y coordinate of the upper line of opposing stroke 4 below neither fall in adjacent pixels nor in a same pixel when stroke 5 is moved by the second potential movement amount M2, (Steps 329 and 330:no), optimal arrangement position determination unit 14 updates $M_1$ to $M_2$ in the potential movement amount list and calculates coordinates of upper and lower lines at the optimal arrangement position based on movement amount $M_2$. FIG. 46D shows each stroke at its optimal arrangement position. By comparing the arrangements in FIGS. 46B, 46C and 46D, it can be seen that the luminosity of the pixel in which upper line of horizontal stroke 5 is arranged is 63% in FIG. 46B, 75% in FIG. 46C, and 25% in FIG. 46D. In all the three drawings, horizontal strokes 5 and 6 are arranged to face with each other after reduction. In FIGS. 46B and 46C, the two strokes will look blurred with there being no space between them, whereas for FIG. 46D each of the two strokes will be displayed clearly since the luminosity is low in the pixel in which the top line of stroke 5 appears.

After this, outline information expansion/reduction unit 15 converts the coordinate values in the stroke table except for those of upper and lower lines so that they are interpolated in-between the coordinates of upper and lower line in the same way as outline information expansion/reduction unit 107 in the first embodiment.

The following is a concrete example of generating gray scaled date according to the present embodiment show as to illustrate its effect.

FIGS. 47A–47F shows examples of generated gray scaled data of 12 by 12 pixel size. Characters in the upper row were generated by a conventional method while those in the lower row were generated by the gray scaled data generation device of the present embodiment. The characters are shown enlarged so as to illustrate the eight shades of gray scaled data obtained from outline data of the character "声" "ASHI", "昜" "KOTO" and "因" "IN".

As for "声" "ASHI", the center part of the "戸" component is shaded by the conventional art; but it is clearly displayed by the gray scaled data generation device of the present embodiment. As for "昜", the lower half of the "田" component is shaded and vertical stroke on the left side of "共" is thick in the conventional art depiction, but for the gray scaled data generation device of the present embodiment, "田" is clearly displayed and there is also a favorable balance of the vertical strokes of the "共" component. As for "因", the vertical stroke on the right side of "口" is thick in the conventional art depiction, while they are well balanced in the display by the gray scaled data generation device of the present embodiment.

FIGS. 48A–48D are examples of generated gray scaled data of 24 by 24 pixel size. Again, the characters in the upper row were generated by a conventional method while those in the lower row were generated by the gray scaled data generation device of the present embodiment. For the character "茜" "AKANE", the second horizontal stroke looks blurred in the conventional art depiction, but it is displayed clearly by the gray scaled data generation device of the present embodiment. As for "声" "ASHI", the thickness of each horizontal and vertical stroke keeps good balance with that of slanting lines or curved lines, ("丿" of "声") expressed in middle tones, resulting in the character being display in a natural and attractive manner.

FIGS. 49A–49J are examples of generating gray scaled data having 16 by 16 pixels. Here also, the characters in the upper row were generated by a conventional method while those in lower rows were generated by the gray scaled data generation device of the present embodiment. As for "茨" "ITSU", the inside of "皿" "SARA" is shaded by the conventional art, but it is displayed clearly by the gray scaled data generation device of the present embodiment. Thanks to the gray scaled data generation device of the present embodiment, the first and second horizontal strokes from the top of "哀" "AWAREMU" are displayed clearly, as is the top horizontal stroke of "葵" "AOI" and the first, second, and fourth horizontal stroke from the top of "茜" "AKANE" are displayed clearly. The vertical strokes of "旭" "ASAHI" are also displayed with good balance.

In the present embodiment, optimal arrangement preparation unit 13 has been described as executing processing starting with a stroke having the lowest value coordinates, retrieving strokes stored in stroke table 12 in ascending order. It is of course also possible to give priority to the strokes and execute process from the highest value coordinates. In such a case, initial arrangement unit 11 stores information about priority in stroke table 12, and optimal arrangement preparation unit 13 executes process from the highest priority. In allocating priority, a key stroke in defining the form of a character can be given the highest priority, such as the fourth horizontal stroke from the top for the character "量" "RYO", or the top and bottom strokes for the characters "日" "HI" and "里" "SATO". In this way, the essential form of a character can be clearly Illustrated.

It should be noted that instead of using Formulas 13 and 14, the following formulas for obtaining a potential position of a lower line can be used.

$$L_1=(7-(W_{sp}+3)\%8)/2, L_2=L_1+4$$

Also, in the present embodiment, optimal arrangement position determination unit 14 calculates coordinates of an upper or lower line after movement according to the first potential movement amount (FIG. 44, Steps 325–326) and executes Steps 329–331 according to the calculated coordinates. However, optimal arrangement position determination unit 14 can execute Steps 329–331 using the pixel value of the initial arrangement position without calculating coordinates of the upper or lower line after movement. In such a case, the optimal arrangement position determination unit 14 can omit the time-consuming processes of calculating coordinates and so operate at higher speed, The present embodiment had been described as using 8 by 8 submesh, although 16 by 16 submesh can be used, In such a case, the following formulas can be used instead of Formulas 13 and 14 in order to obtain potential positions of an upper line.

$$U_1=((W_{sp}+8)\%16)/2, U_2=U_1+8$$

In 16 by 16 submesh, the optimal arrangement position of a lower line can be used instead of that of an upper line. In this case, the following formulas are used to obtain the potential optimal arrangement positions.

$$L_1=(15-(W_{sp}+7)\%16)/2, L_2=L_1+8$$

Also, 4 by 4 submesh can be used, In this case, the potential optimal arrangement positions of an upper line can be obtained from the following formulas.

$$U_1=((W_{sp}+2)\%4)/2, U_1=U_1+2$$

THIRD EMBODIMENT

The construction of the present embodiment differs to that of the first embodiment in that it features the new Steps 4202a to 4204c between Steps 1204 and 1205 in FIG. 12.

Figure 50:
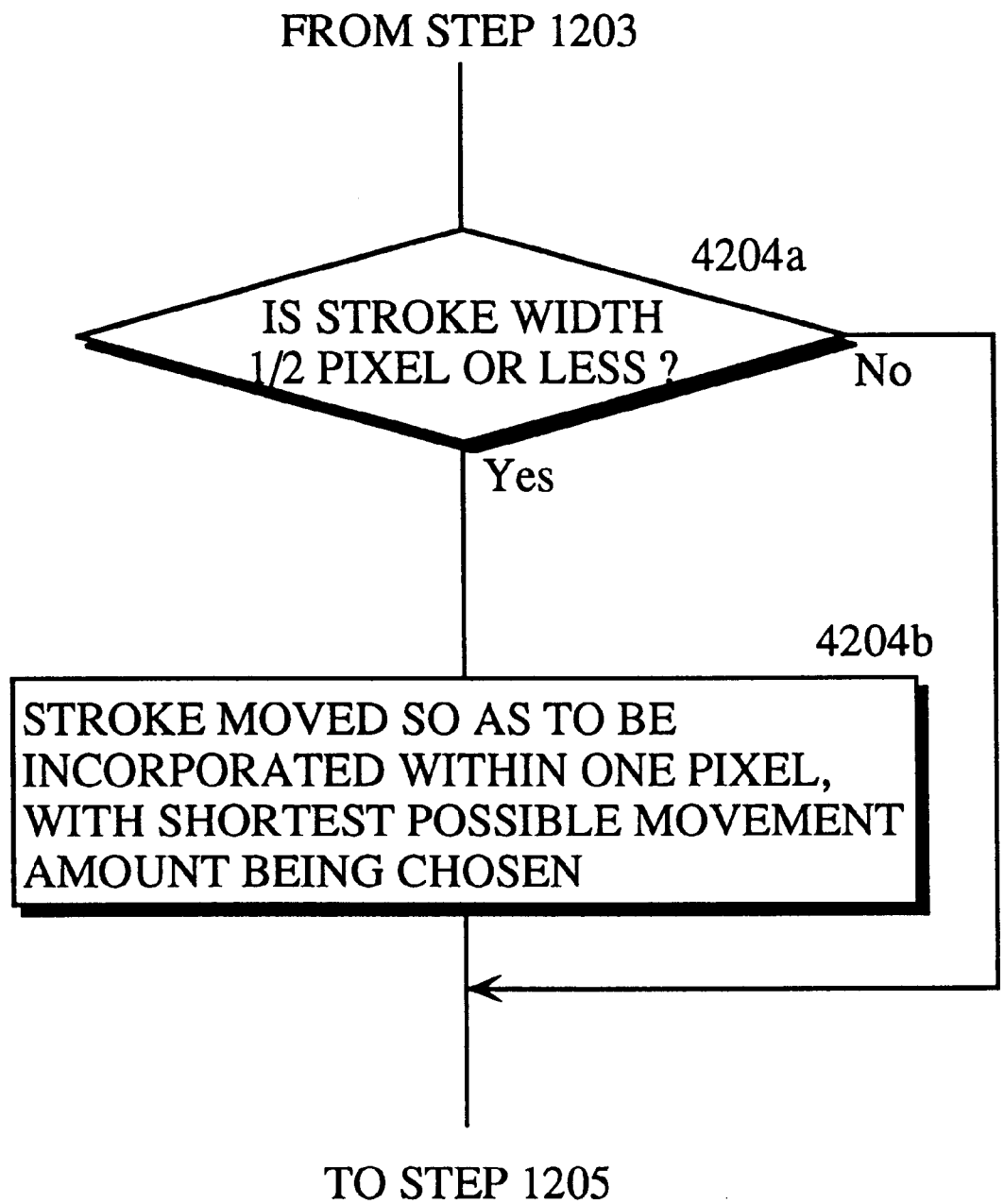
FIG. 50 shows a processing flow considering the case when stroke width is below ½ pixel in the third embodiment.

FIG. 50 shows the processing flow considering the case when stroke width is below ½ pixel.

In Step 1205 in FIG. 12 of the first embodiment, if the stroke width is below ½ pixel (the width of 4 submeshes when 8 submeshes per pixel are used), there will be cases when even if the stroke is moved onto a subpixel border which is neither ¼ nor ¾ subpixel border, the stroke will end up looking the same in the final display, provided the stroke does not cross over into two or more pixels when moved onto the ¼ or ¾ subpixel border (or in other words is completely held within one pixel). For example, when the width of the stroke is 2 subpixels, then so long as the stroke is completely contained inside one pixel, the stroke will look the same regardless of the subpixel border on which the center line of the stroke is placed. This is because after expansion and reduction, the entire pixel is given a luminosity value which is set according to the stroke width (in this case 25%). This is when the stroke is contained within one pixel and the position of the stroke which minimizes the movement amount is selected.

In this way, since the movement amount can be further reduced, it is possible to avoid losses in the faithfulness with which characters are reproduced which are caused due to excessive movement of strokes. This process is especially necessary for the expansion/reduction process shown in FIG. 16, since its execution has a large effect on even neighboring coordinate points.

FOURTH EMBODIMENT

The gray scaled data generation device of the present embodiment differs to that of the first embodiment in that it features a table generation unit 2104 in place of the table generation unit 104 and that the operation of the stroke optimal arrangement position determination unit 106 includes Step 2205 in place of Step 1205 shown in FIG. 12. The following explanation will focus on these differences.

The table generation unit 2104 generates the coordinates for the ¼ and ¾ subpixel borders, as well as setting a permitted range for the vicinity of these coordinates in the optimal arrangement standard table storage unit 105.

Figure 51:
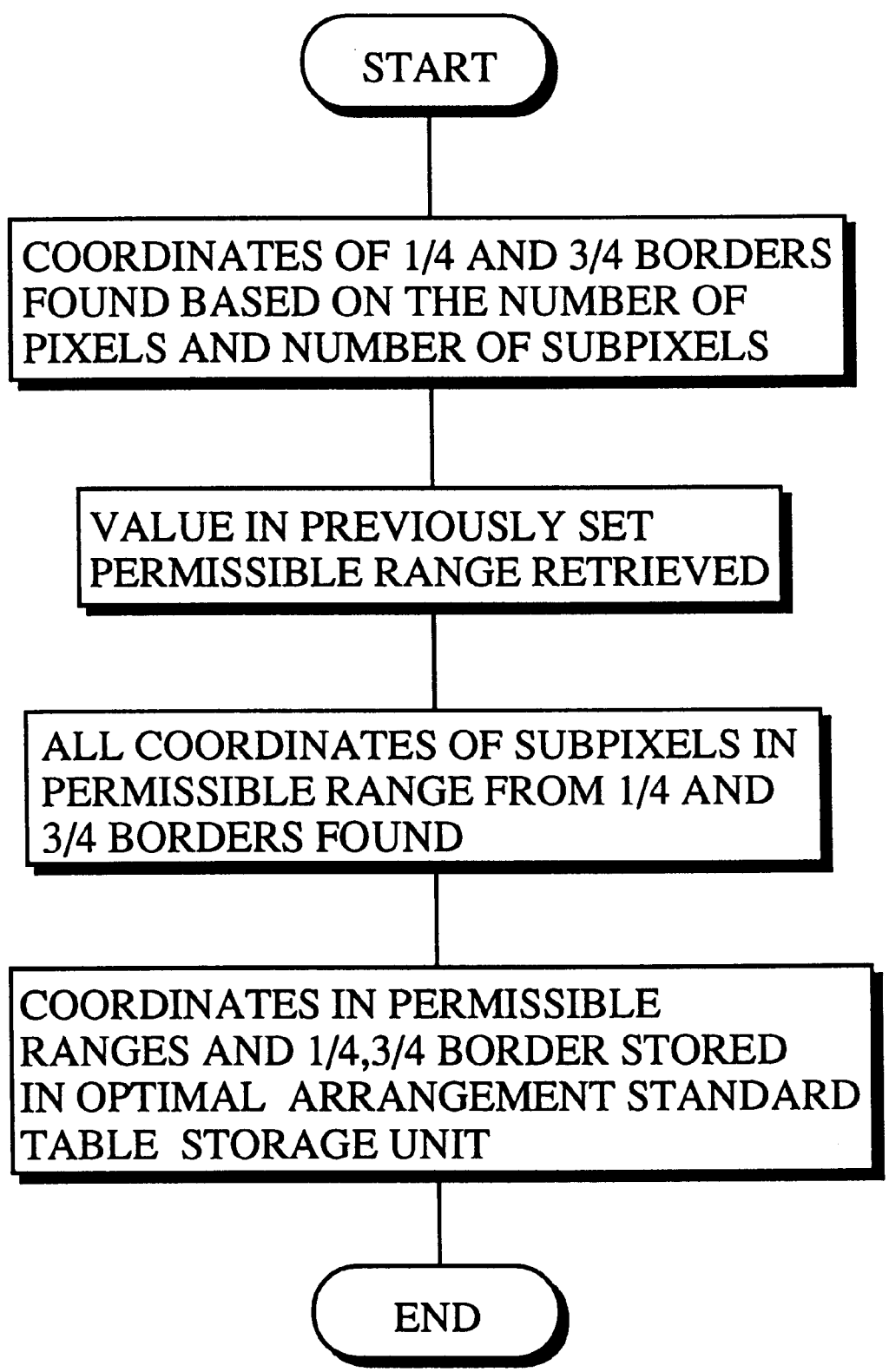
FIG. 51 shows a processing flow of table generation unit 2104 of the fourth embodiment.

FIG. 51 shows the processing flow of table generation unit 2104. The value of the permitted range is sot beforehand in accordance with the submesh divisor and the resolution of the display device to which the present gray scaled data generation device is adapted. As one example, when a pixel is divided into eight submeshes, the preferred value of the permitted range is 0 for a display unit of low resolution such as liquid crystal panel, or ±1 for a display unit whose resolution is equal to that of a CRT, while when a pixel is divided into sixteen submeshes, the preferred value is 0 or ±1 for a display unit such as liquid crystal panel, or ±1 or ±2 for a high resolution CRT.

FIG. 52 shows an example of the optimal arrangement standard table when the permitted range is ±1. It is within this range shown in the optimal arrangement standard table of FIG. 52 that the stroke optimal arrangement position determination unit 106 in Step 2205 moves the center line of the stroke so as to minimize the movement amount.

Since the movement amount of the stroke can be further reduced by the construction described above, it is possible to avoid losses in the faithfulness with which characters are reproduced which are caused due to excessive movement of strokes.

Since the permitted range can be set more precisely and the freedom with which the stroke can be arranged can be increased (due to an increase in the possible positions) when a pixel is divided into sixteen rather than eight submeshes, this leads to an increase in the quality of the displayed image. For example, if the permitted range for horizontal strokes is set at one (or two) subpixel(s) above or below the ¼ and ¾ subpixel borders when dividing a pixel into sixteen submeshes, the number of possible stroke arrangement positions is increased so that a position which is more reflective of the original position of the stroke can be achieved. This can result in somewhat of a loss in the consistency of stroke width, but depending on the characteristics of the display device, there can also be an improvement in display quality over the first embodiment. Here, while is preferable to set a permitted range of zero (no range) or a small range for a low-resolution display device such as an LCD, it is preferable when using a high-resolution or mid-range resolution display devises for a permitted range to be used. When doing so, it is effective to set a permitted range regardless of the position of the center line of a stroke, not just if it falls on one of the ¼ and ¾ subpixel borders.

Figure 53:
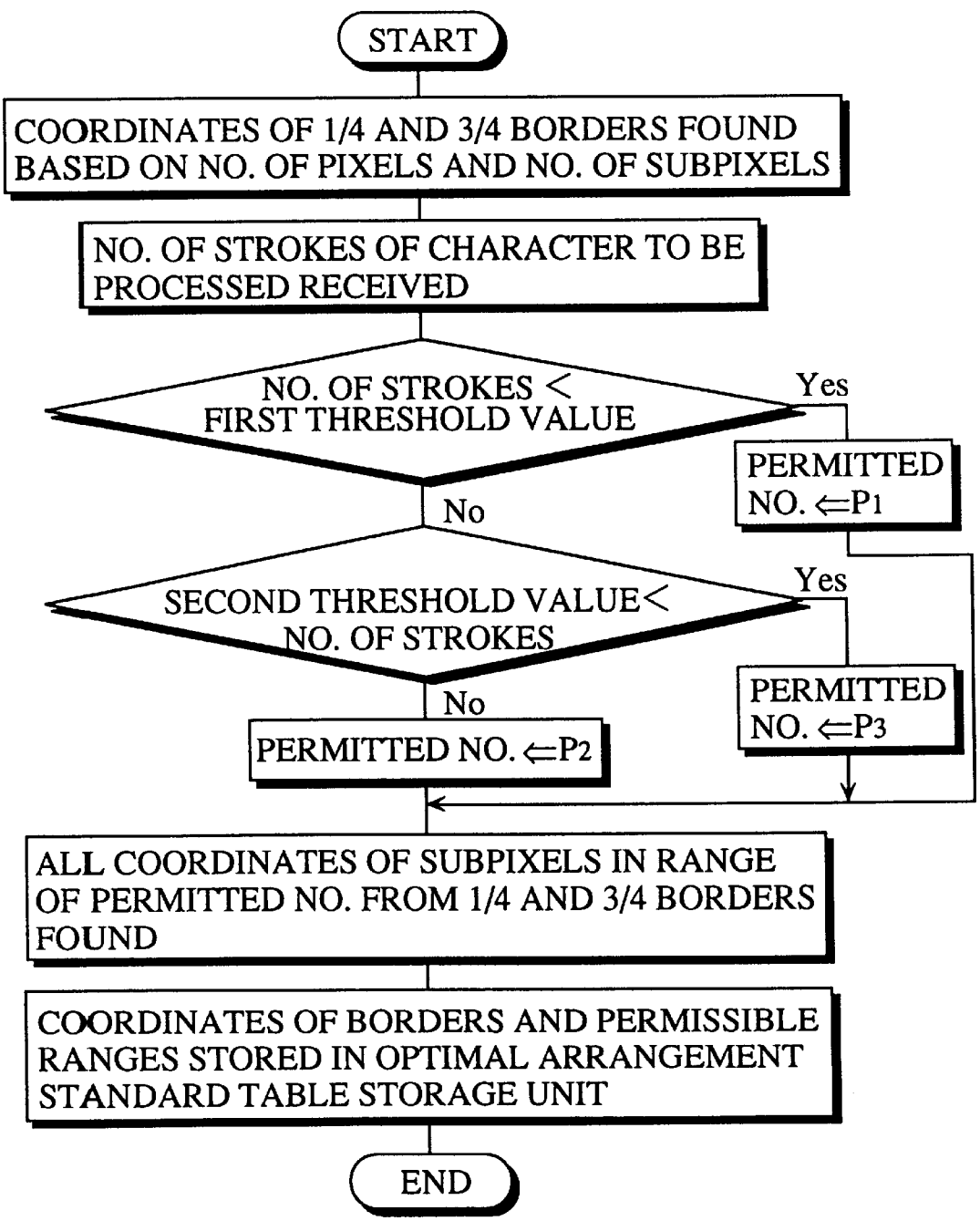
FIG. 53 is a processing flow of the fourth embodiment, in which the permitted range is set according to the number of strokes.

It should be noted here that if sixteen or more submeshes are formed within one pixel, FIG. 53 may be used in place of FIG. 52. This is to say, the value of the permitted range can be changed in accordance with the number of strokes in the character. In FIG. 53, P1, P2 and P3 are set as the permitted values, these values being set freely in accordance with the number of subpixels in one pixel at, for example, 0, ±1 or ±2. Those values should be set in accordance with the resolution of the display device used to display the gray scaled data. Here, the first and second threshold values are set in accordance with the number of pixels for the desired size of character and the number of strokes in one character, with, for example, values such as 3 and 5 being set.

FIFTH EMBODIMENT

The gray scaled generation device of the present embodiment differs to that of the third embodiment in that the permitted range in the table generation unit 2104 changes in response to stroke width.

Figure 54:
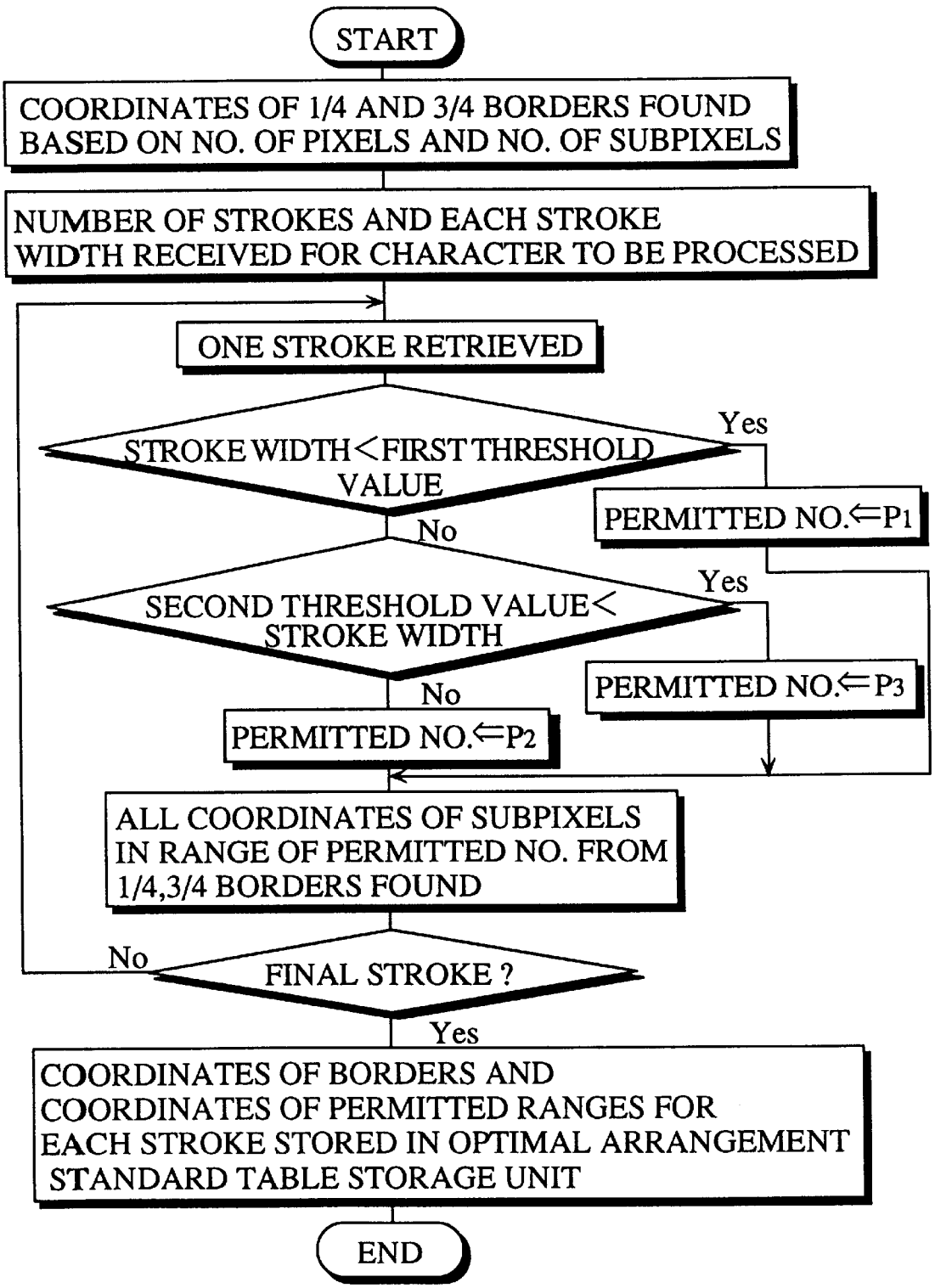
FIG. 54 shows a processing flow of table generation unit 2104 of the fifth embodiment.

FIG. 54 shows the processing flow of the table generation unit 2104. In this figure, P1, P2 and P3 are 0, ±1 and ±2 respectively for an example where a pixel is divided into sixteen submeshes. It can be seen in this figure that the permitted numbers are set according each stroke width so that an optimal arrangement standard table is generated for each stroke width. The stroke optimal arrangement position determination unit 105 refers to these optimal arrangement standard tables corresponded to stroke width in determining the optimal arrangement position of strokes.

FIG. 55 shows an example of the optimal arrangement standard tables when the permitted numbers are set according to the stroke width of each stroke.

Since inconsistencies in stroke width due to stroke arrangement positions become less and less noticeable the wider the strokes are, then the permitted range can be set as wide when the stroke width is wide, with the defining of a function for determining the permitted range in accordance with stroke width enabling the generation of gray scaled data which is truer to the original image.

SIXTH EMBODIMENT

The gray scaled data generation device of the present embodiment differs to that of the second embodiment in that the optimal arrangement position determination unit 14 determines the optimal arrangement position within a preset permitted range D. This principle is the same as that used in the fourth embodiment. In order to embody this principle, the optimal arrangement position determination process shown in FIG. 56 is used in place of the optimal arrangement position determination process shown in FIG. 44 which was used in the second embodiment.

Figure 56:
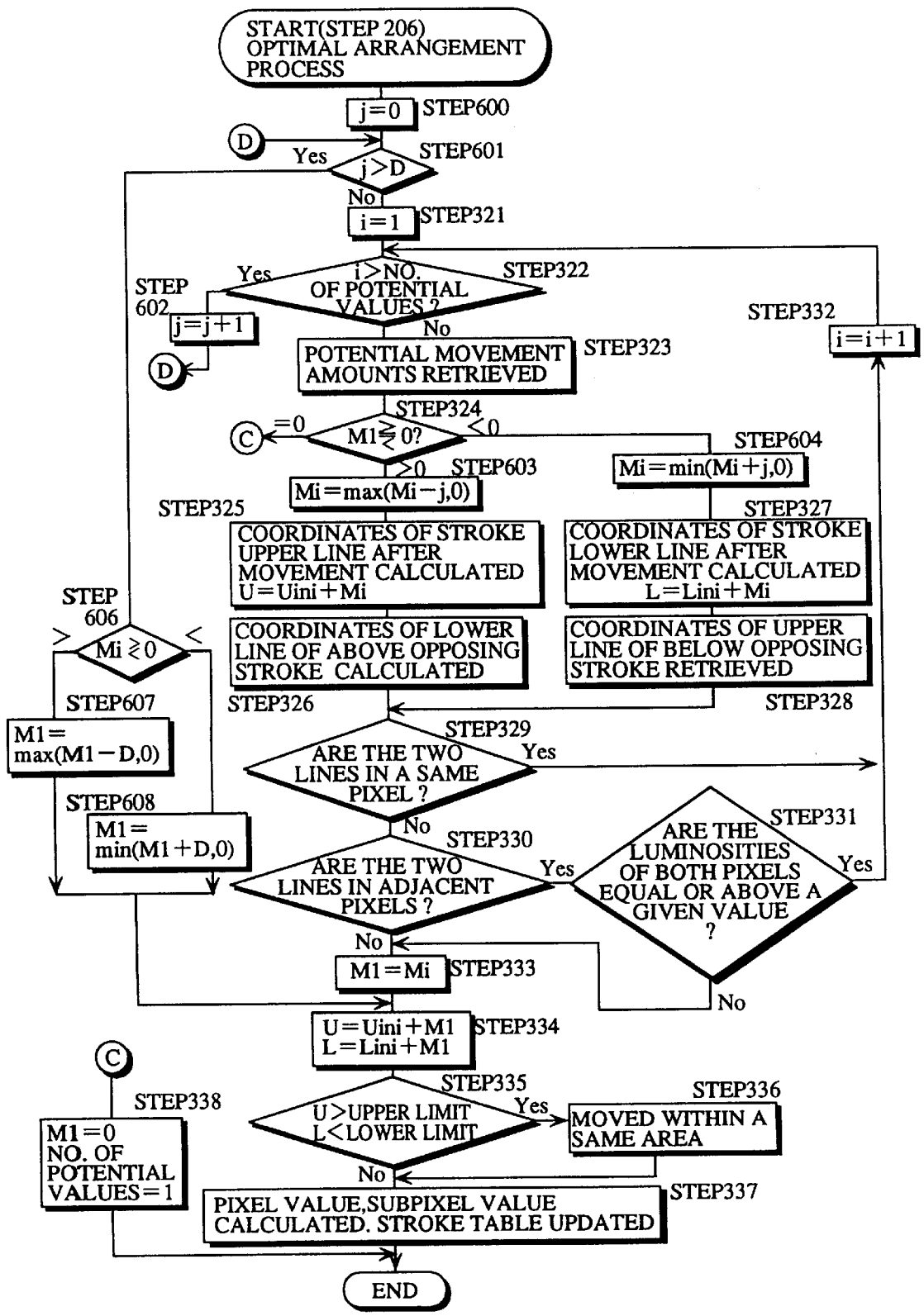
FIG. 56 shows a processing flow for determining an optimal arrangement position within allowable range D in the sixth embodiment.

FIG. 56 features the Steps 600 to 608 in addition to the process shown in FIG. 44. The permitted number is shown in the figure as D. For example, when D=1, the optimal arrangement position determination unit 14 first executes the checks of each potential movement amount in Steps 329–331 in the same way as in FIG. 44 under the premise that variable J=0, or in other words, there is no permitted range. In doing so, if the checks cannot be satisfied by any of the potential movement amounts, the same checks are repeated under premise that variable J–1, or in other words, there is a permitted range of ±1. If the checks still cannot be satisfied, variable J is incremented by one and the checks are repeated until j reaches the permitted range D. If the checks cannot be satisfied by any of the potential movement amounts within the permitted range D, then as shown in Steps 606–608, the optimal arrangement position is set as the position with the shortest movement amount in the permitted range D.

The exact same results as the fourth embodiment can be achieved by the construction described above.

It should be noted here that Steps 606–608 in FIG. 56 may be deleted. In such a case, the original first potential movement amount M1 may be used when the aforementioned checks cannot be satisfied. In place of Steps 606–608, steps which set potential movement amount list with the first potential movement amount M1=0 and number of potential amounts=1 may be used. If the checks still cannot be satisfied, then the stroke can be set so as not to be moved.

Figure 57A:
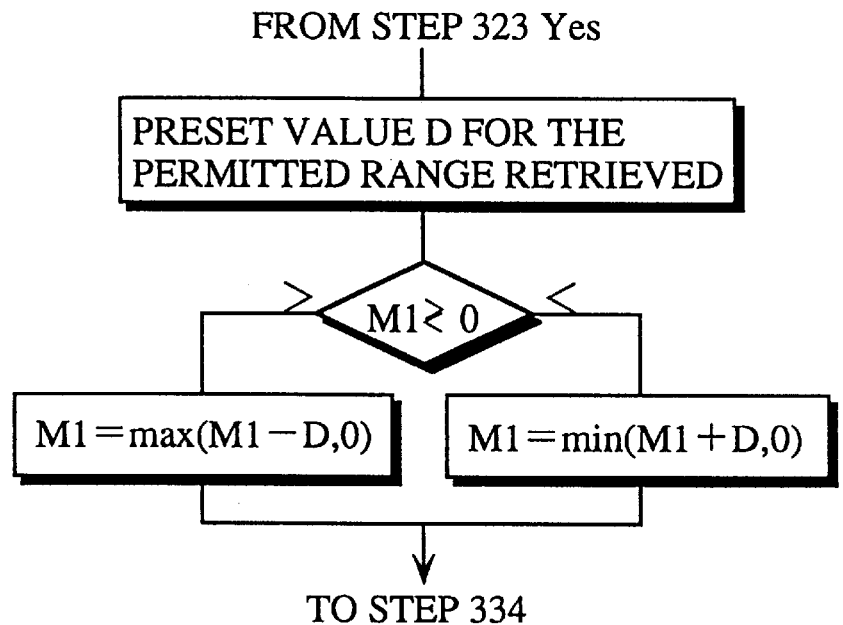
FIGS. 57A, 57B, and 57C show a processing flows for determining an optimal arrangement position at the maximum value within allowable range D in the sixth embodiment.
Figure 57B:
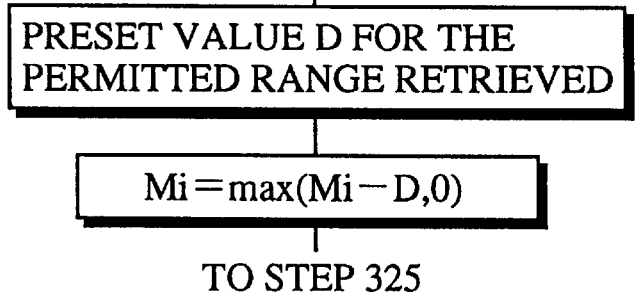
Figure 57C:
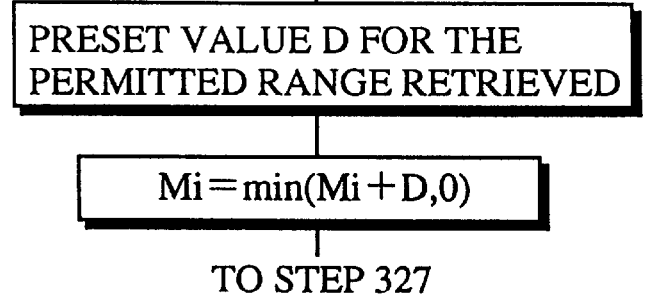

Here, in place of FIG. 56, FIG. 44 may be used with the addition of FIGS. 57A–57C. FIGS. 57A–57C are steps which are respectively inserted between Step 323 (Yes) and Step 334 in FIG. 44, between step 324 (Mi>0) and Step 325 and between Step 324 (Mi<0) and Step 327. In this case, instead of the permitted range D being incremented by one at a time as in FIG. 56, the aforementioned checks are performed for only the maximum value of the permitted range.

Also, as another way of setting the permitted range, when the optimal arrangement standard preparation unit 13 stores the potential movement amount list in the stroke table, potential movement amounts to each of the positions in the permitted range may be generated and stored along with the number of potential amounts.

SEVENTH EMBODIMENTS

Figure 58A:
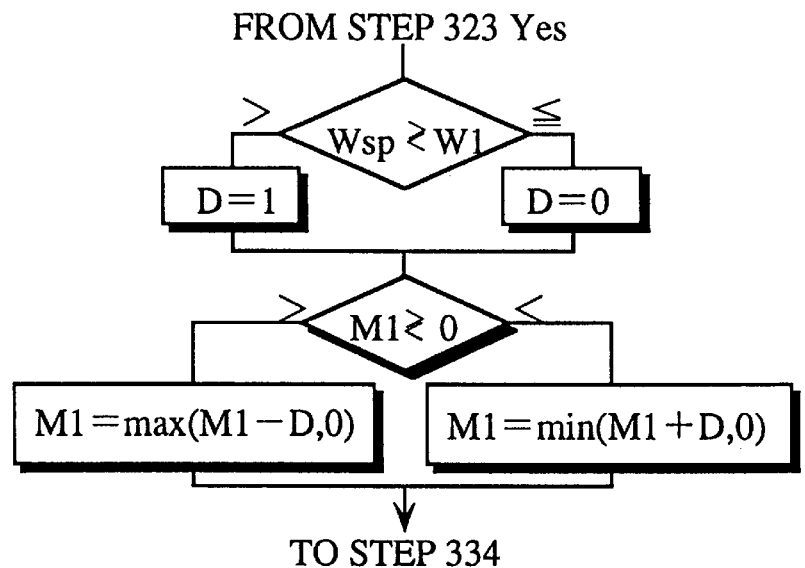
FIGS. 58A, 58B, and 58C processing flows for determining an optimal arrangement position, with allowable range D which corresponds to stroke width $W_{sp}$ being used, in the seventh embodiment.
Figure 58B:
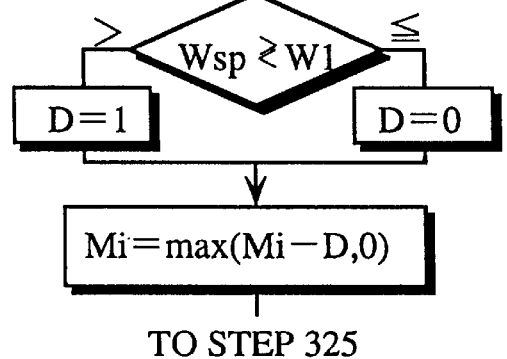
Figure 58C:
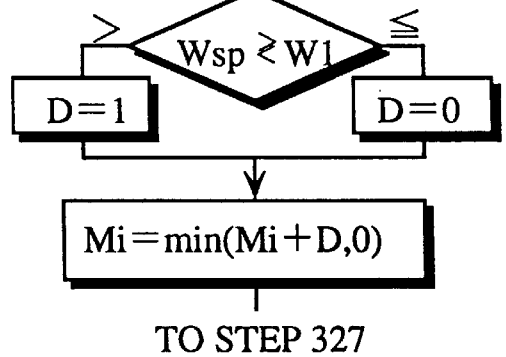

The gray scaled date generation device of the present embodiment differs to that of the sixth embodiment in that the optimal arrangement position determination unit 14 uses a permitted range D which corresponds to stroke width $W_{sp}$, determining the optimal arrangement position within this range. This is based on the same principle as the fifth embodiment. In order to achieve this, the present embodiment adds the construction shown in FIGS. 58A–58C to FIG. 44 (optimal arrangement position determination process) of the second embodiment. FIGS. 58A–58C are steps which are respectively inserted between Step 323 (Yes) and Step 334 in FIG. 44, between Step 324 (Mi>0) and Step 325 and between Step 324 (Mi<0) and Step 327. In the same figure, the permitted range D=0 when the stroke width is below a threshold value W1, or D=1 when the stroke width is equal to or above W1. Here, D=0 is the same as P1 in FIG. 54 and D=1 is the same as P2 in FIG. 54. W1 is the same as the first threshold value in FIG. 54.

It should be noted here that this embodiment may also use a second threshold value W2 in the same way as in FIG. 54, so that the permitted range D may be in three steps.

The construction of the present embodiment allows the achievement of the same results as the fifth embodiment.

EIGHTH EMBODIMENT

For the present embodiment, during Step 1205 in FIG. 12 of the first embodiment, when it is found that movement of opposing strokes will cause the strokes to become closer by a certain degree or above, then in that direction movement is not performed, even by the minimum movement amount. The standard for judging whether the strokes will become closer by a certain degree or above can be set for example to mean the upper or lower line of a stroke enters the same pixel as the lower or upper line of the opposing stroke, or to mean that the stroke enters a neighboring pixel where the shade of gray for the neighboring pixel is dark (for the case of a black line, when the neighboring pixel is the middle shade of gray or darker). That is to say, a process which is equivalent to Steps 324 to 331 in FIG. 44 in the second embodiment may be performed. By doing so, the case there two strokes become too close to each other and end up being blurred into one another can be avoided.

NINTH EMBODIMENT

The present embodiment uses X coordinate information as stroke position information in order to judge whether there are opposing strokes in place of the opposing number of the first and second embodiments.

Figures 59A, 59B:
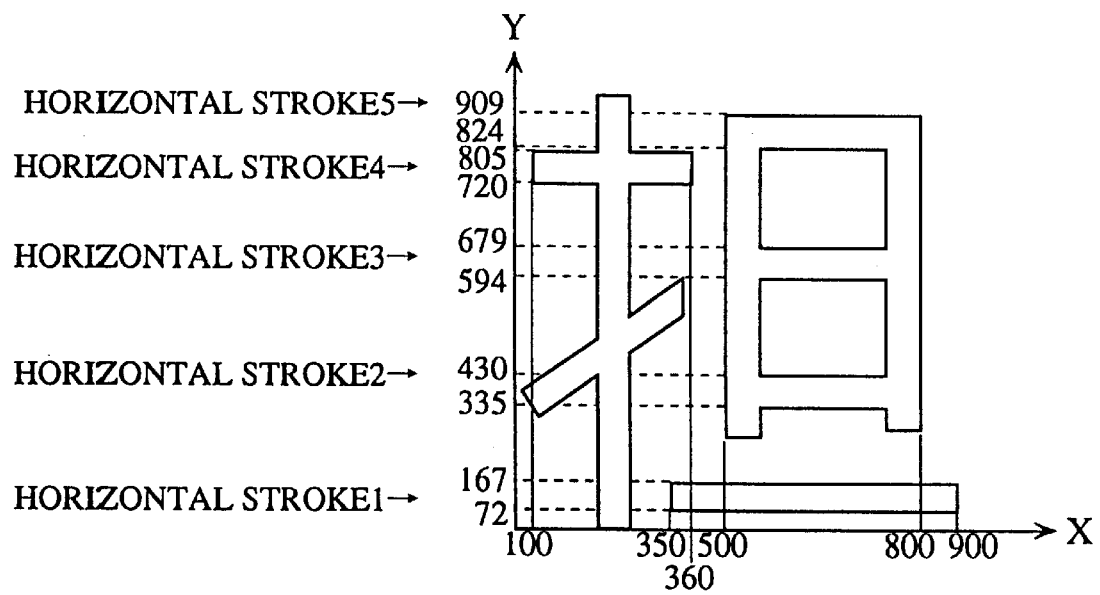
FIGS. 59A–59B show concrete examples of horizontal stroke information of outline data of the ninth embodiment.
Figure 60:
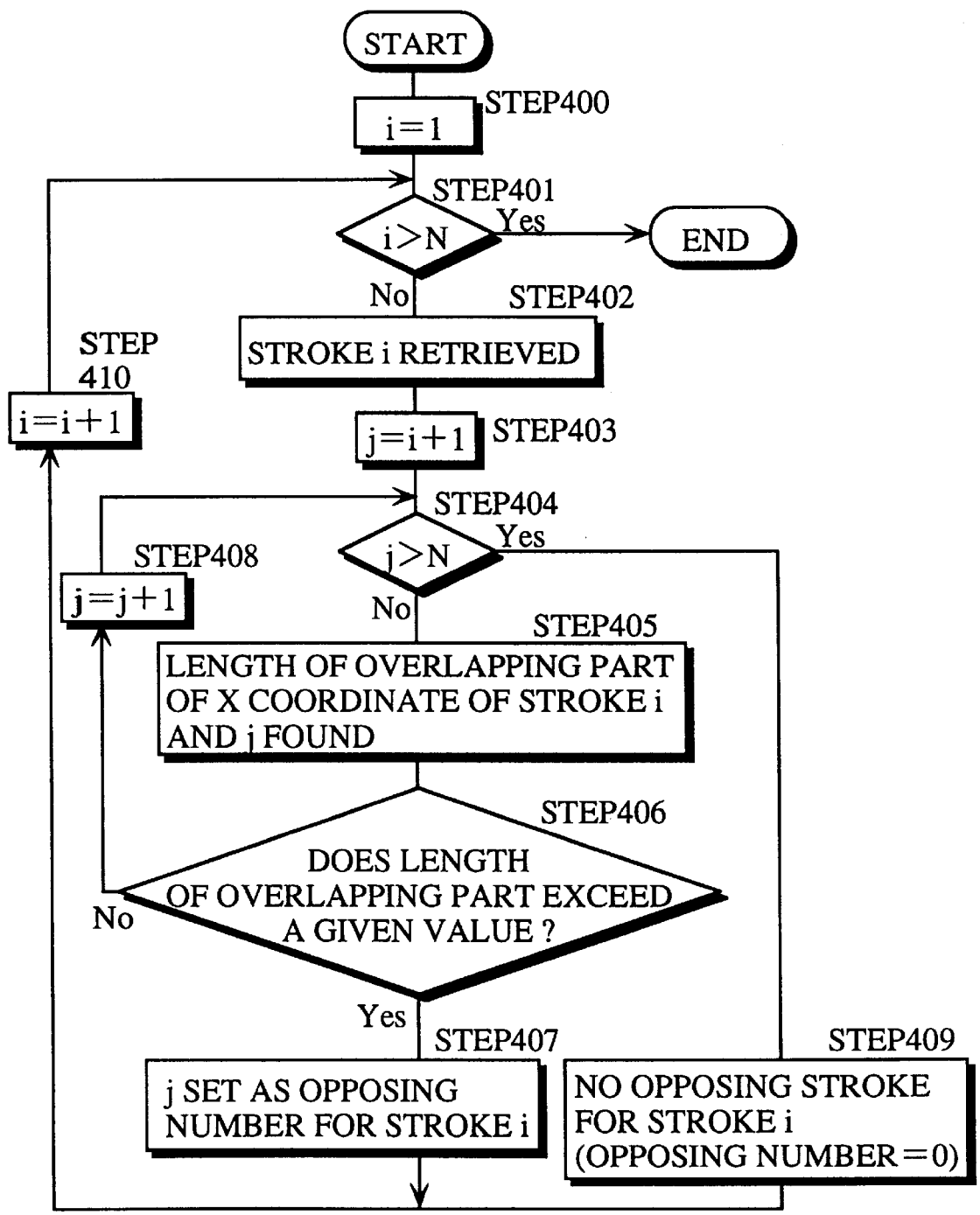
FIG. 60 is a flowchart showing a process for finding the opposing strokes based on X coordinate starting point and end point of each stroke.

FIGS. 59A and 59B show concrete examples of the horizontal stroke information in the outline data. The example shown in FIGS. 59A and 59B has the same outline data as the Chinese character shown in FIG. 25A. FIG. 59B shows the stroke position information for the horizontal strokes in the character. Each set of stroke Information in FIG. 59B is expressed as a set of lower line Y coordinate, upper line Y coordinate, X coordinate starting point, and X coordinate end point. In storing the initial arrangement position in the stroke table, the initial arrangement unit 11 finds the opposing number based on this stroke information. Here, FIG. 60 is a flowchart showing the process for finding the opposing strokes based on the X coordinate starting point and end point of each stroke.

The following is an explanation following the flow in FIG. 59A–59B. In processing horizontal stroke 1 (i=1), the initial arrangement unit 11 first checks horizontal stroke 2 (j=2), and since the length (Step 405) of the overlapping part of the X coordinates is above a given value (Step 406:Yes), it judges that horizontal stroke 2 is an opposing stroke. In this case, the length of the overlapping part of the X coordinates is 550, and the given value is, for example, 50 (50 mesh out of 1000 mesh). The initial arrangement unit 11 stores the number 2 at the too of the opposing number column in the stroke table for stroke 1. The same process is carried out for stroke 3, with the number 3 also being stored at the top of the opposing number column in the stroke table for stroke 1. Here, the initial arrangement unit 11 finds that the overlapping part of stroke 1 (i=1) and stroke 4 (J=4) is 10 mesh (step 405), so that since this is below the given value 50 (step 406:no), the check is next carried out for stroke 5 (i=5). Since the length of the overlapping part of stroke 1 and stroke 5 is 300 which exceeds the given value of 50, the number 5 is also being stored at the top of the opposing number column in the stroke table for stroke 1.

It should be noted that by adding stroke position information such as (stroke X, stroke Y) to the kind of entries described above, it can be shown whether stroke X and stroke Y are adjacent one another, so that it can be easily judged whether the strokes are neighboring stroke. When it is not a problem if the strokes become close to one another, it becomes possible to move the strokes in a direction which brings the strokes closer together, so that more balanced data can be generated.

Here, in addition to the range of the X coordinates end entries such as (stroke X, stroke Y), it is possible to list a number of strokes In parenthesis or to group strokes which for horizontal strokes have similar x coordinates and, by storing adjacency information between groups or between a group and a stroke, reduce the size of the stroke adjacency information.

Also the range of X coordinates for horizontal strokes may be found from the outline information instead of being added to the stroke position information.

TENTH EMBODIMENT

The gray scaled data generation device of the present embodiment differs to that of the seventh embodiment in that it does not move a stroke, but it extends the movement permitted range so as to allow minimal movement of the stroke from its original position, when a stroke has adjacent strokes positioned very close on both sides.

In the present embodiment, strokes which have a number of potential movement directions (such as either up or down) have their arrangement position determination priority level lowered, and the arrangement positions are decided giving priority to strokes whose movement direction is strongly fixed. By doing so, strokes for which there is relative freedom of movement can have their movement direction determined optimally out of the positions of both adjacent strokes, so that more optimal arrangement positions can be selected.

Here it is also possible to refrain from the addition of FIGS. 58B and 58C and so only add FIG. 58A to the optimal arrangement position determination process of FIG. 44. This is because in FIG. 58A strokes which have adjacent strokes very near in both directions have their movement permitted range extended and are only moved by a minimal amount.

In this way, losses in the form of character and figures due to forced movement when the strokes are very densely crowded together can be avoided.

ELEVENTH EMBODIMENT

The gray scaled data generation device of the present embodiment differs to that of the second embodiment in that strokes which have a number of potential movement directions (such as either up or down) have their arrangement position determination priority level lowered, and the arrangement positions are decided giving priority to strokes whose movement direction is strongly fixed. By doing so, strokes for which there is relative freedom of movement can have their movement direction determined optimally from the positions of both adjacent strokes, so that more optimal arrangement positions can be selected.

As a result, the present embodiment adds a "priority level" column to the stroke table shown in FIG. 24. "Priority level" shows the arrangement order of strokes and is expressed for each stroke as a numerical value between 1 and the number of priority levels (whose maximum value is the number of strokes).

Figure 61:
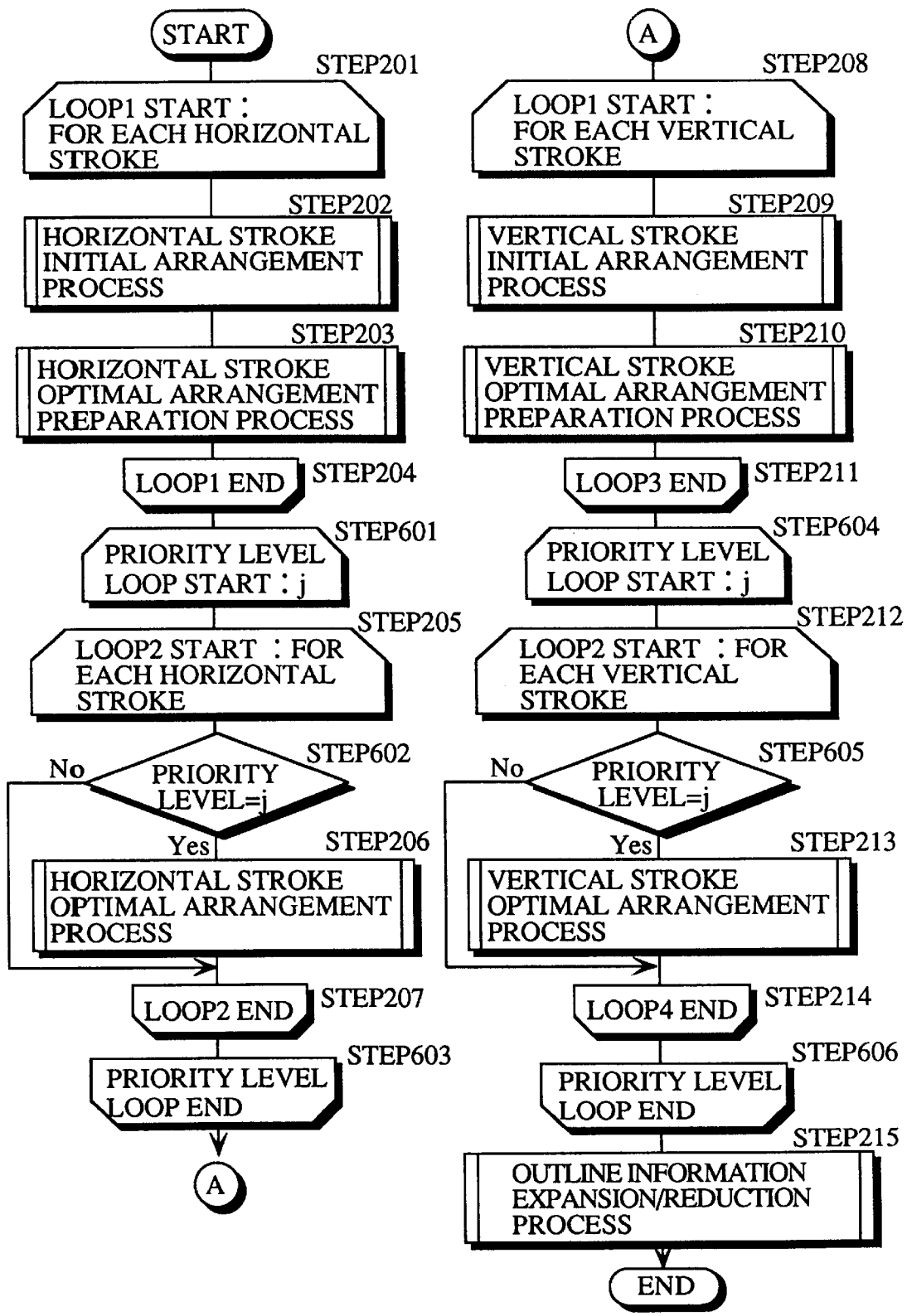
FIG. 61 is a simplified flowchart for the gray scaled data generation process using priority levels in the eleventh embodiment.

FIG. 61 is a simplified flowchart for the gray scaled data generation process in the present embodiment which uses priority levels. This figure differs from FIG. 22 in that it additionally includes Steps 601 to 606. The loop process from Step 601 to 603 is executed a number of times equal to the number of priority levels j, while in Step 602 the optimal arrangement process is executed if the priority level of the stroke is j. Steps 604 to 606 are the same. In this way, the optimal arrangement process can be executed in order of the priority level of strokes, starting with the stroke with the highest priority level (j=1).

TWELFTH EMBODIMENT

Figure 62:
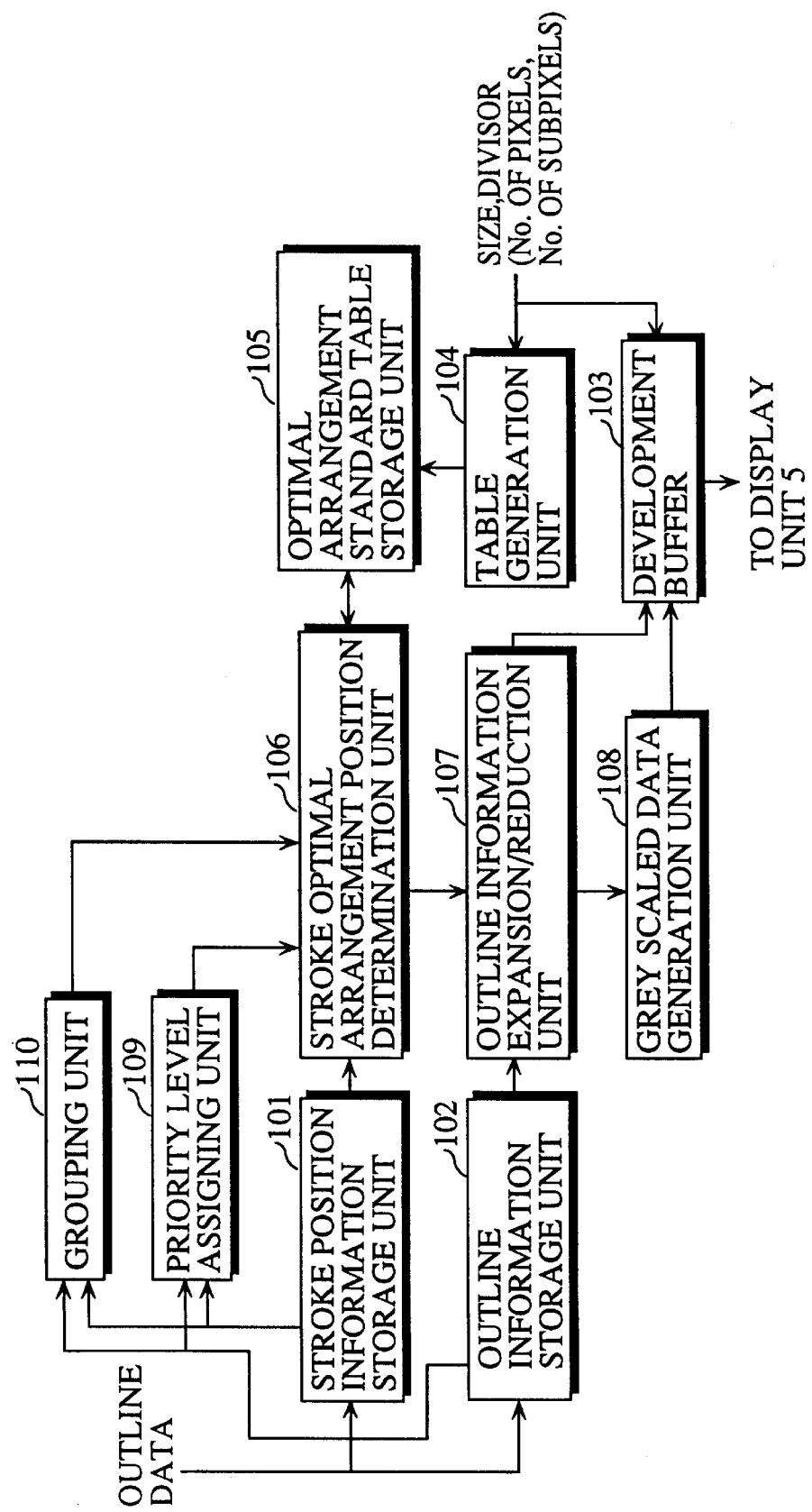
FIG. 62 is a function block diagram for the gray scolded data generation device of the twelfth embodiment.

The gray scaled data generation device of the present embodiment has almost the same construction as the third embodiment, except that as shown in FIG. 62 it features a priority level assigning unit 109 and a grouping unit 110 in addition to the construction shown in FIG. 1B, and that in step 1205 in FIG. 12 of the second embodiment, when the strokes are crowded together so that it is impossible to show each of them clearly, strokes with a high priority level are prioritized so as to be arranged clearly The following explanation will focus on these differences.

The priority level assigning unit 109 assigns a priority level to each stroke based on the stroke position information in the stroke position information storage unit 101 and the outline information in the outline information storage unit 102. Since representing Chinese characters made up of a large number of strokes with only a small number of pixels has the result of strokes which are positioned close to one another being displayed by a continuous blur, the priority level of strokes which play an important role in defining the form of the character is set a high value. Here, the priority level assigning unit 109 detects strokes which play much an important role in defining the form of the character and assigns them a high priority level. The determination of whether a stroke plays an important role in defining the form of the character can be simply set so that long strokes are given a higher priority than short strokes. Here, it is possible for the every stroke to be set its own priority level which can be then be used as a ranking, although the present embodiment quite simply sets one of two priority levels, namely high or low, to each stroke.

The grouping unit 110 groups together the characters for which it is especially necessary to maintain the balance between strokes. For example, if there is a loss in the balance of the intervals between the horizontal strokes for characters such as "三" "SAN", "日" "HI", "三" "GETSU", and "月" "ME", or a loss in the vertical balance for characters such as "川" "KAWA" and "州" "SHU", then this will result in unnatural depiction of the characters. The grouping unit 110 takes characters whose number of strokes is relatively low but which have 3 or more strokes in a same direction and groups the strokes together.

Each stroke in the stroke position information in the outline data is assigned a priority ranking beforehand, so that when in Step 1205 in FIG. 12 of the second embodiment, it is not possible to clearly display all of the strokes which are crowded together, strokes with a high priority level are arranged with priority so as to be displayed clearly, which improves the display quality of the character.

Figure 63:
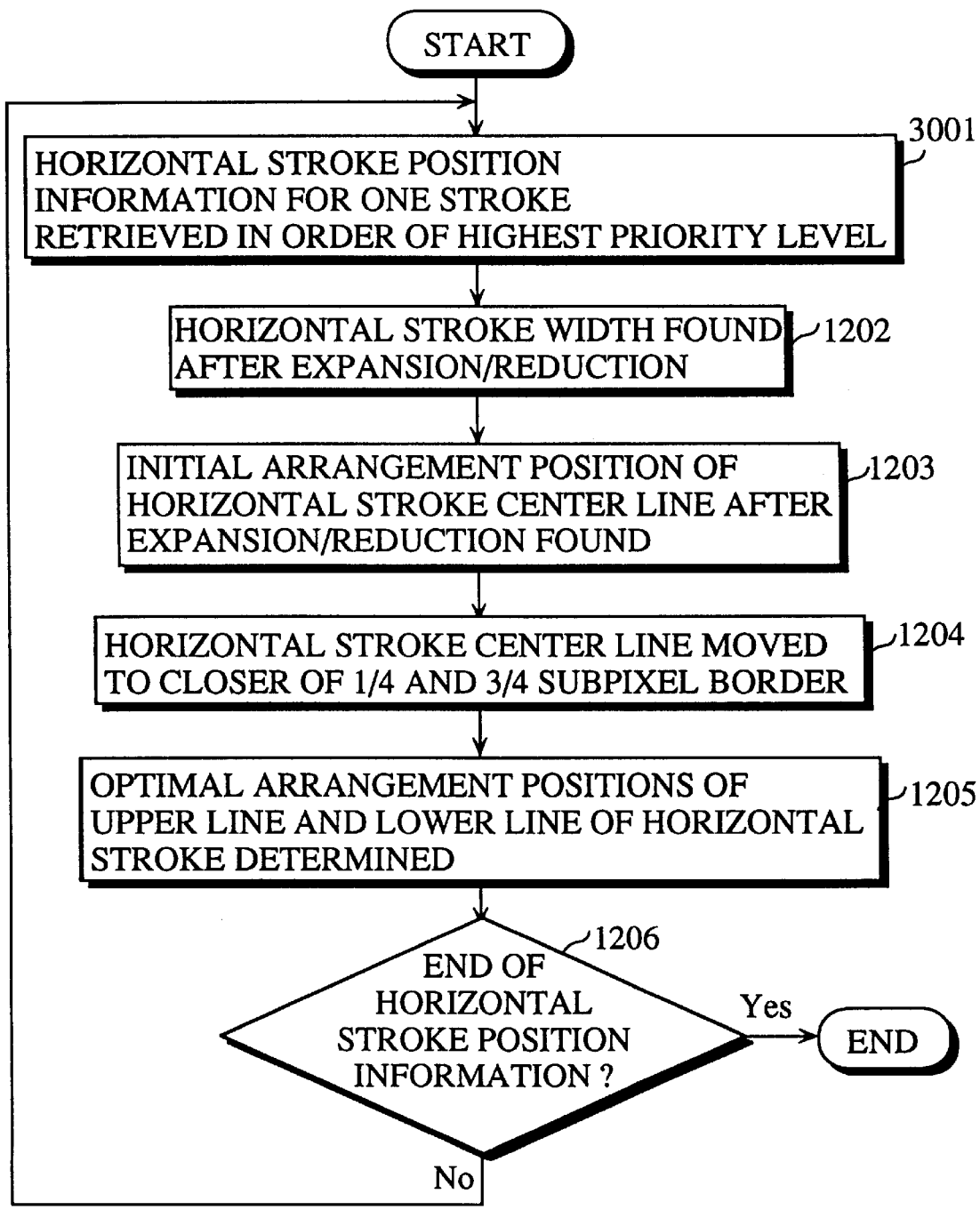
FIG. 63 shows a processing flow of a stroke optimal arrangement position determination unit of the twelfth embodiment, taking into consideration priority levels.

FIG. 63 shows the processing flow of the stroke optimal arrangement position determination unit taking into consideration priority levels.

It should be noted here that all the strokes in the stroke position information in the outline data are already grouped together and that in Step 1205 in FIG. 12 of the second embodiment, consideration is made so as to avoid a breakdown in the balance of arrangement positions of each stroke in a group. For example, when it is preferable to have three strokes equally spaced, then the permitted range may be extended and the distance a stroke is moved may be reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A gray scaled data generation device which generates characters and figures of a size which is a fixed number of pixels as gray scaled data, based on outline information, which includes outline information which expresses outlines of strokes included in the characters and figures, and stroke information which shows positions of said strokes, wherein the strokes include horizontal and vertical strokes and each said stroke has a center line, a lower line and an upper line, the gray scaled data generation device comprising:

optimizing means for calculating an optimal stroke position expressed in the stroke information, said position being in a coordinate system in which a position is expressed in terms of fine pixels obtained by dividing a length of an edge of every said pixel in a horizontal and a vertical direction, according to a certain criteria related to a distance of an initial position of said stroke from a pixel border of each pixel so that the optimal stroke position for each said horizontal and vertical stroke is at the same distance from the pixel border parallel with the direction of the stroke and closest to the stroke;

outline generation means for generating outlines in said coordinate system from the outline information, for each said stroke which has had its position optimized; and gray scaled data generation means for generating gray scaled data for each pixel based on the generated outlines.

2. The gray scaled data generation device of claim 1, wherein the optimizing means includes:

initial position calculation means for calculating, for every said stroke, the initial position of the stroke in the coordinate system; and position conversion means for converting the initial position of each said stroke in said coordinate system into an optimal stroke position.

3. A gray scaled data generation device which generates characters and figures of a size which is a fixed number of pixels as gray scaled data, based on outline information, which includes outline information which expresses outlines of strokes included in the characters and figures, and stroke information which shows positions of said strokes, wherein the strokes include horizontal and vertical strokes and each said stroke has a center line, a lower line and an upper line, the gray scaled data generation device comprising:

optimizing means for calculating an optimal stroke position expressed in the stroke information, said position being in a coordinate system in which a position is expressed in terms of fine pixels obtained by dividing a length of an edge of every said pixel in a horizontal and a vertical direction, according to a certain criteria related to a distance of an initial position of said stroke from a pixel border of each pixel;

outline generation means for generating outlines in said coordinate system from the outline information, for each said stroke which has had its position optimized; and gray scaled data generation means for generating gray scaled data for each pixel based on the generated outlines, wherein the optimizing means includes:

initial position calculation means for calculating, for every said stroke, the initial position of the stroke in the coordinate system; and position conversion means for converting the initial position of each said stroke in said coordinate system into an optimal stroke position so that an initial stroke position of the center line of each said stroke is converted so as to be placed on said optimal stroke position.

4. The gray scaled data generation device of claim 3, wherein said optimal stroke position is a position at the distance from a horizontal border of the pixel for the horizontal stroke and a position at the distance from a vertical border of the pixel for the vertical stroke.

5. The gray scaled data generation device of claim 4, wherein said optimal stroke position is at the distance from an upper or a lower horizontal border of the pixel for the horizontal stroke and at the distance from a left or a right vertical border of the pixel for the vertical stroke.

6. The gray scaled data generation device of claim 5, wherein the distance is approximately ¼ of the length of the edge of each said pixel.

7. The gray scaled data generation device of claim 6, wherein the position conversion means sets the optimal pixel position to be at the shortest movement distance from the initial stroke position when there are a number of positions which satisfy the certain criteria for the stroke.

8. The gray scaled data generation device of claim 7, wherein the initial position calculation means calculates, for each said stroke, coordinates of the stroke center line in said coordinate system based on the stroke information, and the position conversion means converts said coordinates calculated for the stroke center line to the coordinates of the optimal stroke position.

9. The gray scaled data generation device of claim 8, wherein the position conversion means selects for the optimal stroke position any position where the stroke is totally incorporated within one said pixel when a stroke width calculated by the initial position calculation means is below ½ of the length of the edge of the pixel and the stroke is not initially incorporated within the pixel.

10. The gray scaled data generation device of claim 8, wherein the position conversion means selects for the optimal stroke position any position where the stroke is totally incorporated within one said pixel when a stroke width calculated by the initial position calculation means is below the length of the edge of the pixel and the stroke is not initially incorporated within the pixel.

11. The gray scaled data generation device of claim 8, wherein the certain criteria is set as a predetermined range from a position whose distance from the pixel border is ¼ of the length of the edge of the pixel, and the position conversion means selects any position within the predetermined range as the optimal stroke position.

12. The gray scaled data generation device of claim 8, wherein the position conversion means assigns an order of priority to the strokes beginning with a stroke having a least number of the optimal stroke positions and converts the initial positions according to the order of priority when a number of optimal stroke positions satisfy the certain criteria.

13. The gray scaled data generation device of claim 8, wherein the stroke information includes information showing an order of priority of the strokes, and the position conversion means has a stroke designation means for designating the strokes according to the order of priority and the initial stroke positions are converted in the order of priority of the designated strokes.

14. The gray scaled data generation device of claim 7, wherein the initial position calculation means calculates, for each said stroke, coordinates for the stroke upper line and the stroke lower line in said coordinate system based on the stroke information and a stroke width between said stroke upper and lower lines, and the position conversion means includes:

relative position calculation means for calculating a relative position of the optimal stroke position from the upper horizontal border or the lower horizontal border by performing a given calculation using the calculated stroke width; and coordinate conversion means for calculating coordinates of the relative position of the optimal stroke position to minimize the movement distance of the stroke lower line or the stroke upper line and converting coordinates of the initial stroke position of the upper line and lower line of the stroke into said calculated coordinates.

15. The gray scaled data generation device of claim 14, wherein the relative position calculation means calculates a reminder left by dividing a sum of the stroke width and a given offset in the coordinate system by a a number of fine pixels in the edge of the pixel, and calculates at least one relative position as a potential optimal stroke position of the upper line or the lower line of the stroke based on the remainder.

16. The gray scaled data generation device of claim 15, wherein the coordinate conversion means includes:

potential position judgement means for judging which potential optimal stroke position calculated as the relative position minimizes the movement distance of the stroke; and calculation means for calculating coordinates of the upper line and the lower line of the stroke according to the potential optimal stroke position judged to minimize the movement distance of the stroke.

17. The gray scaled data generation device of claim 14, wherein the position conversion means selects for the optimal stroke position any position where the stroke is totally incorporated within one said pixel when a stroke width calculated by the initial position calculation means is below ½ of the length of the edge of the pixel and the stroke is not initially incorporated within the pixel.

18. The gray scaled data generation device of claim 14, wherein the position conversion means selects for the optimal stroke position any position where the stroke is totally incorporated within one said pixel when a stroke width calculated by the initial position calculation means is below the length of the edge of the pixel and the stroke is not initially incorporated within the pixel.

19. The gray scaled data generation device of claim 14, wherein the certain criteria is set as a predetermined range from a position whose distance from the pixel border is ¼ of the length of the edge of the pixel, and the position conversion means selects any position within the predetermined range as the optimal stroke position.

20. The gray scaled data generation device of claim 14, wherein the position conversion means assigns an order of priority to the strokes beginning with a stroke having a least number of the optimal stroke positions and converts the initial positions according to the order of priority when a number of optimal stroke positions satisfy the certain criteria.

21. The gray scaled data generation device of claim 14, wherein the stroke information includes information showing an order of priority of the strokes, and the position conversion means has a stroke designation means for designating the strokes according to the order of priority and the initial stroke positions are converted in the order of priority of the designated strokes.

22. The gray scaled data generation device of claim 4, wherein the position conversion means selects the optimal pixel position to be at the shortest movement distance from the initial stroke position when there are a number of positions which satisfy the certain criteria from the stroke.

23. The gray scaled data generation device of claim 22, wherein the position conversion means, when it determines that the movement to the optimal stroke position would place the stroke whose position is to be converted to the at the distance to a nearest stroke in a direction of movement which is below a predetermined threshold value, selects the optimal stroke position in an opposite movement direction which satisfies the certain criteria.

24. The gray scaled data generation device of claim 23, wherein the stroke information includes opposing stroke information about opposing strokes adjacent to the stroke whose position is to be converted, and the position conversion means selects one of the opposing strokes shown in the opposing stroke information as the nearest stroke.

25. The gray scaled data generation device of claim 24, wherein the stroke information includes a stroke length information showing a range of coordinates of each said stroke in an axis parallel to the direction of the stroke and the position information conversion means includes:

overlap calculation means for calculating a length of the stroke whose position is to be converted and another stroke in an axis parallel to the direction of the stroke based on the stroke length information;

judgement means for judging that the another stroke is an opposing stroke if the length of overlap is over a predetermined value; and the position information conversion means selects the stroke which is judged to be the opposing stroke as the nearest stroke.

26. The gray scaled data generation device of claim 25, wherein the position conversion means includes:

coordinate calculation means for calculating opposing line coordinates of the upper or lower lines of the stroke whose position is to be converted and an opposing adjacent upper line or lower line of the nearest stroke;

adjacent judgement means for judging that a distance between the two strokes is below a predetermined threshold value if the calculated opposing line coordinates are in two adjacent pixels; and determination means for determining, when the distance between the two strokes with the same direction of movement is judged to be below the predetermined threshold value, the optimal stroke position which satisfies the certain criteria and minimizes the movement distance in an opposite movement direction.

27. The gray scaled data generation device of claim 26, wherein the position conversion means further includes re-determination means for discarding the calculated optimal stroke position determined by the determination means and re-determining a new optimal stroke position when the position conversion means determines that the movement to the calculated optimal stroke position would place the stroke whose position is to be converted at the distance from the nearest stroke determined to be below the predetermined threshold value.

28. A gray scaled data generation device which generates characters and figures of a size which is a fixed number of pixels as gray scaled data, based on outline information which includes outline information which expresses outlines of strokes included in the characters and figures, and stroke information which shows positions of said strokes, wherein the strokes include horizontal and vertical strokes and each said stroke has a center line, a lower line and an upper line, the gray scaled data generation device comprising:

initial arrangement means for obtaining for every said stroke an initial position, converting the initial position of each said stroke shown in the stroke information into a subpixel coordinate system in which positions are expressed in terms of fine pixels obtained by dividing a length of an edge of every said pixel in a horizontal and a vertical direction;

preparation means for determining at least one potential movement distance in order to move the center line of each of the strokes to an optimal stroke position which is at a predetermined distance from a pixel border;

optimal arrangement determination means for determining the optimal stroke position for each stroke based on the potential movement distances;

outline generation means for generating outlines of each said stroke with the optimal stroke positions determined in the subpixel coordinate system based on the outline information; and gray scaled data generation means for generating gray scaled data for each said pixel based on the generated outline.

29. The gray scaled data generation device of claim 28, wherein the predetermined distance is approximately ¼ of the length of the edge of each said pixel.

30. The gray scaled data generation device of claim 29, wherein the initial arrangement means includes a first table for holding values in the subpixel coordinate system which represent coordinates of the stroke upper line and lower line, stroke width between the upper line and the lower line, and subpixel values which are relative coordinates of the upper line for each stroke and wherein the preparation means includes:

potential arrangement position calculation means for calculating at least one potential position of the upper line expressed as a subpixel value by performing a given calculation using the stroke width; and first potential movement distance list generation means for calculating a movement distances from the coordinates of the upper line to each of the calculated potential positions for each said stroke and storing the calculated movement distances as a potential movement distance list in the first table.

31. The gray scaled data generation device of claim 30, wherein the optimal arrangement determination means judges, for each said stroke, which potential movement distance on the potential movement distance list is in a same direction as a movement direction of a neighboring stroke, calculates the optimal position using the potential movement distance and stores the optimal position in the first table.

32. The gray scaled data generation device of claim 31, wherein the preparation means further includes:
   stroke width judgement means for judging, for each said stroke, whether the stroke width is below ½ of the length of the edge of each said pixel;
   prohibition means for prohibiting operation of the potential arrangement position calculating means and the first potential movement distance list generation means when the stroke width is judged to be below ½ of the length of the edge of each said pixel; and
   second potential movement distance list generation means for calculating at least one potential movement distance so that the stroke having the stroke width judged to be below ½ of the length of the edge of each said pixel is totally incorporated within the pixel, and storing calculated potential movement distances on the potential movement distance list in the first table.

33. The gray scaled data generation device of claim 32, wherein the preparation means further includes order adjustment means for arranging, in order, potential movement distances starting with a smallest amount on the potential movement distance list stored in the first table, and wherein the optimal arrangement determination means includes:
   straight line coordinate calculation means for calculating the opposing line coordinates of the upper or lower line of the stroke whose position is to be converted and an opposing adjacent lower or upper line of the neighboring stroke, when the stroke is moved by the potential movement distance;
   first judgement means for judging whether the opposing line coordinates calculated by the straight line coordinate calculation means are in the same pixel;
   second judgement means for judging whether the opposing line coordinates are in two adjacent pixels;
   third judgement means for judging, when the second judgement means judges that the opposing line coordinates are in two adjacent pixels, whether luminosity of each of the two adjacent pixels is over a predetermined value;
   optimal movement amount determination means for determining potential movement distances as optimal movement amounts
      when the first judgement means judges that the opposing line coordinates are not in the same pixel and the second judgement means judges that the two opposing line coordinates are not in the two adjacent pixels, or
      when the third judgement means judges that the luminosity of each of the two adjacent pixels is not over the predetermined value; and
   optimal position calculation means for calculating coordinates of the stroke upper line and lower line, the stroke width and subpixel values which are relative coordinates of the upper line in the pixel, after the movement of the stroke according to the determined optimal movement distance, and updating the first table.

34. The gray scaled data generation device of claim 33, wherein the preparation means includes allowable range designation means for designating a predetermined allowable range to a potential movement distance when the first judgement means judges that the two opposing line coordinates are in the same pixel or when the third judgement means judges that the luminosity of at least one of the two adjacent pixels is over the predetermined value, and the straight line coordinate calculation means calculates the two opposing line coordinates based on the potential movement distance within the predetermined allowable range.

35. The gray scaled data generation device of claim 34, wherein the initial arrangement means stores, for each said stroke, opposing information in the first table, the opposing information showing the strokes which are positioned so that said strokes may become neighboring strokes above and below the stroke being processed after the outline is generated in the gray scaled data, and the straight line coordinate calculation means calculates coordinates of the upper line of the stroke to be moved and coordinates of the lower line of the neighboring stroke above, shown in the opposing information when the potential movement distance causes an upward movement, and coordinates of the lower line of the stroke to be moved and coordinates of the upper line of the neighboring stroke below shown in the opposing information when the potential movement distance causes a downward movement.

36. The gray scaled data generation device of claim 35, wherein the initial arrangement means stores, for each said stroke, an order of priority in the first table, and the optimal arrangement determination means comprises stroke designation means for designating the strokes according to the order of priority, and the first, second, and third judgement means judge the designated strokes.

37. A gray scaled data generation device which generates characters and figures of a size which is a fixed number of pixels as gray scaled data, based on outline information, which includes outline information which expresses outlines of strokes included in the characters and figures, and stroke information which shows positions of said strokes, wherein the strokes include horizontal and vertical strokes and each said stroke has a center line, a lower line and an upper line, the gray scaled data generation device comprising:
   optimizing means for calculating an optimal stroke position expressed in the stroke information, said position being in a coordinate system in which a position is expressed in terms of fine pixels obtained by dividing a length of an edge of every said pixel in a horizontal and a vertical direction, according to a certain criteria related to a distance of an initial position of said stroke from a pixel border of each pixel;
   outline generation means for generating outlines in said coordinate system from the outline information, for each said stroke which has had its position optimized; and
   gray scaled data generation means for generating gray scaled data for each pixel based on the generated outlines, wherein the optimizing means includes:
      initial position calculation means for calculating, for every said stroke, the initial position of the stroke in the coordinate system, and
      position conversion means for converting the initial position of each said stroke in said coordinate system into an optimal stroke position so that an initial stroke position of the center line of each said stroke is converted so as to be placed on said optimal stroke position; and wherein
   said optimal stroke position is a position at the distance from a horizontal border of the pixel for the horizontal stroke and a position at the distance from a vertical border of the pixel for the vertical stroke,
   said optimal stroke position is at the distance from an upper or a lower horizontal border of the pixel for the horizontal stroke and at the distance from a left or a right vertical border of the pixel for the vertical stroke, and
   the distance is approximately ¼ of the length of the edge of each said pixel.

38. A gray scaled data generation device which generates characters and figures of a size which is a fixed number of pixels as gray scaled data, based on outline information, which includes outline information which expresses outlines of strokes included in the characters and figures, and stroke information which shows positions of said strokes, wherein the strokes include horizontal and vertical strokes and each said stroke has a center line, a lower line and an upper line, the gray scaled data generation device comprising:

optimizing means for calculating an optimal stroke position expressed in the stroke information, said position being in a coordinate system in which a position is expressed in terms of fine pixels obtained by dividing a length of an edge of every said pixel in a horizontal and a vertical direction, according to a certain criteria related to a distance of an initial position of said stroke from a pixel border of each pixel;

outline generation means for generating outlines in said coordinate system from the outline information, for each said stroke which has had its position optimized; and gray scaled data generation means for generating gray scaled data for each pixel based on the generated outlines, wherein the optimizing means includes:
   initial position calculation means for calculating, for every said stroke, the initial position of the stroke in the coordinate system, and position conversion means for converting the initial position of each said stroke in said coordinate system into an optimal stroke position so that an initial stroke position of the center line of each said stroke is converted so as to be placed on said optimal stroke position; and wherein the initial position calculation means calculates, for each said stroke coordinates for the stroke upper line and the stroke lower line in said coordinate system based on the stroke information and a stroke width between said stroke upper and lower lines, and the position conversion means includes:

relative position calculation means for calculating a relative position of the optimal stroke position from the upper horizontal border or the lower horizontal border by performing a given calculation using the calculated stroke width, and coordinate conversion means for calculating coordinates of the relative position of the optimal stroke position to minimize the movement distance the stroke lower line or the stroke upper line, and converting coordinates of the initial stroke position of the upper line and lower line of the stroke into said calculated coordinates.

\* \* \* \* \*